(12) United States Patent
Vittorio

(10) Patent No.: US 12,079,229 B2
(45) Date of Patent: *Sep. 3, 2024

(54) CONTENT SEARCH AND RESULTS

(71) Applicant: Steven Michael Vittorio, San Francisco, CA (US)

(72) Inventor: Steven Michael Vittorio, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/353,209

(22) Filed: Jul. 17, 2023

(65) Prior Publication Data

US 2023/0359636 A1    Nov. 9, 2023

Related U.S. Application Data

(63) Continuation of application No. 17/452,960, filed on Oct. 29, 2021, now Pat. No. 11,704,323, which is a continuation of application No. 15/566,977, filed as application No. PCT/US2016/028080 on Apr. 18, 2016, now Pat. No. 11,250,008.

(Continued)

(51) Int. Cl.
| | | |
|---|---|---|
| G06F 16/245 | (2019.01) | |
| G06F 16/2457 | (2019.01) | |
| G06F 16/2458 | (2019.01) | |
| G06F 16/955 | (2019.01) | |
| G06Q 50/10 | (2012.01) | |

(52) U.S. Cl.
CPC .... *G06F 16/24578* (2019.01); *G06F 16/2477* (2019.01); *G06F 16/9558* (2019.01); *G06Q 50/10* (2013.01)

(58) Field of Classification Search
CPC .......... G06F 16/24578; G06F 16/9558; G06F 16/2477; G06F 16/951; G06F 16/9535; G06F 16/3322; G06Q 50/10
See application file for complete search history.

(56) References Cited

U.S. PATENT DOCUMENTS

| | | |
|---|---|---|
| 6,626,959 B1 | 9/2003 | Moise et al. |
| 6,987,945 B2 | 1/2006 | Corn et al. |

(Continued)

FOREIGN PATENT DOCUMENTS

WO    2014/071033 A1    5/2014

OTHER PUBLICATIONS

International Search Report in International Application No. PCT/US2014/061806, filed Oct. 22, 2014.

(Continued)

*Primary Examiner* — Hosain T Alam
*Assistant Examiner* — Robert F May
(74) *Attorney, Agent, or Firm* — Saliwanchik, Lloyd & Eisenschenk

(57) ABSTRACT

A search request for content can be initiated by a user, and the content that is relevant to the search request can be identified and presented in a manner that indicates the content's trustworthiness or relevancy. The identified content can be ranked based on the number of times the content has been referenced as well as by source that referenced the content. The relevant identified content can then be displayed in an ordered list that is ordered based on the number of times the content has been referenced. In some cases, the order may be modified by the authority of the source.

40 Claims, 17 Drawing Sheets

Related U.S. Application Data

(60) Provisional application No. 62/150,650, filed on Apr. 21, 2015, provisional application No. 62/150,010, filed on Apr. 20, 2015, provisional application No. 62/149,125, filed on Apr. 17, 2015.

(56) References Cited

U.S. PATENT DOCUMENTS

| | | | |
|---|---|---|---|
| 7,526,475 | B1 | 4/2009 | Verstak et al. |
| 8,001,141 | B1 | 8/2011 | Bar |
| 8,090,717 | B1 | 1/2012 | Bharat et al. |
| 8,352,467 | B1 | 1/2013 | Guha |
| 8,392,244 | B1 | 3/2013 | O'Halloran |
| 8,417,698 | B2 | 4/2013 | Yoo |
| 8,616,895 | B2 | 12/2013 | Brown |
| 8,676,828 | B1 | 3/2014 | Agarwal et al. |
| 8,725,768 | B2 | 5/2014 | Jones |
| 8,805,814 | B2 | 8/2014 | Zijlstra et al. |
| 8,938,438 | B2 | 1/2015 | Nijer |
| 8,954,420 | B1 | 2/2015 | Khan et al. |
| 8,972,391 | B1 | 3/2015 | McDonnell et al. |
| 9,330,183 | B2 | 5/2016 | Woss et al. |
| 9,361,363 | B2 | 6/2016 | Whitnah et al. |
| 9,367,625 | B2 | 6/2016 | Raina et al. |
| 9,367,880 | B2 | 6/2016 | Raina et al. |
| 9,514,230 | B2 | 12/2016 | Raina et al. |
| 10,162,900 | B1 | 12/2018 | Chatterjee et al. |
| 10,275,531 | B2 | 4/2019 | Vittorio |
| 10,726,083 | B2 | 7/2020 | Annau et al. |
| 11,531,678 | B2 | 12/2022 | Liu et al. |
| 2002/0078045 | A1* | 6/2002 | Dutta ............... G06F 16/334 |
| 2002/0161757 | A1* | 10/2002 | Mock ............... G06F 16/24 707/999.005 |
| 2003/0040976 | A1* | 2/2003 | Adler ............... G06Q 30/0641 705/27.1 |
| 2003/0125983 | A1 | 7/2003 | Flack et al. |
| 2003/0144877 | A1 | 7/2003 | Goldmann et al. |
| 2004/0153343 | A1 | 8/2004 | Gotlib et al. |
| 2004/0162772 | A1 | 8/2004 | Lewis |
| 2005/0026131 | A1 | 2/2005 | Elzinga et al. |
| 2005/0060312 | A1 | 3/2005 | Curtiss et al. |
| 2005/0065959 | A1* | 3/2005 | Smith ............... G06F 16/9537 707/999.102 |
| 2005/0228593 | A1* | 10/2005 | Jones ............... G16H 10/60 702/19 |
| 2006/0112085 | A1* | 5/2006 | Zijlstra ............... G06F 16/438 |
| 2007/0185864 | A1 | 8/2007 | Budzik et al. |
| 2007/0255805 | A1 | 11/2007 | Beams et al. |
| 2008/0046286 | A1 | 2/2008 | Halsted |
| 2008/0208624 | A1* | 8/2008 | Morita ............... G16H 40/63 705/2 |
| 2008/0222142 | A1 | 9/2008 | O'Donnell |
| 2008/0270451 | A1* | 10/2008 | Thomsen ............... G06F 16/256 707/999.102 |
| 2009/0106799 | A1 | 4/2009 | Park et al. |
| 2009/0138371 | A1* | 5/2009 | McGee ............... G06Q 30/0633 707/E17.014 |
| 2009/0182725 | A1* | 7/2009 | Govani ............... G06F 16/24578 707/999.005 |
| 2009/0271379 | A1 | 10/2009 | Bakalash et al. |
| 2009/0281988 | A1* | 11/2009 | Yoo ............... G06F 16/24578 |
| 2010/0179828 | A1 | 7/2010 | Kelly et al. |
| 2010/0211564 | A1* | 8/2010 | Cohen ............... G06F 16/951 707/769 |
| 2010/0268552 | A1 | 10/2010 | Schoenberg et al. |
| 2010/0286993 | A1* | 11/2010 | Lovelace ............... G16H 10/60 705/14.58 |
| 2011/0004588 | A1 | 1/2011 | Leitersdorf et al. |
| 2011/0010366 | A1 | 1/2011 | Varshavshy et al. |
| 2011/0055189 | A1 | 3/2011 | Effrat et al. |
| 2011/0144908 | A1 | 6/2011 | Cheong |
| 2011/0173225 | A1 | 7/2011 | Stahl et al. |
| 2011/0212430 | A1 | 9/2011 | Smithmier et al. |
| 2011/0246468 | A1* | 10/2011 | Raines ............... G06Q 30/0603 707/740 |
| 2012/0005201 | A1 | 1/2012 | Ebanks |
| 2012/0066167 | A1* | 3/2012 | Fokoue ............... G06N 5/02 706/45 |
| 2012/0066256 | A1 | 3/2012 | Ramamurthi et al. |
| 2012/0117088 | A1 | 5/2012 | Kawakami et al. |
| 2012/0129139 | A1 | 5/2012 | Partovi |
| 2012/0221442 | A1* | 8/2012 | Olejniczak ............... G06Q 30/02 705/27.1 |
| 2012/0245952 | A1 | 9/2012 | Halterman et al. |
| 2012/0251993 | A1 | 10/2012 | Chidambaran et al. |
| 2013/0040275 | A1 | 2/2013 | Gowda |
| 2013/0095464 | A1 | 4/2013 | Ediger et al. |
| 2013/0097144 | A1* | 4/2013 | Siamwalla ............... G06Q 50/01 707/706 |
| 2013/0173639 | A1* | 7/2013 | Chandra ............... G06F 16/951 707/754 |
| 2013/0262142 | A1 | 10/2013 | Sethumadhavan et al. |
| 2013/0280682 | A1 | 10/2013 | Levine et al. |
| 2014/0006930 | A1 | 1/2014 | Hollis et al. |
| 2014/0058753 | A1 | 2/2014 | Wild |
| 2014/0108369 | A1 | 4/2014 | Nijjer |
| 2014/0122456 | A1 | 5/2014 | Dies |
| 2014/0143232 | A1 | 5/2014 | Abe |
| 2015/0111190 | A1 | 4/2015 | Vittorio |
| 2015/0154646 | A1 | 6/2015 | Mishra et al. |
| 2015/0187228 | A1 | 7/2015 | Boguski et al. |
| 2015/0248484 | A1 | 9/2015 | Yu et al. |
| 2016/0111021 | A1 | 4/2016 | Knoche et al. |
| 2016/0259858 | A1 | 9/2016 | Vittorio |
| 2019/0068659 | A1 | 2/2019 | Davar et al. |
| 2019/0325016 | A1 | 10/2019 | Nicholson et al. |

OTHER PUBLICATIONS

Office Action dated Nov. 2, 2017 in U.S. Appl. No. 14/521,149.
International Search Report in International Application No. PCT/US2016/028080, filed Apr. 18, 2016.
Office Action dated Nov. 18, 2019 in U.S. Appl. No. 15/030,817.
Notice of Allowance dated Oct. 4, 2021 in U.S. Appl. No. 15/566,977.
Notice of Allowance dated Dec. 18, 2018 in U.S. Appl. No. 14/521,149.
Office Action dated Jan. 1, 2021 in U.S. Appl. No. 15/566,977.
Office Action dated Apr. 27, 2018 in U.S. Appl. No. 14/521,149.
Office Action dated Sep. 4, 2020 in U.S. Appl. No. 15/030,817.
Office Action dated Apr. 6, 2020 in U.S. Appl. No. 15/566,977.
Notice of Allowance dated Sep. 3, 2021 in U.S. Appl. No. 15/030,817.
Notice of Allowance dated Sep. 17, 2021 in U.S. Appl. No. 14/521,110.
Office Action dated Jan. 10, 2020 in U.S. Appl. No. 14/521,110.
Office Action dated Sep. 4, 2020 in U.S. Appl. No. 14/521,110.
Advisory Action dated Mar. 24, 2020 in U.S. Appl. No. 14/521,110.
Office Action dated Jul. 15, 2021 in U.S. Appl. No. 14/521,110.
Office Action dated Sep. 26, 2016 in U.S. Appl. No. 14/521,110.
Advisory Action dated Feb. 25, 2020 in U.S. Appl. No. 15/030,817.
Office Action dated Jul. 14, 2021 in U.S. Appl. No. 15/030,817.
Office Action dated Oct. 14, 2016 in U.S. Appl. No. 15/030,817.
Office Action dated Apr. 12, 2017 in U.S. Appl. No. 14/521,149.
Office Action dated May 8, 2023 in U.S. Appl. No. 17/452,955.
Notice of Allowance dated Feb. 24, 2023 in U.S. Appl. No. 17/452,960.
Office action dated Jan. 26, 2024 in U.S. Appl. No. 17/452,955.

\* cited by examiner

CONTENT SEARCH AND RESULTS

CROSS-REFERENCE TO RELATED APPLICATIONS

This application is a continuation of U.S. application Ser. No. 17/452,960, filed Oct. 29, 2021; which is a continuation of U.S. application Ser. No. 15/566,977, filed Oct. 16, 2017, now U.S. Pat. No. 11,250,008, issued Feb. 15, 2022; which is the U.S. national stage application of International Patent Application No. PCT/US2016/028080, filed Apr. 18, 2016; which claims priority to U.S. Provisional Application Ser. Nos. 62/149,125, filed Apr. 17, 2015, 62/150,010, filed Apr. 20, 2015, and 62/150,650, filed Apr. 21, 2015, the disclosures of each of which are incorporated herein by reference in their entirety.

BACKGROUND

Searching for certain kinds of content over the Internet can be difficult because it is not easy to determine whether the content is the most appropriate for the task and topic at hand. Although there are a number of websites that sell or lend textbooks, educational content, and medical content, a search of this content is generally conducted directly using key terms input to a search bar.

Unfortunately, it is not always possible to determine which of a number of results would be the most likely one to be helpful in understanding a subject. Sometimes results are ranked according to relevancy, but the relevancy ranking may only be a function of a number of times a term is found in the text of a web page, or may be at least partly based off of user reviews, rankings, ratings, comments, or responses. If the results are provided alphabetically, then there is no way to know which is the best content for a particular situation. In some cases, there may be reviews of the content, which can help inform the decision. However, the trustworthiness of the suggestion or review may be difficult to determine.

BRIEF SUMMARY

Systems and techniques for facilitating content search and results are described. The content can be presented in a manner that indicates the content's trustworthiness or relevancy.

Example embodiments are described in which systems and techniques are illustrated in respect to several content categories, including educational content and medical content. An example embodiment is also described in which multiple content types relating to a search query may be shown in relation to one another.

A method of facilitating content search and results can include, for example, identifying a plurality of content in response to receiving a search query, identifying a number of times each content of the plurality of content has been referenced by sources of a set of at least one designated source, and generating a search result of the plurality of content that is ordered based on the number of times each content has been referenced.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
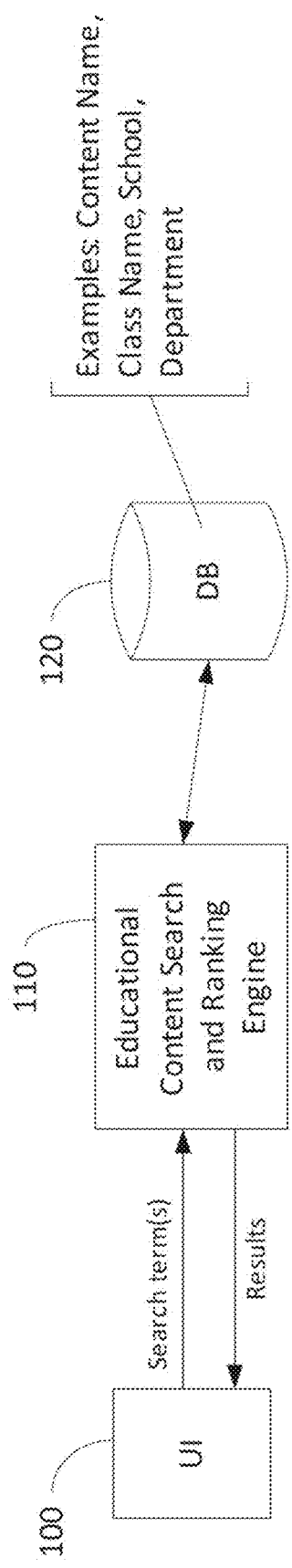
FIG. 1 illustrates an operating environment in which certain embodiments may be implemented.

Systems and techniques for facilitating content search and results are described. The content can be presented in a manner that indicates the content's trustworthiness or relevancy.

Example embodiments are described in which systems and techniques are illustrated in respect to several content categories, including educational content, medical content, library content, audio/video content, TV content, and commercial content. An example embodiment is also described in which multiple content types relating to a search query may be shown in relation to one another.

Educational Content

In embodiments describing or pertinent to educational content, systems and techniques for facilitating educational content search and results are described. The educational content can be presented in a manner that indicates trustworthiness or relevancy based on an authoritative source—for example, a school or educational organization (private or public/government) or library. The content being referenced may include, for example, books, articles, essays, course packet materials, video contents, audio contents, music contents, software contents, hardware contents, documents, writings/works/literature, course materials, and/or any other referenced contents. It should be noted that, while books are frequently used as examples of educational content herein, techniques and systems are applicable to a wide variety of educational content.

The sources referencing the educational content can include universities and other formal educational institutions such as preschool, primary school (elementary), secondary school (middle, junior high, high, community college), tertiary school (non-compulsory, university, undergraduate, graduate, post graduate, vocational), vocational school, and specialty school. Alternative education organizations and systems including homeschooling and self-learning systems may also provide sources for educational content. Sources may also include libraries, such as school or university libraries, as well as other institutional libraries or research libraries.

A school or education organization/institution may reference educational content by, for example, indicating particular content to be read, viewed, listened to or otherwise used as part of an assignment; providing required, recommended, optional or suggested reading, viewing, and/or listening; or even by the content being authored or edited by an employee of a respective school. A library may reference educational content by possessing one or more copies of the content in the library's collection.

The manner that an educational content is referenced may in some implementations affect how the educational content is ranked and/or counted. For example, certain materials may be indicated as required reading for a class (e.g., specific pages are assigned as homework) whereas other materials may be suggested as supplemental, optional or additional reading (not specifically required as part of the homework assignment). In some implementations all or a subset of referenced materials are included as part of the results. In some implementations, only the required reading materials are included as part of the results. In other implementations, only the supplemental, non-required materials are included as part of the results. In some implementations, the manner in which educational content is referenced is indicated as metadata associated with the particular content.

In some implementations, referencing an educational content may include using or purchasing the content. For example, a library may purchase a book or other educational content for its collection, and having one or more copies of the educational content in the collection may constitute one or more acts of "referencing." An educational institution may also "use" an educational content to achieve an educational goal.

In some cases, a weight may be assigned to the content (for the rankings) based on the manner in which educational content is referenced. In some cases, no distinction based on the manner in which the content is referenced is made in the rankings. In other cases, "assigned" (e.g., required as part of an assignment) may be weighted over "recommended" (e.g., not required/optional supplemental to an assignment) content. In yet other cases, a distinction may be provided between assigned material and recommended material through use of an indicator in the search results. Accordingly, it should be understood that the content ranking may be based on the manner in which content is referenced by a source (e.g., whether the manner falls into a category such as required, recommended, optional, extra/supplemental, and/or mentioned reading); and when reference is made to "referenced" content any combination of content found in a syllabus (or curriculum plan or other listing) for a particular course (or general subject) may be included in all permutations.

In some implementations, only "recommended" content is presented for a user. In some implementations only "required" (specifically assigned) content is presented for a user. In some implementations, both the recommended and the required content are presented to the user. In some implementations where both the recommended and the required content are presented to the user, the system may be agnostic about the manner in which the content is referenced and may present results in a manner as if there is no difference between content that is recommended and content that is required. In some implementations where both the recommended and the required content are presented to the user, the manner in which the content is referenced may not affect how the content is ranked, but can be indicated to the user so that the user knows whether the content was a required content and/or recommended content by a particular source. One manner of indicating the manner in which the content was referenced is to include a particular icon or indication in association with the indicator of the class, school, or other level of granularity relevant to the source that referenced the content. In some cases, faces of teachers/professors may be used.

In some implementations where both the recommended and the required content are presented to the user, the manner in which the content is referenced can affect the rankings. For example, each "required" reference to a piece of content may be weighted differently than each "recommended" reference to that piece of content. As another example, the number of required references to a piece of content may be used as a tie-breaker when two pieces of content have a same number of total references, but differing numbers of required references (e.g., both pieces of content have 10 references, but one was referenced as required 7 times and the other was indicated as required only 6 times—the remaining references being recommendations).

In some implementations, sections within referenced content can be ranked, where the referenced portions of each educational content result can be presented.

The information about educational content referenced by a school (or education organization) may be gathered from sources including, but not limited to, schools, professors, teachers, libraries, course syllabi, school websites, faculty, book stores (online and brick-and-mortar), library holdings catalogs, and even students (who relay the assignments, required, and recommended materials given by their school). A library does not have to be associated with a school or educational institution (e.g., a county or municipal library), and a library's content does not need to be educational in the traditional sense. A library can be any service or source that provides a catalog or collection of content.

FIG. 1 illustrates an operating environment in which embodiments may be implemented. Referring to FIG. 1, a user may conduct a search of educational content through a user interface (UI) 100. The search can be conducted on, for example, course titles, titles of content (e.g., book titles), text within the content, school (including department or school within a school) and/or library, degree/major title, or a combination of one or more of these categories. The areas for the search may be specified by the educational content search and ranking engine 110 (e.g., via a drop-down menu) or may include free-form input provided by the user via the user interface 100 (e.g., via a search bar).

Figure 2:
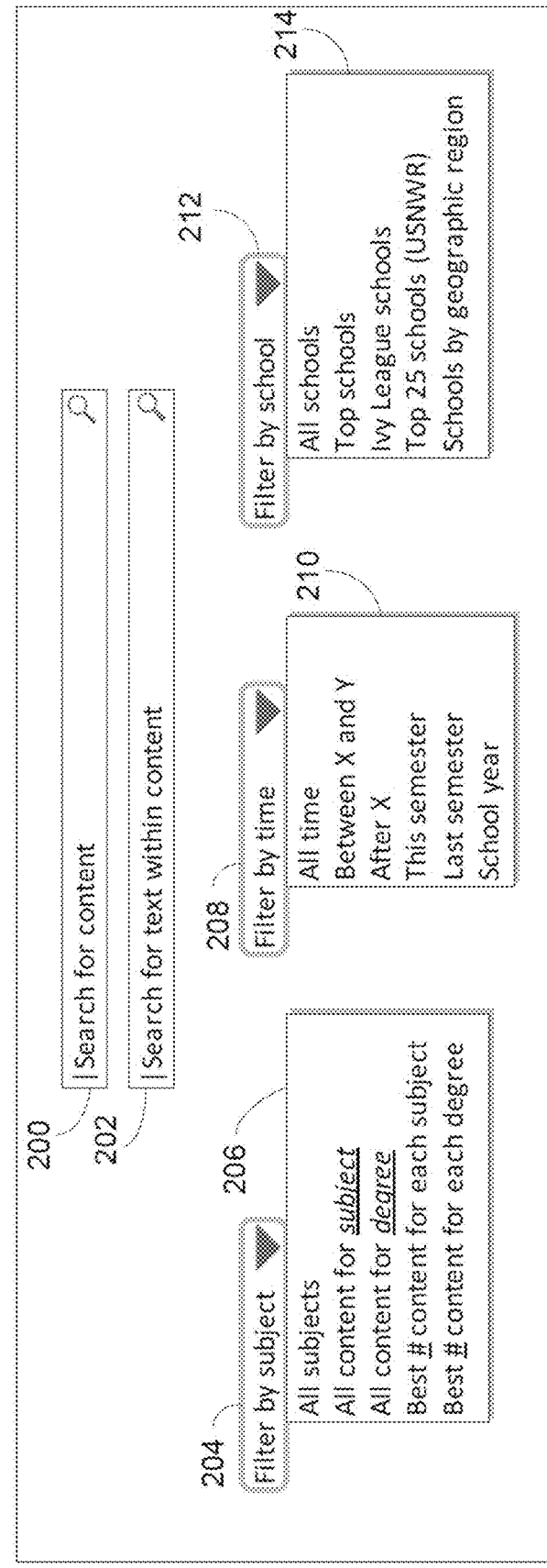
FIG. 2 illustrates an example user interface of a search page for educational content.

The user interface may include features as illustrated in FIG. 2. As shown in FIG. 2, a first input field 200 can be provided for receiving a search query for content. In some cases, a second search field 202 may be provided for searching for text within content. The search fields may be separate input fields or a single input field for conducting one or both searches. The search query may be refined by using one or more filters.

In some embodiments, when a search is conducted for text within content, the results can surface matching search terms as well as context for the matching search terms. For example, 80 words in front of and 80 words following a matching term in a piece of content can be displayed as part of the result for searching text within content. In some cases, the portions of the content that are shown first can be based on the amount of discussion related to the search query. For example, a matching word in a list may be given less prominence than sections of text containing substantive discussion related to the query. Also for example, a preview that would feature more matches of the search term(s) would be ranked above a preview that would contain fewer, and this may be a tie breaker for within content ranked previews.

In some embodiments, when a search is conducted for term(s) within content, the results can surface content (and corresponding previews when used) that contain a matching (or related) term both within the content and in meta-content, such as the prefix, index, glossary, summary, and table of contents. In some embodiments, only the pages listed from a specific table of contents, prefix, summary, or index match may be shown. In some embodiments, matches for content contained in the prefix, summary, index, glossary, or table of contents may be excluded from the results. In some embodiments, content related to the search terms may be required to be in the content and within the index, glossary, or table of contents, which may minimize the return of results that mention a term but do not relate to the appropriate topic/concept/subject. In some implementations, any matching content may be returned. Any and all content matching options may be user-selectable.

Users do not need to do a search to access the content as the content may be listed in a default or otherwise optimized manner before a specific search is entered by the user. In some implementations, an ordered listing of content can be presented on a landing page (e.g., "home page") of an educational content listing website rendered in a user's browser application (and providing a user interface to the educational content search and ranking engine). The default ordered listing may be of content for all the schools (as known from the database or other structured data stored on a resource for the educational content search and ranking engine).

For example, the schools included in "all the schools" may be through school ranking systems such as the U.S. News and World Report Best Education rankings (e.g., Best Colleges, Best Graduate Schools, Best Online Programs, Best High Schools, and the like). The home page may then show all the educational content for the top number of schools indicated by the ranking system in an ordered list of content according to the number of times that content is referenced by those schools (where, for example, each item of content is counted only once per school even where multiple courses at that school may reference the content). Specific tie-breakers may be applied to determine the order of the content when more than one item of content is referenced the same number of times. User-adjustable filters may be used to narrow the results before a search is conducted or after the search is conducted. Educational content may be, for example, books, videos, audios, and articles.

A "filter by subject" 204 can provide filtering options 206 such as, but not limited to, enabling a search of content for all subjects, all content for a specified subject, all content for a specified degree and/or major, a designated number of content for each subject (e.g., "top 10 psychology books") and a number of content for each degree (e.g., "top 25 books for a degree in civil engineering") as some examples. Filtering by one or more topics may also be accomplished.

A "filter by time" 208 can provide filtering options 210 such as, but not limited to, enabling a search of content referenced at any time, between certain dates, after a certain date, for a certain year, for a certain school year, for the present semester, for a previous semester, and a designated one or more semesters as some examples.

A "filter by school" 212 can provide filtering options 214 such as, but not limited to, enabling a search of content for one, multiple, or all schools, for designated schools such as top schools, for Ivy League schools, for the top 25 (or other "top" number) schools according to the U.S. News and World Report rankings or other rankings, and schools by geographic region as some examples.

Other filter types are also possible. For example, searches may be filtered according to educational source in other ways, including but not limited to, magnet (and/or charter) programs or schools, school districts, specialized schools, school board, school zone, and/or grade levels. Additional filter categories may be added to further filter results by type/kind/category of content, e.g., book, article, video, audio recording, multimedia contents, interactive demo, and training software. Other filters may enable searching of content by source language and/or translated language, e.g., content in Chinese and translated into English. Another filter may allow filtering of the release date of a content. In general, it should be understood that any number of filters may be selected in any filtering activity, including multiple entities in a filter type or multiple filter types. For example, more than one subject and/or degree may be selected.

In some embodiments, available filter options may be determined or dynamically redefined by prior filter selections, as for example when selection of a "degree" filter surfaces an additional filter based on different degree names. Sub-filters may, for example, further refine broader content types (e.g., novel and textbook as sub-types of book) or language (e.g. English, Spanish), or original language.

Of course other designations may be provided and even natural language queries may be used in certain implementations. Search query capabilities may include Boolean searching using Boolean operators (e.g., AND, OR, LIKE, NOT, etc.), image search, video search, advanced search filtering, and other options. In some embodiments, a photograph taken of a product, or one or more products, (e.g., of a book, medical content, or pharmaceutical) may initiate a search query. The manner and menu for applying the filter(s) or entering the search conditions may be any suitable tool bar, input field or menu for providing the information.

A degree, class schedule, or interest search may be carried out through the described search and ranking engine via a content search 200. For example, in response to receiving a request for content directed to a degree program (set using filter element 204) and a time factor like a grade level (including continuing education) (set using filter element 208), the system can provide results of referenced content to cover the referenced content from the requested grade level (or age) through completion of the degree according to the available or selected educational sources.

In some implementations, a degree audit may be provided as a filter of the educational content. The degree audit search or filter may be used as an entry point to other searches, for example, each course for the degree can generate ordered listings of educational content. A keyword search may be used or a comparison of courses for degrees from a set of sources (e.g., a set of schools). The degree audit may incorporate class name filtering/search. For example, a degree audit may return content that school(s) reference for the particular class names corresponding to the degree. In some cases, the courses may include general education requirements as well as core curriculum. The results may be further filtered according to year (e.g., what the degree courses were for a particular year) and time-frame (e.g., from what grade level to what grade level). Searches may be conducted within the results in any manner such as described herein. In some cases, the exact course names for selected schools (from the selected schools degree audits) are used to generate the results for the degree audit search and/or filter. In some cases, key words are used to generate results for the various courses expected for a degree.

It should be understood that the degrees available for the degree audit may include primary or secondary school level programming or curriculum as well as or in addition to college and university level curriculum. In some cases, the degree audit can be based on published or official school curriculum. In some cases, the degree audit can be based on what students actually took to obtain their degree (or attain graduation to a next level). Electives and minors may be included. In yet other cases, a combination of official school curriculum and student-reported courses may be used. In some cases, the user may select whether to include certain kinds or categories of courses, for example, only required courses or only recommended courses, or to include optional courses for a concentration.

Results of degree audits may include highlighting or other indications emphasizing particular content. For example, a top 10 content may be indicated covering a top content for each of 10 courses (or less courses and more content associated with the courses) so that a user may obtain a cohesive picture for the degree and possibly be inclined to view and/or purchase the content. As one example, a top 20 items for a law degree may be presented to the user; each item being a most referenced for a particular course. The highlighting may guide a user to specific subjects/topics/concepts within the general subject of law. In some cases, results of a degree audit may be organized by specific degree or subject name or by a more general topic name (e.g., specific degree of tax law or more general topic of law; a specific degree of cognitive psychology or a more general topic of psychology).

Degree audits may include any of the filtering described herein (e.g., subject, time, school, within content). Filtering by school(s) can facilitate a comparison of degree/major audits across schools. Other filters may be available, including filtering by degree, which may use same named degrees across schools along with their respective degree audits with listed class names to search all listed class names and the degree name itself, in order to return a filtered ranked list by degree. In some cases, filtering by subject may filter by class name(s) (or major or major/degree) and may be used in place of or in addition to filtering by degree. A menu may be presented so a user can select a degree and then one or more subjects. It may also be possible to filter by teacher/professor or by ranking of teachers/professors (as indicated by review sites).

Returning to FIG. 1, search terms entered via the user interface 100 are used by an educational content search and ranking engine 110 to search a database (DB) 120. The database 120 can include structured information regarding educational content. A wide variety of educational content information may be stored, some of which may support the use of filtering categories described above. The database can be generated, for example, based on the books and other content referenced by universities. Elementary and secondary education may also provide syllabi (or other course or curriculum plans) that can be used to generate rankings.

The educational content search and ranking engine 110 can use the search terms provided via the user interface 100 to identify relevant educational content from the database 120. According to certain embodiments, the relevant educational content can initially be based on a search of content title (e.g., book name) and class name (e.g., for each university). In one such implementation, all books or other content titles that have matching terms in the class names are retrieved from the database and ordered/ranked. For example, when a course name matches a query (or a selected subject), then all the content referenced for that course is retrieved for inclusion in the list. All books or other content with titles matching the query (or the selected subject) can be retrieved for inclusion in the list.

In some cases, the relationship of search terms to meta-content, including for example in an "about" section, "summary" section, "introduction" section, "forward" section, "abstract" section and the like, may be used to determine whether a book or other content should be retrieved and ordered/ranked. In some embodiments, matches for content contained in the prefix, index, glossary, or table of contents may excluded from the results. In some embodiments, content related to the search terms may be required to be in the content and within the index, glossary, or table of contents, which may minimize the return of results that mention a term but do not relate to the appropriate topic. In some implementations, any matching content may be returned. These content matching options may be user-selectable.

In some cases, search terms may be iteratively altered to further refine search results. For example, if a search term returns results that overwhelmingly pertain to one type or subtype of content (e.g., a search term returns twenty results from "Law" degree content and only one from "Psychology" degree content), the search terms may be altered by the educational content search and ranking engine 110 to adjust the terms to be more directed toward a different content type or subtype. As a further example, if a user's search terms or filters are too restrictive (or too broad) and do not provide a sufficient amount or range of content, the search and ranking engine 110 may adjust the filters, for example by changing a filter selection to a broader category (e.g., top 25 universities instead of top 10 universities). The engine 110 may also modify the search terms by removing restrictive words, or broaden it by including important terms within the search result content. It should be also noted that this iterative or "reloop" searching technique may be applied not only to educational content, but to other content types described herein (e.g., medical, audio/video).

The identified educational content can be ranked by the educational content search and ranking engine 110 based on the number of times the content has been referenced. The university or other educational institution that referenced the educational content may also influence the rankings (through filtering and/or weighting the number). In some implementations, the number of references to a particular educational content item may be counted per university, per class name, and per department, for example. In some implementations, the number may also be tabulated according to class terms, for example, per year, per semester, per quarter, and per course module.

The relevant identified educational content can then be displayed at the user interface 100 in an ordered list that is ordered based on the number of times the content has been referenced. The ordering scheme for the list (e.g., least to most, most to least) may be user-selectable with a configuration setting, filtering, or sorting option in some implementations. In some cases, an indication of the number of times the content has been referenced can be provided.

In one embodiment, an initial search query may not be through the UI 100 and, instead, is a result of the request from a web browser to return information from a website (providing the UI 100) at a particular uniform resource location (URL). For example, when a user enters a URL in their web browser to go to the website specifically covering the topic of psychology, the hypertext language protocol (HTTP) request for the URL can initiate a query (e.g., based on a default search query in the string or as a field of the request) by the search and ranking engine 110 and those results can be rendered in the web browser as a default result list that can be part of the UI 100 before a user enters a specific query.

Figure 3A:
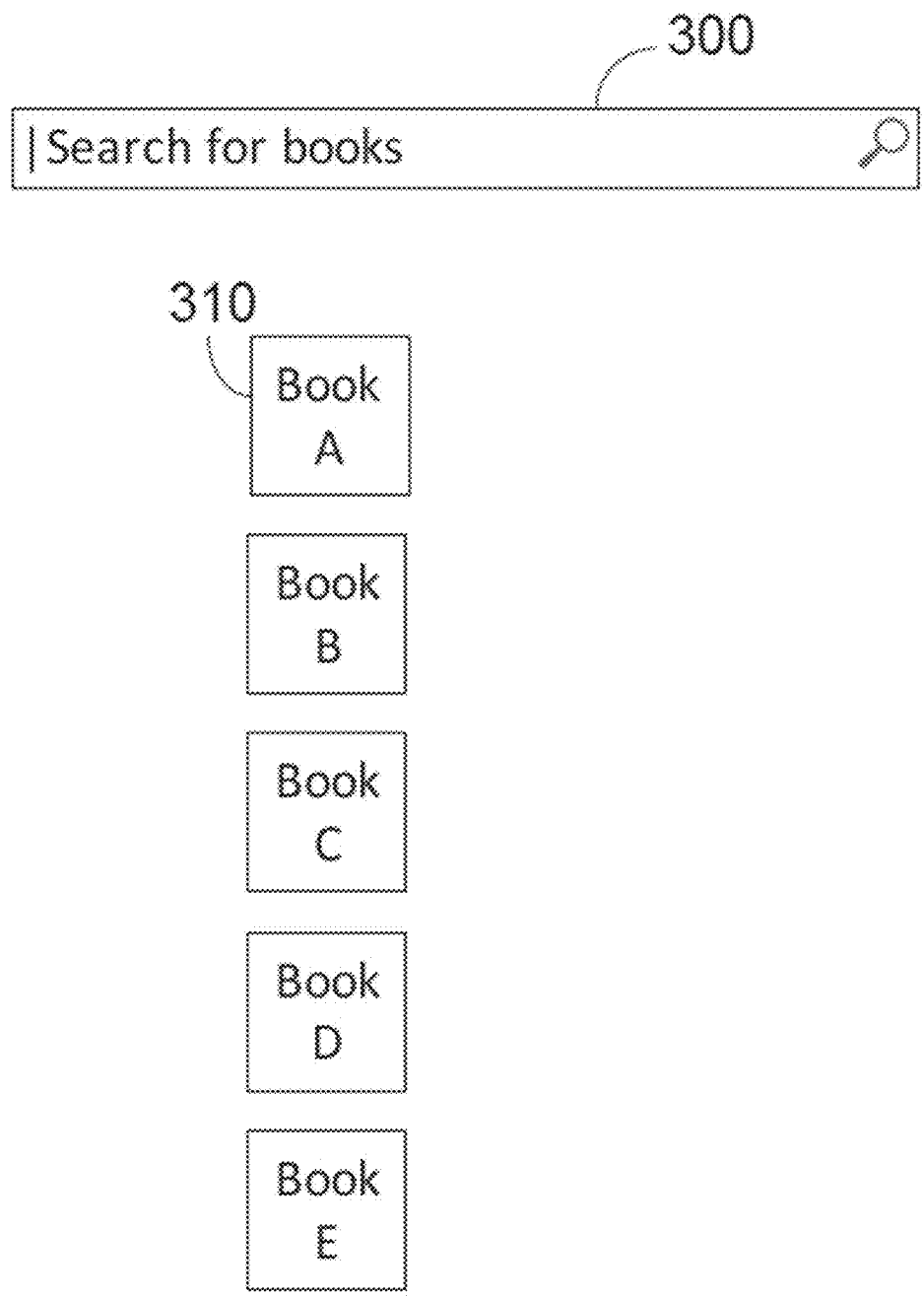
FIGS. 3A-3E illustrate example search result ordered list presentations.
Figure 3B:
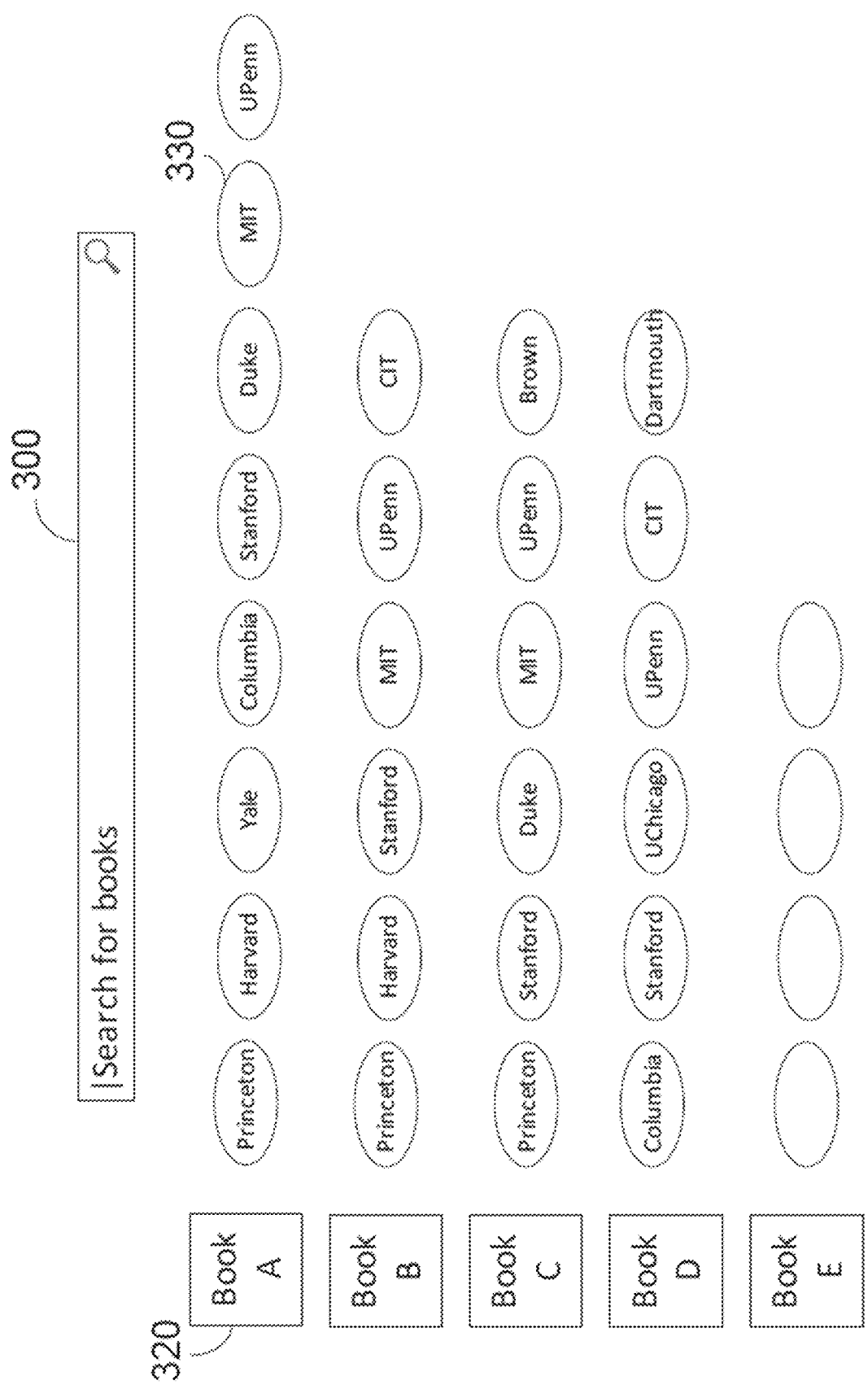

FIGS. 3A and 3B illustrate example search result ordered list presentations. Books are used as exemplary educational content in FIGS. 3A-3B, but should not be considered as limiting. In response to receiving a search query in the search input field 300 of a user interface, an ordered listing of books can be displayed. In FIG. 3A, the books 310 may be presented in a list from most referenced to least referenced. Additional filters (such as shown in FIG. 2) may be applied to further narrow the listing. Results of the search can be presented with indicators of the number of schools that referenced the book, a specific indicator (e.g., a badge or icon) for each educational institution (or subdivision or entity, such as professor name, department name, class name) and other information that can support the ranking of the book (e.g., provide information regarding the relevancy) and/or provide additional information that a user may use to select a text or obtain additional information.

For example, referring to FIG. 3B, the books 320 may be presented with an indicator 330 of the schools that referenced the book. In one implementation using an indicator (e.g., icon or badge) for a particular school that referenced a book, the indicator may be used only once per book even if the book is referenced by multiple courses at the school. Thus, each indicator represents that a school has referenced the book at least once. In another implementation, the indicator for a particular school that referenced a book may be used to represent each reference of the book so that multiple indicators for that particular school may be shown for the referenced book when multiple courses at that school reference the book. In another implementation, a counter may be displayed on the school indicator to indicate the number of times the book was referenced.

As mentioned above, results can be filtered. In one scenario, the results are filtered by school or a select grouping of schools. For example, the results can be filtered to show rankings based on Ivy League schools, by schools in a particular geographical region, by user-specified school or schools, by a top number of schools (as ranked by a school ranking system), or other school-related configuration.

As illustrated in FIG. 3B, each book includes an indicator of the university referencing the book. The indicators can be presented in order of the university's ranking on the U.S. News and World Report, or other university ranking system. Of course, it is contemplated that educational content from systems other than universities may be presented in addition to or in place of university-referenced content and that other schools may reference similar content as universities. Rankings for those schools and related organizations may be used in a similar manner as university rankings.

Within the results, when multiple content (e.g., books, articles, videos) in the results have a same number of sources that reference the content, the content having a same number of sources may be presented in alphabetical order. In some cases, the ranking order of tied results may be presented based on a ranking system of the schools that reference the content, such as the U.S. News and World Report. Of course, other university (and other school) ranking systems may be used. As an illustrative example, the results can be first ranked by grouping together books according to the percentage of schools that have referenced the book. Then, for ties within the same ranked books, the books that have a book title that matches key word(s) of the search may be presented first or the books that have the most class name matches to the key word(s) of the search may be presented first.

"Most class name matches" may be determined multiple ways. For example, every school with at least one class name match could count once and only once; then a ranking can be made between the schools to generate a school's class ranking within a named class ranking. As another example, across the board class name matches can be counted for the book as looked at across all schools referencing it. As yet another example, duplicate class names within a school would only count once. Of course, other tie breakers may be used.

Further ties may be broken by the average ranking of the source by a ranking organization. For example, the U.S. News and World Report rankings of the schools referencing the book may be utilized. If ties still exist, they might be broken by the highest ranked individual school of the tied books, and ties still there can be broken by the ABC order of the book titles. As another example, professor ratings, for example from a service such as "RateMyProfessor.com," might be used as to break ties. For example, the content with the highest average professor rating may be ranked here, or the content with the single highest ranked professor.

Other non-limiting examples of tie-breaking methods include incorporating user reviews or ratings of content (where content have a 5 out of 5 star rating would be listed before content having a 4 out of 5 star rating).

In some scenarios, when multiple books have a same number of sources referencing the book, then these books can be ranked according to title first (e.g., percentage of key word(s) found in the title), and then by text within each book (the percentage of key word(s) or the number of times a term or topic is found within the textbook or within pages of the textbook that have been referenced). Books may also be ranked based on class/course name. For example, a school may have different courses that reference a same book. The search results can return books that are referenced to class names that are associated with the keywords of the search. If ten books are referenced by 5 schools each, these ten books can be ranked in alphabetical order of book title. In some cases, the books can be ranked by a combination of most relevant book titles and most relevant course titles (to the keyword(s) of the search), book title only, or course title only.

In addition, one or more tie-breaking methods may be applied to the listings of the results where a first tie breaking method does not break all the ties. As a non-limiting illustrative example, for ties within the same ranked books, the books that have a book title that matches key word(s) of the search may be presented first. Then, for the books that are tied for a same position, the books that have the most class name matches to the key word(s) of the search may be presented first. The books that have the most associated class name matches to the key word(s) may determine the next ordering both within the matched book title group and outside of the matched book titles group. Ties within these groups may next be broken by averaging the U.S. News and World Report rankings of the schools that referenced the books; higher averages can be listed before those with lower averages. For remaining ties, the highest ranked school that referenced the books can be used to order the books. Then, if there still remains a tie, the ABC order of book title may be used.

However, indicators may show other ranking criteria for educational content. For example, professor name, class name, major, minor, degree, and department indicators may be shown in some cases, depending on the criteria for ranking. In some cases, more than one type of indicator may be shown, and the indicators may be grouped by type. Groups of badges may include, for example, groups for the schools, professors, and classes using the content.

Figure 3C:
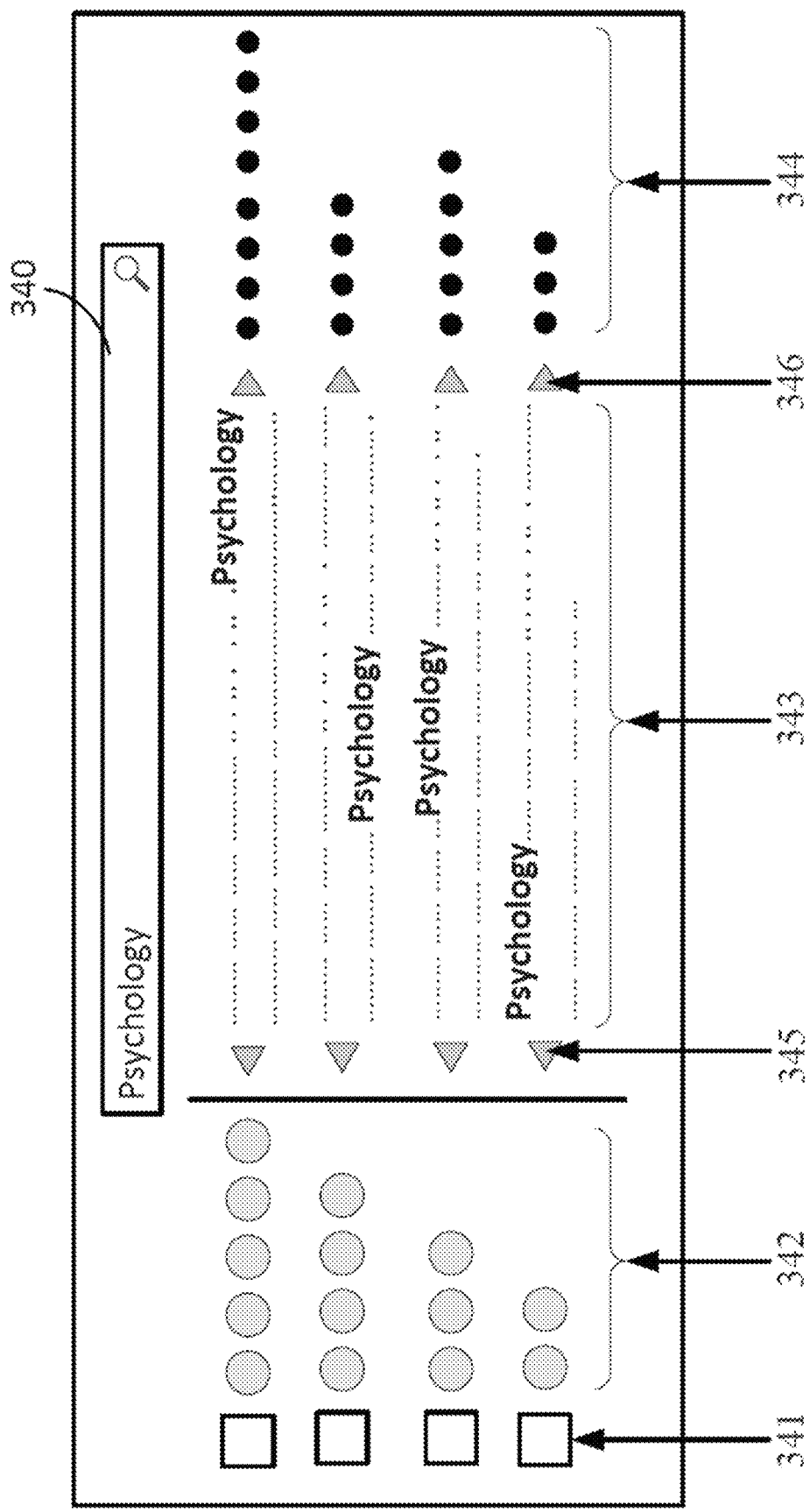

FIG. 3C shows an example ordered search result list presentation that may be used in some implementations. An interface is shown in FIG. 3C that contains both ranking information and the ability to navigate the textual content. The results for an example search of content related to "psychology" 340 are shown. A line in the result list shows a particular piece of educational content, such as a book or article. An area for depicting a visual icon of the content 341 may be available, as are ranking indicators 342. Reflecting the fact that ranking indicators 342 may be of multiple types and groupings, as discussed, the ranking indicators 342 are shown here without specific content, unlike as in FIG. 3B.

Textual content 343 may also be navigated within the search result presentation. One or more page locations, depicted by locator icons 344, may be shown. In the figure, locator icons 344 show pages in the educational content having the search term "psychology." Selecting a locator icon may navigate the textual content 343 interface to the location in the content having the search term. Here, the textual content 343 interface shows "psychology" and a number of words in the text around the term. Navigation arrows (345, 346) may be available to move forward and backward within the text. In some cases (not depicted in FIG. 3C) a translation of content may be displayed as part of a results interface.

Figure 3D:
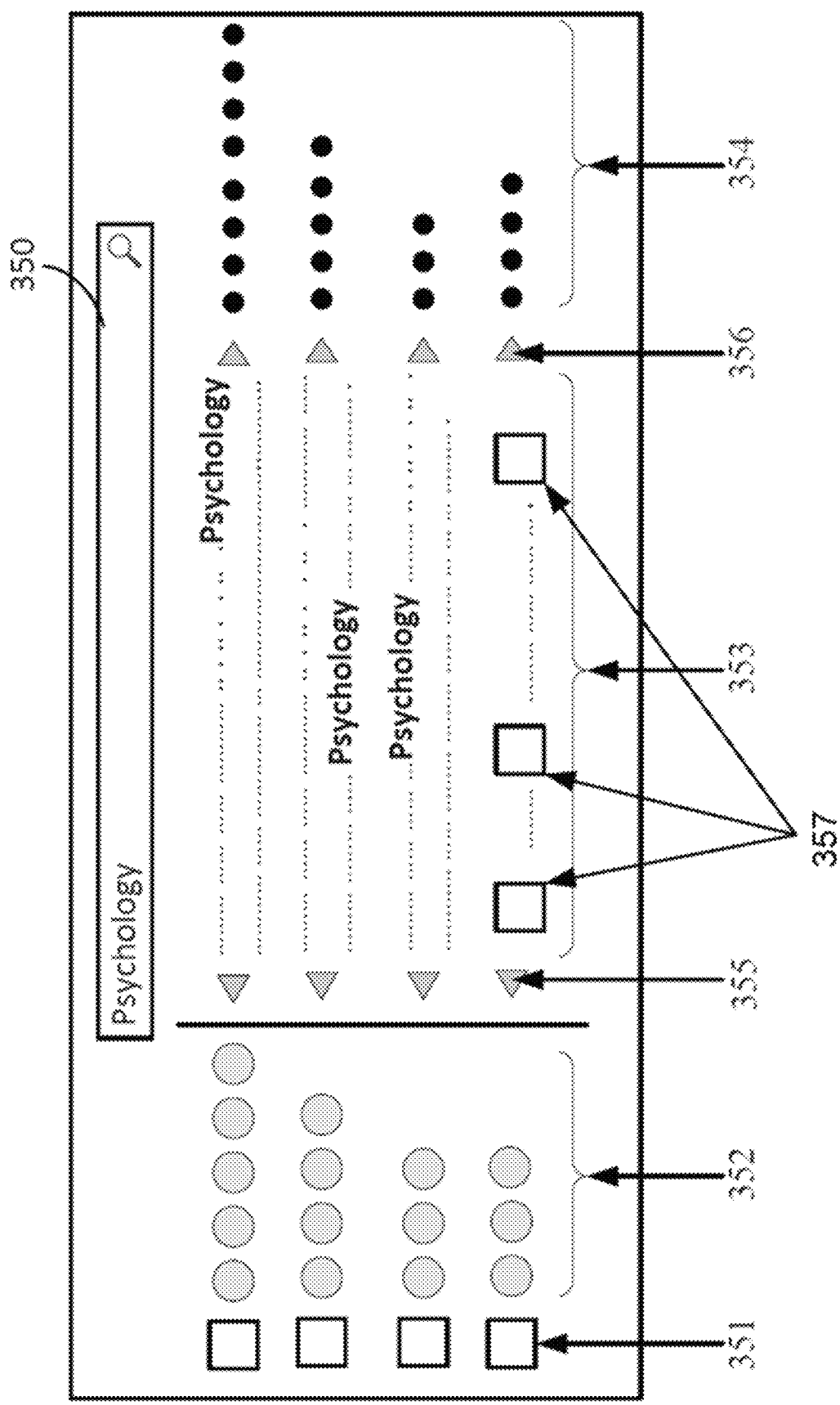

FIG. 3D shows a variation on the interface of FIG. 3C, where textual content is replaced by audio or audiovisual content. In FIG. 3D, one of the returned educational content results is a video. Familiar elements such as an icon 351, indicator badges 352, content review area 353, locator icons 354, and backward and forward arrows (355, 356) are shown, as in FIG. 3C. However, in the video content review area 353 for the video content, video clip segments are depicted using clip segment indicators 357. The clip segment indicators 357 may enable easier navigation to review the assigned time segments for a video type of educational content. As the interface in FIG. 3D shows, it is possible to navigate mixed content types in an example interface having these characteristics. In regard to, for example, FIGS. 3C and 3D, the number of matches within the content (344, 354) are not necessarily indicative of or determinative of the rank order of content.

In some embodiments, point of content indicators, for example, can comprise, for example, content previews of the respective points of contents. In some embodiments, for example, a point of content indicator, for example, can comprise, for example, a content preview of the respective point of content; for example, a book, article, video, or audio match could be used. In some embodiments, only transcripts, for example, video or audio transcripts, are comprised therein, but in other embodiments, for example for a video content, there can be the video side by side the transcript (or just one or the other; the user can control for anything, the default can be anything), comprised within the point of content indicator. In some embodiments, for example for video or audio, all of the point of content indicators (or e.g., just some of them, or e.g., just one of them), can start playing automatically, for example on silent/mute, or for example, the user can start (or, e.g., stop, or turn sound on) all or some or one of them at any time. In some embodiments, the user can control for anything. In some embodiments, the default can be anything.

In some embodiments, for example, the user can control to, for example, have the number of, for example, matches within tied contents break tie(s) (and/or e.g., have, e.g., books win ties with videos (or vice versa)). In some embodiments, for example, the user can control for what breaks ties first, what breaks ties second, what breaks ties third, etc.; for example, the user can control to weight video content more than book content (or vice versa), and in some embodiments the user can control the weight, for example making video content references count twice as much as book content references, or three times as much (and/or, e.g., making book content references count twice as much as audio references); and, for example, some of the foregoing can be used in conjunction with one another, for example, the user can control for video content references to count twice as much as book content references, and if there are two tied contents wherein one is book and one is video, have the video win the tie, for example.

In some situations, it may be desirable for a user interacting with the user interface 100 to select individual items of content from a listing of search results so that several content options may be narrowed, compared, or searched further. The additional selections of content may form a user-created list of results that may then be searched and/or ranked further. For example, if a search of "psychology" returns a listing of content from several classes that include "psychology" in the title, only some of the content may be relevant to the user if the user only wants basic psychology content. The user may select the content that seems to fit his or her desired content. In some embodiments, the user's selection of content may form the basis for a user-defined result list that displays ranking information with respect to only the user's selected content. Some embodiments may enable additional searches by the user with respect to only the selected content. Some embodiments may allow the user to execute a function to find additional content using the selected content as a model for the search and ranking engine.

Figure 3E:
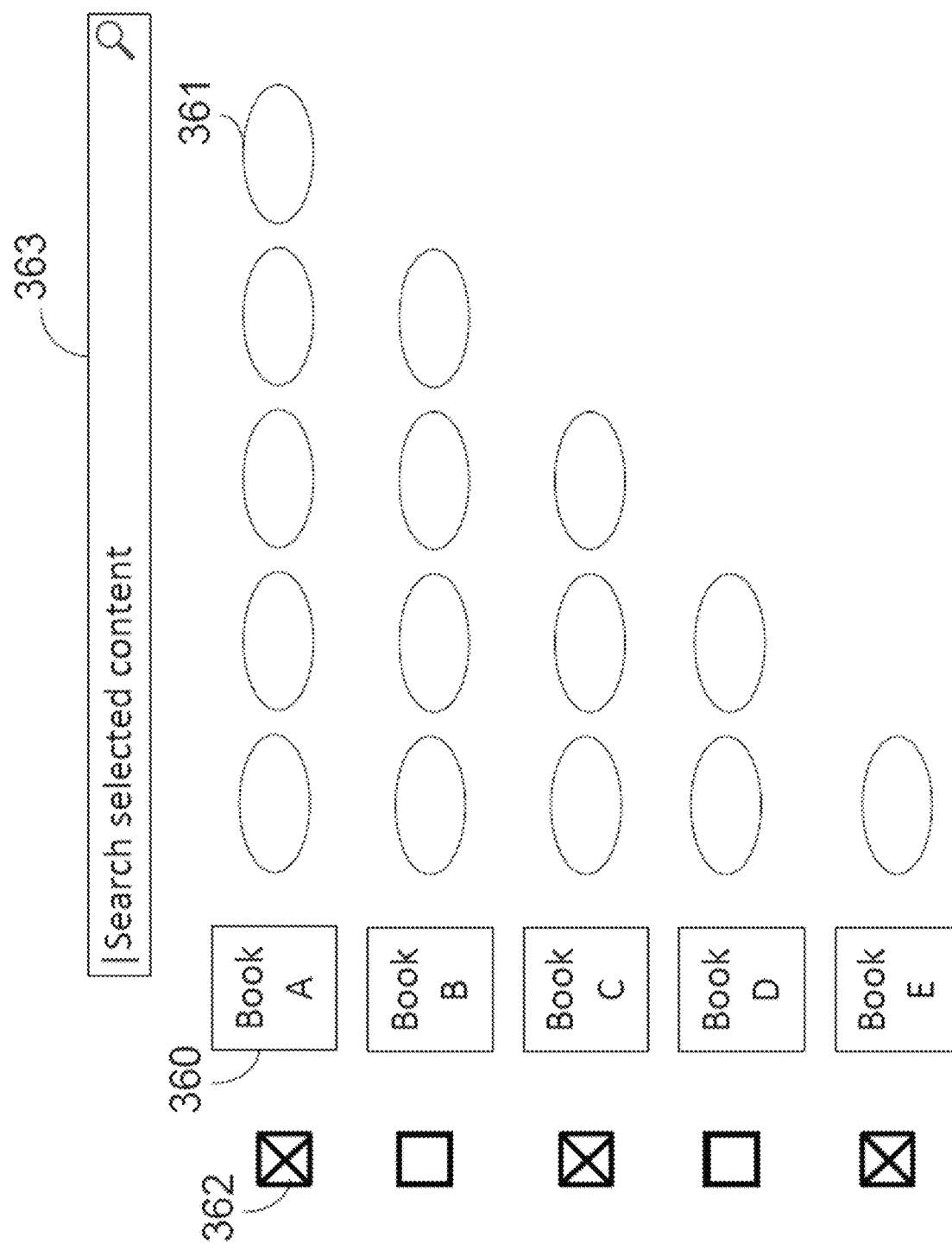

FIG. 3E shows an example of an embodiment that allows further selection of search results. In FIG. 3E, educational content 360, which may in some embodiments include ranking indicators 361, may be individually selected from the search results using additional interface elements. Checkboxes 362 are shown as examples of interface elements that may allow selection, but various kinds of interface elements may be used, as practitioners will appreciate. Selection of the results by the user may allow the user to create a secondary list that may then be ranked against one another using the described techniques. Additional interface options, such as a search box 363, may also be available to run searches against only the selected content items.

Figure 4:
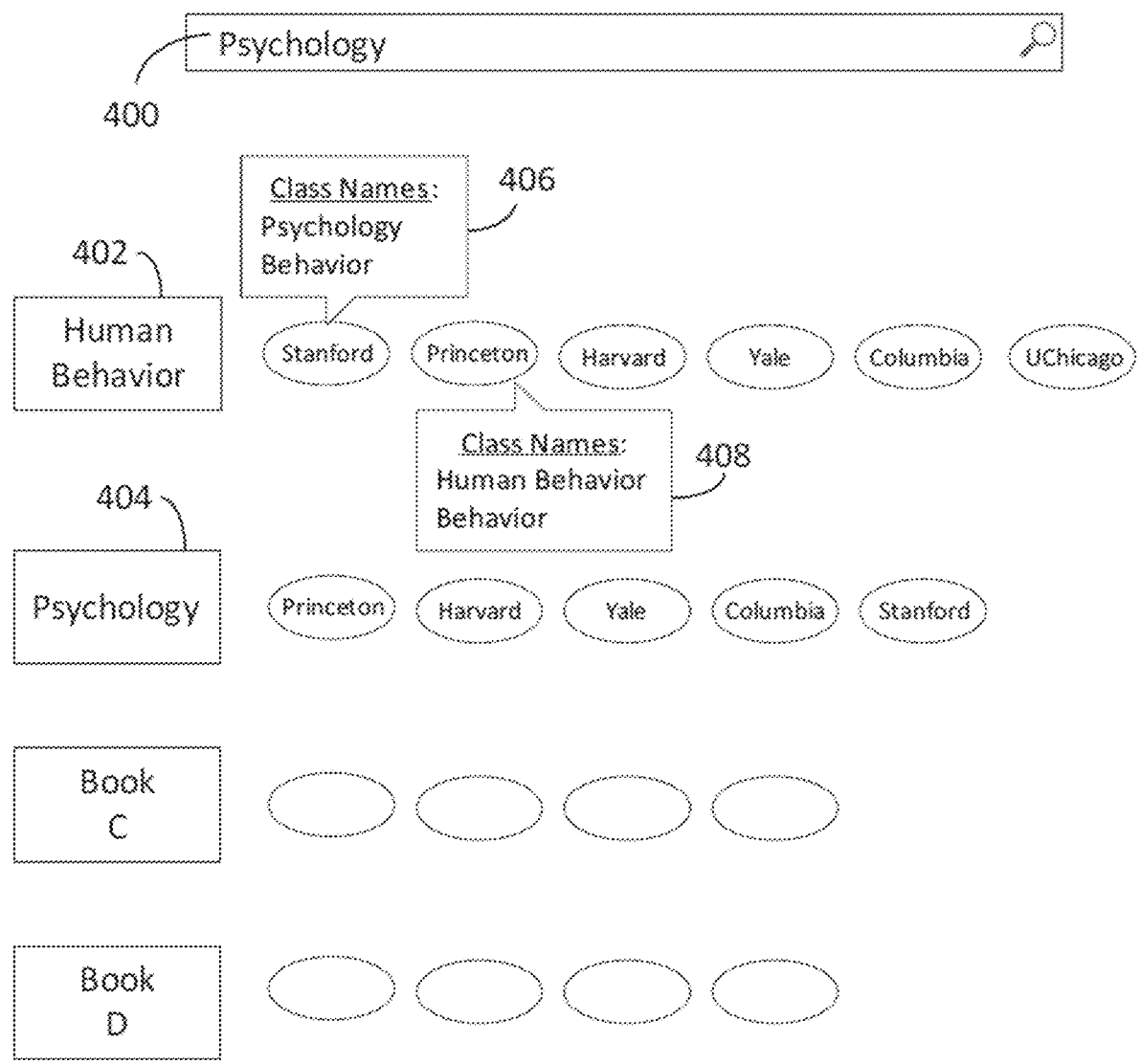
FIG. 4 illustrates an example search result.

FIG. 4 illustrates an example search result for a search of "psychology." For example, a user may enter "psychology" as the search query. The system then searches the database (or other structure such as a table) for books associated with "psychology." From the books associated with psychology, the most referenced books associated with a set of sources, for example 50 schools, can be presented in order from highest number of references to lowest number of references. The results can include a book titled "Human Behavior" 402 and a book titled "Psychology" 404. In the illustrated example, school indicators are included to show the universities that assign or recommend the book. For the book "Human Behavior," Stanford, Princeton, Harvard, Yale, Columbia, and the University of Chicago have all referenced the book.

In this FIG. 4 example, class titles are searched first, and then book titles. Other implementations may take a different order. The book "Human Behavior" is identified (along with other content) from a search of class titles with the term "psychology" because Stanford includes a class name of "Psychology" 406. Indicator popups (406, 408) may show additional information about the selection criteria for an indicator ranking, for example, by showing the class names for which the educational content was chosen. In the figure, for example, the indicator for Stanford is shown before the indicator for Princeton even though Princeton ranks higher on the U.S. News and World Report ranking because one of Stanford's class names matches the search term, whereas Princeton's class names 408 for classes that reference the text book "Human Behavior" do not include the word "psychology."

Other information may be displayed in indicator popups 406 and 408. For example, indicator popups 406 and 408 may show professor names, professor rating metrics or scores, class names, educational source names, department information, major information, degree information, minor information, page citation counts, or other information that may be used to understand the basis for ranking indicators. The content in indicator popups 406 and 408 will, of course, vary by the nature and type of indicator used shown in the results presentation.

In some implementations, the ranking of a group of content results may be determined by the relative number of indicators on the individual content items. In some implementations, the ranking of contents may be determined by a calculation of rank points that may be assigned irrespective of the number of indicators displayed. The rank points assigned to an indicator may be user adjustable or adjustable according to a rule. For example, if content A has multiple indicators for school X, because school X references content A multiple times, it may outrank content B, which has been referenced by several schools, but has fewer indicators overall. In some implementations, rank point assignment rules may result in different rankings that are unrelated to the number of indicators displayed. For example, in one configuration of a rule, a particular content may receive only one rank point regardless of the number of times a single school has referenced the content, even when the search results interfaces shows all the indicators. In another example, a single indicator for a referencing source may be displayed even when the source references the content multiple times, e.g., one indicator for the school even when multiple professors may assign the content, but the single indicator may receive multiple rank points. In some cases, a counter or other marking may be shown on the indicator to display the number of rank points added by that indicator. In another example, a "recommended" content may receive a lesser weighting (e.g., 0.5 rank points) than a "required" content such that a content with fewer indicators but more required references outranks a content with more indicators but more recommended references. The system may apply default rules in certain cases, and the user may vary the default rules settings and/or alter the rule dynamically during a particular search. It should be noted that methods of assigning rank points to indicators, while described here with respect to educational content, are applicable to medical content, library content, audio/video content, commercial content, and TV content rankings examples and embodiments.

Figure 5:
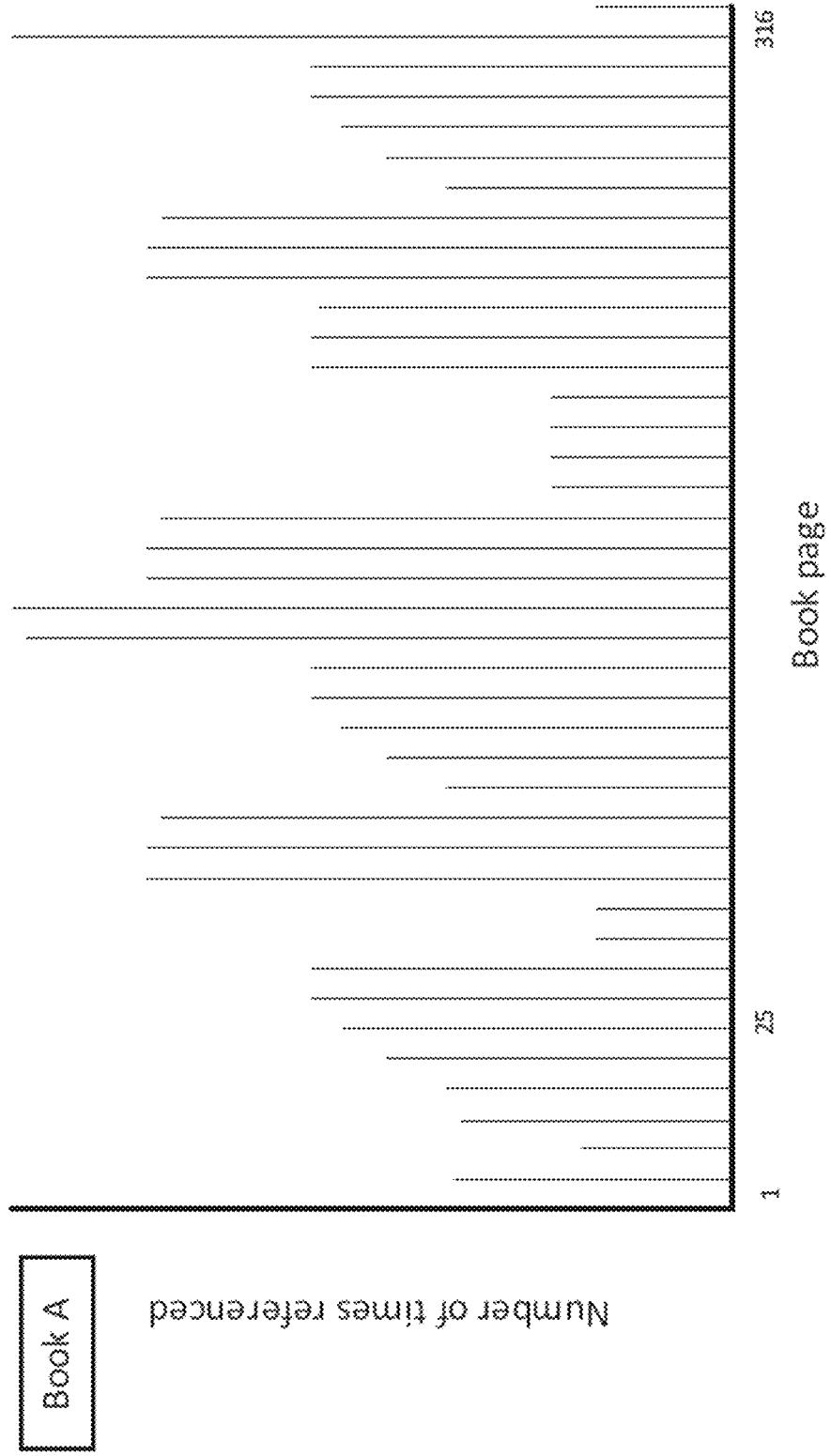
FIG. 5 illustrates an example user interface including a page graph.

FIG. 5 illustrates an example user interface including a page graph. In some implementations, additional information about referenced sections/chapters/pages of the text can be presented. FIG. 5 shows one manner of presenting information about the referenced pages, where a plot illustrates the number of times a page is referenced as part of the reading for a class (and across all classes or selected classes referencing the book). In some implementations, an independent page number on the graph can only go up/increase in relevancy in regard to being referenced, once per school, so as to make identical page references from a single school only count once while allowing different page references from classes within the same school to count. Then, when a separate school also references the page that has already been increased on the graph, the graph increases in relation to that page number of the book. In another implementation, the graphed page number(s) go up every time a non-identical class name within an independent school references the page(s). Different schools with a same named class are each counted, which allows for identical class names from separate schools to increase the page count on the graph.

In some implementations, a content graph may depict timing ranges in a video, audio, or other recording. The graph could show minutes or seconds rather than pages, if minutes are relevant to the content type. For example, if a class is assigned to watch a particular range of minutes in a particular video, the ranking would be increased for each class referencing the minute range. The count might be visually depicted using a graph similar to the page graph, but showing minutes or seconds instead of page numbers.

In some implementations, a page graph like the example shown in FIG. 5 may be presented in conjunction with other user interface elements so that, e.g., page graph information may be compared between educational content. For example, a page graph may be displayed as an interface element of FIG. 3C for each returned educational content.

Figure 6:
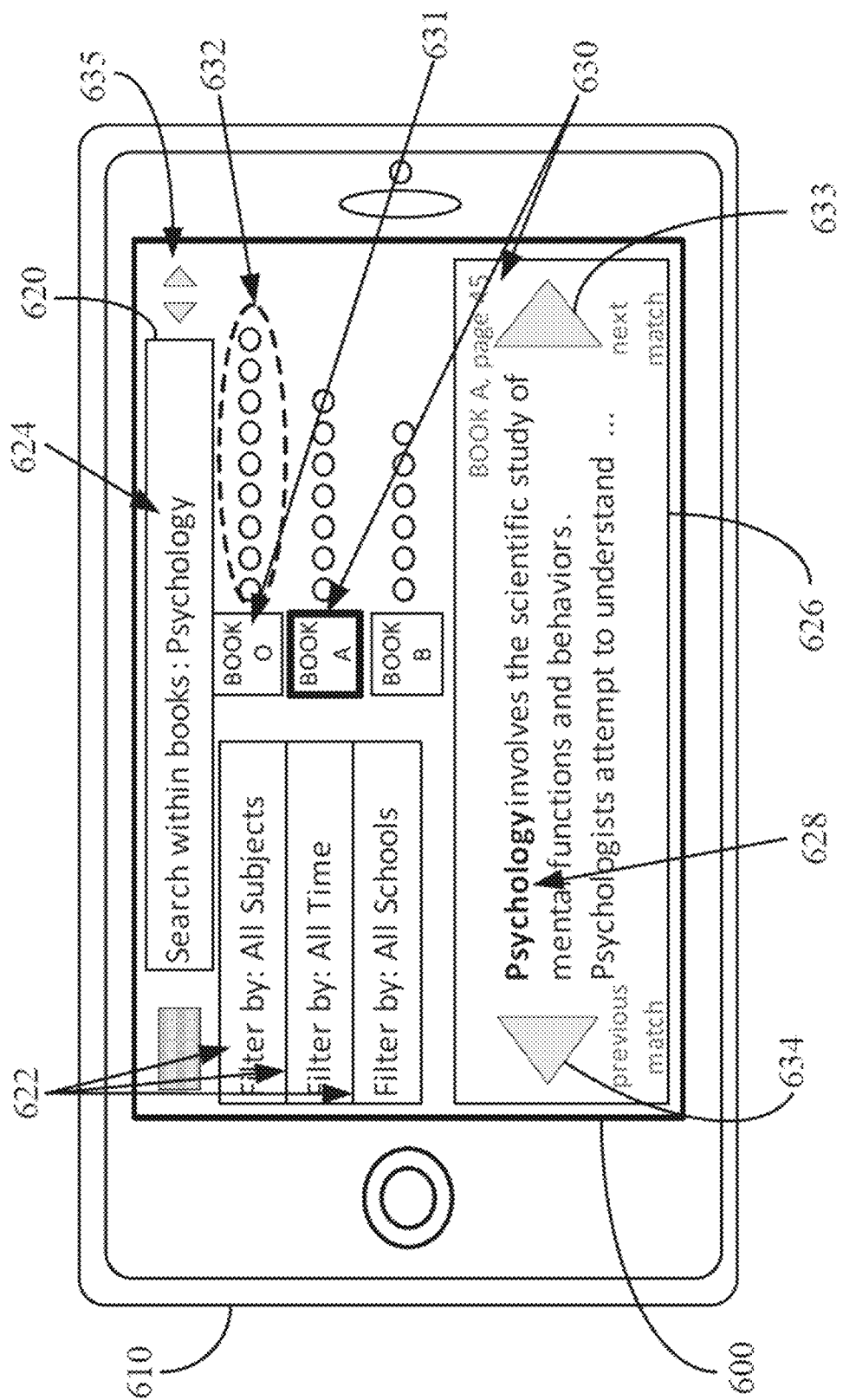
FIG. 6 illustrates an implementation of a user interface for small form factor devices.

FIG. 6 illustrates an implementation of a user interface for small form factor devices. Referring to FIG. 6, a user interface (UI) 600 for the educational search and ranking engine is shown that is suitable for a touch screen device 610, such as a smartphone. The UI 600 may include a search bar 620 and optional filters 622. Although three filters 622 are shown, these filters are presented for illustration and are not meant to be limiting in types (what is being filtered) or in number of available filters. In the example shown in FIG. 6, a query to search within books for "Psychology" 624 has been entered into the search bar 620. This screen may be in a state after a search for matching word(s) within a book has been conducted. A previous screen may be a home page that includes an ordered ranked list of all available content or a subject-specific (e.g., the subject of "Psychology") screen with a listing of content related to that subject. Of course, the page shown in the figure may be the originating screen.

In some cases, when searching within books, the UI 600 can include a preview 626 of the book(s) providing relevant text. For example, the matching term "Psychology" 628 from Book A (630) may be indicated along with a portion of the text around the matching term to provide context before a user selects to view the book 630, access more information about the book, or view another section either within Book A 630 or another book containing a matching term. In the example shown, a listing of books is also shown on the same screen as the preview 626. Here, three books, ranked according to any of the techniques described herein, are shown. Book O 631 has the most references (indicated by icons 632 representing the schools referencing the content), followed by Book A 630. After the user conducts a within-the-book search, the within content word match(es) with the highest ranking may be shown. The user may navigate through the content by selecting a next match 633 or previous match 634 for the preview 626 and/or by selecting a book from the ranked listing of books (either directly by selecting on the book icon or by indicating a next or previous (635) book.

In FIG. 6, and in all content embodiments or within content preview embodiments and the like, there can be arrows that traverse to next or previous page, arrows for traversing to next or previous ranked page, arrows for traversing by matches of the content based on page rank of matches (in some embodiments, navigation may start at the top of a page when there are multiple matches on same page or preview) and arrows for traversing by matches of the content front to back. In some embodiments, arrows may not be required and changing preview may be navigable like pages in a book, or traversed by rank of pages regardless if there is a match or not. Some implementations could have arrows that allow for next or previous page or traverse pages based on rank of page regardless of if there is a match on the page, or implementations wherein both can have arrows for both methods of traversing represented simultaneously.

Furthermore, an embodiment with content preview may have a variety of user configuration capabilities for controlling the behavior of the preview traversal. For example, user configuration interface elements may allow the traversal arrows to traverse the content by term matches, by rank, or from front to back through the content. In some cases, the user may control whether, for example, the matches of content are also listed in the table of contents, index, glossary, etc., as noted with respect to FIG. 1.

In some embodiments, for example, the user can control to have a search result comprise, for example, descending ranked previews (or other within content embodiment(s)/ within content preview embodiment(s) (e.g., FIG. 6), which can do the same or similar) wherein each of the initial search result descending ranked previews presented for a search result comprise, for example, the top ranked matched page (or time, e.g., for a video or audio), or the first to the front matched page/time. Furthermore, the user can control to have, for example, only contents with a table of contents, index, or glossary (and/or the like) match, to be identified (e.g., can be for within content embodiment(s) and/or for content embodiment(s)), and this can be in conjunction with the foregoing, and/or the like, and/or otherwise (and/or similar can be done with, e.g., video content or audio content, e.g., requiring a match to a written description, summary, outline, etc, in order to identify the content (or, e.g., identifying only contents that do not have a match)). Moreover, the user can control to have, for example, only pages listed from a match (e.g., from a table of contents match), to be used for initial descending ranked previews (and/or, e.g., for traversing) for a descending ranked previews embodiment. In still other embodiments, the user can control to not allow initial search result previews to comprise a preview of, for example, a matched page of the table of contents (and/or the like, e.g., acknowledgments, index, glossary, summary of contents, dedications, outlines, summaries, etc) that is matched. In still other embodiments, the user can control to not allow contents with a, for example, table of contents, index, or glossary (and/or the like) match, to be identified, or even further still, to have that side-by-side another result that requires, for example, contents to have at least a table of content, index, or glossary match, in order to be identified.

In some embodiments, for example, the user can control to have, for example, two (or more) side-by-side search results presented simultaneously from a single search query (e.g., wherein some can be applying different filter(s), technique(s), and/or method(s)); for example, a single search query can return a result wherein two results that are independent of one another are presented side-by-side one another, e.g., having a search box for each result so each can be independently executed, and a search box (e.g., at the top) that executes both (or all) side-by-sides simultaneously, for example, wherein one result comprises a within content result, for example descending ranked previews, and the other result comprises a for content result.

In some embodiments, for example, the user can control to have, for example, a video-content-only result side-by-side a book-content-only result. Moreover, for example, the user can instead (or additionally) control to have a result comprising both. Further still, in an implementation comprising, for example, all three side-by-sides (e.g., one video only, one book only, one including both mixed in a single result), a single execution from a single search box may execute all side-by-sides simultaneously, while additional search boxes (and/or filters, etc.) for respective results/sideby-sides, allow for, for example, independent execution of a single result.

The systems described herein may be carried out in a manner that facilitates free (from a user perspective) consumption of the content. While educational content (i.e., a book) is described in the example below, it should be understood that techniques described below for free consumption are applicable to various kinds of content, for example, an audio/video, article, online course, and medical content.

For example, in some implementations, a search within text of a book or other educational content can be provided for free to users by paying the content provider(s) (e.g., the copyright owner or publisher) a percentage of the ad revenue that is derived from advertisements shown when a user "opens" the book via the search within a book. The position/ ranking of the book or other content on the list may also affect the payment. In addition, the type of content (e.g., video, book, article) may affect cost. Other considerations that can affect cost include the popularity of a piece of content, whether a specific piece of content is selected by an advertiser or a grouping of content is selected, and length of advertisement.

A user may be able to traverse text through a command indicating a request to view a next relevant location, for example by clicking on a button (e.g., via touch or mouse) or by voicing a command that brings the user to a next or previous place in the book that matches the search or to the next or previous most referenced book that has the text match within the text of the book, which will enable the user to search within the text of all books for free. In one embodiment, the user can be presented/engage with only the page on which the text matches as well as the pages before and after the matching page. In another case, the user may access the text of a book for a period of time, for example 30 minutes, before the user is presented with another ad. Another advertisement may be shown at each 30 minute interval. The cycle may begin again for each book (or other content) that the user views. Alternatively, the advertisement interval may be per user time, resulting in the user being able to view any content and receiving an ad every 30 minutes regardless of the particular piece of content that the user is viewing. Time spent viewing a particular piece of content can still be tracked to facilitate the determination of the amount being paid to a content provider for access to the content.

In another case, the user may access the text of a book until a specified number of pages have been viewed. Then, the user would be presented with another advertisement if they want to keep reading within the text, and the cycle may be repeated. When a user "opens" another book, a new ad can be run, allowing the user to view a specified number of pages before another advertisement is shown. Alternatively, a user may be given a set number of pages that they may access after viewing an advertisement so that they may view any number of books (or other content) until the set number of pages (regardless of being different books or content) have been viewed. Pages viewed at a particular piece of content can still be tracked to facilitate the determination of the amount being paid to the content provider for access to the content.

Advertisements may be of different lengths and types. In some cases, the first advertisement to which a user is exposed may be shorter than subsequent advertisements. In some cases, the length of time for an advertisement may be based on the content. Of course, other factors may contribute to the length of time for the advertisements.

In one scenario, auctions may be held periodically for advertisers to place their bids to have video or other ads shown for all content or specific content. Advertisers may place bids for a specific one or more pieces of content, a presented grouping of content, or all available content. The bids may involve placing money in escrow; otherwise payment may be made upon winning the bid. The advertising bids for the content are for enabling advertisements associated with the content for a specified period of time or a specified number of views or plays. After the time that all the bids are due from the advertisers, the winning bid for each piece of content goes to the highest dollar amount bidder and the highest bidders will then be able to show their ad during the specified period of time (or for the specified number of views or plays).

In some cases, there could be a situation where there is a tie in an amount placed as a bid for a particular piece of content. This scenario may occur where bids are submitted blind (e.g., there is no knowledge of other bids) or where bid amounts are not updated as fast as they are submitted. An additional period of time may be provided for those advertisers to bid until a highest bidder is achieved (or the additional time period ends). It is also contemplated that a winning bid could be selected in some other manner that may not be based on the bid being the highest.

In some implementations, an advertiser may select when (e.g., time of day, day of week, after/before a particular location in content), how (e.g., type of advertisement—video, still image, interactive advertisement; how often), and who (e.g., type and/or location of user based on log-in information of the user or based on internet protocol (IP) address of user) receives the advertisement.

In some implementations, a user may be logged-in while accessing the system and searching and/or reading educational content. In some implementations, cookies may be stored at the user's device so that when the user returns to the website providing the user interface to the educational search and ranking engine, the system can recognize that the user has been on the site before and may even recognize that the user has "opened" some content. A history log or other record may be maintained so that the user can see what content has been reviewed and may more easily return to already viewed content. In some cases, information may be stored for the user so the user may return to one or more locations within content, for example a bookmark or the location last reviewed. In some cases, the history log may be controllable by the user to enhance privacy, for example with controls or settings that remove the history log, turn off history logging, or restrict the types of logging conducted.

In some embodiments, the user can control for anything (e.g., any embodiment(s)). In some embodiments, the default can be anything (e.g., any embodiment(s)).

In some embodiments, the user can control for anything. In some embodiments, for example, in some embodiments, what tie breaker(s) are/is used, and/or order(s) of tie breaker(s), can be controlled for by user. In some embodiments, the default can be anything.

In some embodiments, the user can control, for example, for any weighting(s). In some embodiments, the default can be anything.

Medical Content

People sometimes turn to the Internet to find out more about the options for treating their medical condition or symptoms. Searching for medical content and information over the Internet can be difficult because it is not easy to determine whether a medical device, drug, therapy, or treatment is most appropriate for a given set of medical problems or symptoms. Although there are a number of websites that purport to provide medical information, a search of this content is generally conducted directly using key terms input to a search bar.

Unfortunately, it is not always possible to determine which of a number of results would be the most likely one to be helpful in ameliorating a given medical problem. Sometimes results are ranked according to relevancy, but the relevancy ranking may only be a function of a number of times a term is found in the text of an article about a medical problem. In some cases, there may be reviews of the medical content which can help inform the decision. However, the trustworthiness of the suggestion or review may be difficult to determine.

In embodiments describing or pertinent to medical content, systems and techniques for facilitating medical content search and results are described. The medical content can be presented in a manner that indicates trustworthiness or relevancy based on the frequency of reference (e.g., purchase, use, prescription, or recommendation) by a healthcare provider. By providing searchers of medical content with information indicating the number of actual uses of, for example, a medical device, pharmaceutical, or therapy, the searcher may better evaluate the usefulness of the search results.

The medical content being referenced can include, for example, medical devices, medical products, pharmaceuticals, botanicals (e.g., *Cannabis*), medical procedures, medical therapies, medical tests, medical exams, medical treatments, and products or devices that might be used in a medical setting. It may also include medical information, such as medical conditions and/or medical prognoses. The various kinds and categories of medical content may be known herein as "content types." Individual instances of medical content—e.g., a particular product like a pacemaker—may be sometimes known as an "item of medical content."

The healthcare provider referencing the medical content can include, for example, a hospital or other medical facility, doctor or other healthcare professional, a service (e.g., IBM's Watson, and/or the like), and a pharmacy or dispensary. A medical facility can include, for example, a hospital, center, clinic, outpatient surgical center, practitioner's office, urgent care facility, medical school, healthcare/medical institution, mobile care center, physical therapy center, laboratory, diagnostic center, medical research center, gymnasium, and animal hospital. A healthcare professional may be, for example, a physician, medical doctor, surgeon, specialist, nurse, nurse-practitioner, physician assistant, dentist, psychologist, psychiatrist, physical therapist, rehabilitation therapist, certified trainer, optometrist, osteopath, chiropractor, caregiver, and veterinarian. The various kinds and categories of healthcare providers may be known herein as "provider types" or "healthcare provider types." In some embodiments, medical institution(s) or organization(s) can be source(s).

A healthcare provider may reference medical content in several ways, some non-limiting examples of which are described below. For example, a healthcare provider may purchase a medical device or medical equipment for use in a medical facility or medical procedure. A healthcare provider (such as a doctor) may use a medical therapy, medical device, medical procedure, or medical treatment on a patient or in a medical facility. A healthcare provider may prescribe a drug or non-drug therapy to a patient to ameliorate an ailment. A healthcare provider may even recommend an environmental/lifestyle change or other course of action, such as that the patient intake less salt, to assist in treating a symptom or medical condition.

An instance of "referencing" (e.g., purchasing, using, prescribing, and/or recommending) a medical content may be counted such that ranking of the references associated with a medical condition, symptom, or side effect are possible. A brief example may be illustrative: A patient searches for "hypertension" using the described systems and techniques. The search may return ordered medical content results showing that, for example, 99 healthcare providers recommend reducing salt intake, 95 recommend stopping smoking, 91 recommend more exercise, and 48 prescribe the hypertension-reducing drug X and 28 recommend the hypertension-reducing drug Y. Presenting results in this manner may assist the patient in evaluating therapeutic options by referencing the actual behavior of healthcare providers. "Using" may include "wearing," as when a healthcare professional wears a particular brand of gloves or other personal protective gear; using may also include conducting, administering, or employing in some way; for example, a hospital might use a particular kind of anti-microbial mousepad for its computing systems, or particular software for handling patient intake data.

The manner that a medical content is referenced (sometimes known herein as a "reference type") may in some implementations affect how the medical content is ranked and/or counted. For example, certain medical products, procedures, treatments, therapies, or drugs may be indicated as "prescribed," whereas others may be suggested as "recommended." Some products may be medical supplies or techniques purchased or used by a facility. In some implementations, all or a subset of referenced medical content are included as part of the results. In some implementations, only the prescribed content are included as part of the results. In other implementations, only the recommended content are included as part of the results. In some implementations, the manner in which the medical content is referenced is indicated as metadata associated with the particular content.

In some cases, a weight may be assigned to the medical content (for the rankings) based on the manner in which the content is referenced. In some cases, no distinction based on the manner in which the content is referenced is made in the rankings. In other cases, "prescribed" may be weighted over "recommended" content, for example. In yet other cases, a distinction may be provided between "prescribed," "recommended," "purchased," and "used" medical content through use of an indicator in the search results. Accordingly, it should be understood that the content ranking may be based on the manner in which content is referenced by a healthcare provider; and when reference is made to "referenced" medical content any combination of medical content used, purchased, prescribed, recommended, or otherwise utilized for a medical condition or symptom may be included in all permutations.

In some implementations, only "prescribed" content is presented for a user. In some implementations only "recommended" content is presented for a user. In some cases, only "purchased," or only "used" content may be presented for a user. In some implementations, any combination of purchased, used, prescribed, or recommended content may be presented for a user. In some implementations where medical content having multiple types of reference are presented to the user, the system may be agnostic about how the content is referenced and may present results as if there is no difference between the types of reference. In some implementations where more than one type of referenced content is presented to the user, the manner in which the content is referenced might not affect how the content is ranked, but can be indicated to the user so that the user knows whether the content was purchased, used, prescribed, or recommended by a healthcare provider. One way of indicating the manner in which the content was referenced is to include a particular icon, popup, or other indication in association with an indicator of the healthcare provider (or other level of granularity relevant to the healthcare provider) that referenced the content.

In some implementations where content having multiple reference types are presented to the user, the manner in which the content is referenced can affect the rankings. For example, each "prescribed" reference to a piece of content may be weighted differently than each "recommended" reference to that piece of content. As another example, the number of prescribed references to an item of medical content may be used as a tie-breaker when two pieces of content have a same number of total references, but differing numbers of prescribed references (e.g., both pieces of content have 10 references, but one was referenced as prescribed 7 times and the other was indicated as prescribed only 6 times—the remaining references being recommendations). Modifying rankings through weighting or tiebreaking in accordance with prescribed and recommended reference types of course extends to other reference types (e.g., purchased and used).

In some implementations, the type of medical content may affect the rankings through weighting. For example, when multiple types of medical content are presented to the user (e.g., mixed results of drugs, medical devices, procedures, and therapies), one or more types of medical content may be weighted differently than other types. For example, a medical device may be weighted higher than a drug therapy.

The information about medical content referenced by a healthcare provider may be gathered from a variety of medical content referencing data sources. Sources of referencing data may be a medical facility or healthcare provider information system, such as a system used to chart patients, patient outcomes, and/or healthcare professionals' activities. Medical insurance databases may also be sources of referencing data. Medical device or pharmaceutical sales and inventory databases may also be sources of referencing data for medical content. Government databases, such as may be provided by the Centers for Disease Control, may be sources. Research databases containing demographic or epidemiological information may be sources, as well as databases containing genetic results/etc such as associations between genes/genomes and condition prevalence. Consumer genetic testing services (e.g., "23andme.com") may provide information about medical condition risk or prevalence in a user. Consumer data provided by data brokers from ad tracking or other data mining activity may also be sources. In some cases, information about individual patients may be masked or anonymized to ensure patient privacy and compliance with medical privacy statutes. The medical content referencing data sources described above are illustrative only and should not be considered as limiting of the types and varieties of information systems that may be a source of medical content referencing data by healthcare providers.

Figure 7:
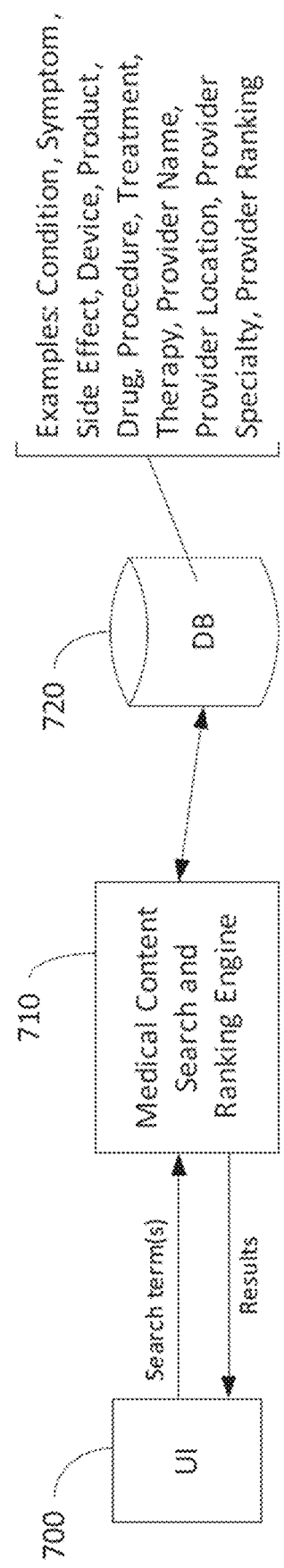
FIG. 7 illustrates an operating environment in which certain embodiments may be implemented.

FIG. 7 illustrates an operating environment in which some embodiments may be implemented. Referring to FIG. 7, a user may conduct a search of medical content through a user interface (UI) 700. The search can be conducted on, for example, diseases, infections, injuries, viruses, disorders, syndromes, prognoses, symptoms, side effects, medical therapies, medical devices, medical products, dietary supplements, drugs, medicinal herbs or botanicals, properties of contents (e.g., drugs), medical procedures, medical treatments, or a combination of one or more of these categories, and/or the like. The areas for the search may be specified by the medical content search and ranking engine 710 (e.g., via a drop-down menu) or may include free-form input provided by the user via the UI 700 (e.g., via a search bar).

Figure 8:
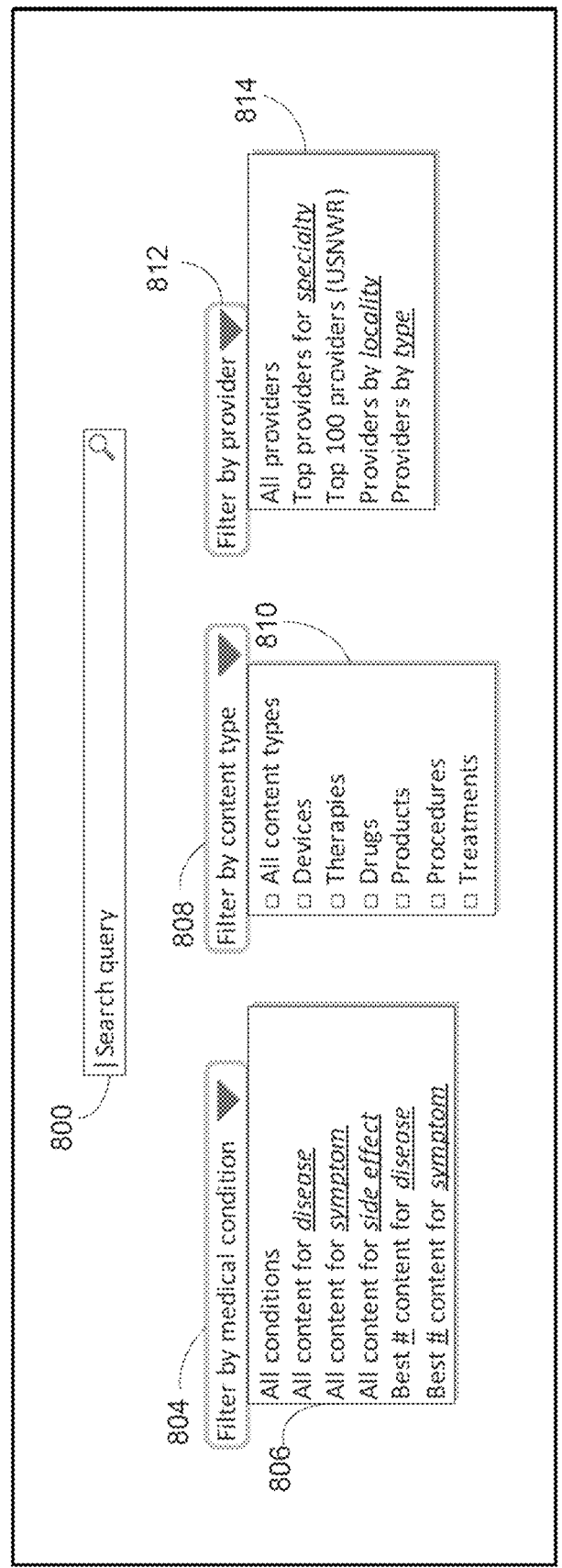
FIG. 8 illustrates an example user interface of a search page for medical content.

The user interface may include features as illustrated in FIG. 8. As shown in FIG. 8, an input field 800 can be provided for receiving a search query for medical content. As noted, the input field 800 may allow searching of a wide variety of medical content, as well as, for example, searching/filtering medical content by, e.g., medical condition(s), symptom(s), and/or side effect(s) to which medical content may be associated.

In some implementations, users do not need to do a search to access the content as the content may be listed in a default or otherwise optimized manner before a specific search is entered by the user. In some implementations, an ordered listing of content can be presented on a landing page (e.g., "home page") of a medical content listing website rendered in a user's browser application (and providing a user interface to the medical content search and ranking engine). The default ordered listing may be, for example, of content for the top conditions. A default ordered listing may also be, for example, the top prescribed, recommended, purchased, or used medical content for a given population. In some cases, for example, demographic and/or other characteristics of the user may be used to determine the relevant population.

In some embodiments, the user can (and/or user's profile can be used for/to (e.g., by default (user can change the default))), for example, search and/or filter by characteristic(s) or user's characteristic(s) (e.g., for, e.g., searching, filtering, tie breaking, weighting, and/or the like, and/or otherwise), for example, demographic(s) (e.g., any data, information, property(ies), characteristic(s); e.g., environment(al), omic, history(ies) (e.g., family (or family member(s)) history(ies) and/or user history)/record(s), and/or other demographic(s))), for example, the user can search and/or filter by only references for/in regard to female patients, or only references for female patients with medical condition X and/or symptom Y, and/or for only female patients of a certain age or range of ages, for example, only references for female patients over the age of 53 (or e.g., references for 53 year old females only, or for females age 5 through 11 only, etc), for example. In some embodiments, one or more threshold(s) can be used, for example, a genetic threshold can be used, for example, only references for a certain genetic population, for example, only references for patients comprising mutation X only, or only references for a certain population that is limited by a different threshold, for example, using genetic (and/or, e.g., proteomic) similarities to the user. In some embodiments, references in regard to patients with a similar genetic (and/or, e.g., proteomic) makeup can be used as the only references used.

In some embodiments, for example, user(s), and/or content(s), and/or source(s), and/or reference(s), and/or patient(s)/subject(s)/the like, for example, data, information, type(s), category(ies), kind(s), characteristic(s), brand(s), functionality(ies), feature(s), function(s), factor(s), circumstance(s), situation(s), scenario(s), and/or property(ies), can be used, for example, for searching, filtering, tie breaking, weighting, and/or the like (e.g., in some embodiments, the user can control for/do anything. In some embodiments, the default can be anything).

In some embodiments, circumstantial data, info, characteristic(s), and/or property(ies) can be used for, for example, searching, filtering, tie breaking, weighting, and/or the like In some embodiments, situational data, info, characteristic(s), and/or property(ies) can be used for, for example, searching, filtering, tie breaking, weighting, and/or the like.

In some embodiments, healthcare/health/medical information/data, and/or any other information/data, can be used, for example, for searching, filtering, tie breaking, weighting, and/or the like.

In some embodiments, for example, omic (e.g., genomic, proteomic) data, info, characteristic(s), and/or property(ies), can be used, for example, for searching, filtering, tie breaking, weighting, and/or the like.

In some embodiments, population(s) (for example, patient population(s)), can be used, for example, for searching, filtering, tie breaking, weighting, and/or the like.

In some embodiments, for example, (e.g., can be in regard to, for example, plant organism(s) and/or non-plant organism(s)) genotype(s) and/or phenotype(s) can be used, for example, for searching, filtering, tie breaking, weighting, and/or the like.

In some embodiments, for example, strain(s) can be used, for example, for searching, filtering, tie breaking, weighting, and/or the like.

In some embodiments, variant(s) can be used, for example, for searching, filtering, tie breaking, weighting, and/or the like.

In some embodiments, variety(ies) can be used, for example, for searching, filtering, tie breaking, weighting, and/or the like.

In some embodiments, classification(s) can be used, for example, for searching, filtering, tie breaking, weighting, and/or the like.

In some embodiments, for example, biomarker data can be used, for example, for searching, filtering, tie breaking, weighting, and/or the like.

In some embodiments, for example, user/patient/subject/the like data (e.g., characteristic(s), information, property(ies)) can be used, for example, for searching, filtering, tie breaking, weighting, and/or the like.

In some embodiments, for example, molecular data can be used, for example, for searching, filtering, tie breaking, weighting, and/or the like.

In some embodiments, for example, cellular data can be used, for example, for searching, filtering, tie breaking, weighting, and/or the like.

In some embodiments, for example, a patient can be any organism (or e.g., a population of organisms, e.g., insects, livestock, fish), for example, a plant, tree, animal, pet, alien, human, rat, dog, cat, fish, whale, cow, pig, chicken, turkey, bird, amphibian, reptile, mouse, insect, chimpanzee, elephant, lion, tiger, bear, dolphin, one or more livestock (e.g., can have a result for each individual patient/livestock side by side one another (e.g., turkey U result side by side turkey V result side by side cow W result side by side cow X result side by side chicken Y result side by side pig Z); or, e.g., can be treated as a single patient/single patient population, for example can be in regard to, for example, insects or fish), or any other organism(s). In some embodiments, for example, location(s) or origin(s) can be used, (for example, place of origin (e.g., planet of origin)), for example, for searching, filtering, tie breaking, weighting, and/or the like.

In some embodiments that are analogous or similar to some herein, it is envisioned that non-organism(s) can be considered or treated as analogous or similar to patient(s)/subject(s)/the like. In some embodiments, for example, a body of water (e.g., a lake, pool, etc), machine, vehicle (e.g., aircraft, seaplane, watercraft, spacecraft, automobile, snowmobile, tank, boat, ship, tractor, golfcart, drone, UAV, UUV, or other vehicle), building, single family home, structure, lawnmower, product, device, object, air conditioning unit, refrigerator, roof, and/or the like, and/or any part(s) thereof, can be considered or treated as non-organism patient(s)/subject(s)/the like. In some embodiments, for example, builder(s), electrician(s), roofer(s), worker(s), plumber(s), mechanic(s), shop(s), grower(s), farmer(s), agricultural/growing facility(ies)/professional(s)/service(s), greenhouse(s), engineer(s), botanist(s), contractor(s), repairperson(s), handyperson(s), facility(ies), professional(s), service(s) (e.g., Watson as a source), business entity(ies), and/or the like, can be source(s), for example wherein analogous or similar to healthcare provider(s). In some embodiments, whether organism and/or non-organism, can be used, for example, for searching, filtering, tie breaking, weighting, and/or the like. In some embodiments, organism and/or non-organism, for example, type(s), and/or category(ies), and/or kind(s), and/or characteristic(s), and/or property(ies), and/or data/info, can be used, for example, for searching, filtering, tie breaking, weighting, and/or the like. In some embodiments, the user can control for anything. In some embodiments, the default can be anything.

In some embodiments, for example, location(s), for example, bodily (or body part) location(s), geographic location(s), or otherwise, for example, can be used, for example, for searching, filtering, tie breaking, weighting, and/or the like. In some embodiments, for example, source(s), user(s), reference(s), content(s), and/or other location(s) can be used, for example, for searching, filtering, tie breaking, weighting, and/or the like. In some embodiments, territory(ies), jurisdiction(s), boundary(ies), and/or other location(s) (e.g., place(s)) can be used, for example, for searching, filtering, tie breaking, weighting, and/or the like.

In some embodiments, for example, one or more species (e.g., plant species and/or non-plant species) can be used, for example, for searching, filtering, tie breaking, weighting, and/or the like. In some embodiments, for example, the user can search and/or filter by one or more species. In some embodiments, for example, a user can control to use only references for dogs, or humans only, or cats only, or mice only, or chimpanzees only, and/or in some embodiments, can combine references from multiple species and use them for a single result. In some embodiments, for example, the user can control to have a different result for each, for example, all side-by-side one another. For example, in some embodiments, different species can be in different results that are side-by-side one another, and for example, all side-by-sides can be executed simultaneously by, for example, a single user search query being executed (e.g., with a search box at the top that executes all side-by-sides simultaneously), and each individual result can be independently executed by searching and/or filtering with the respective, e.g., search box and/or filter(s), that are for a specific result/side-by-side only. In some embodiments, a user can search and/or filter by, for example, dog breed X only, for example.

In some implementations, user-adjustable filters may be used to narrow, refine, or reorder the results before a search is conducted or after the search is conducted.

A "filter by medical condition" 804 can provide filtering options 806 such as, but not limited to, enabling a search of content for all conditions, all content for a specified disease, all content for a specified symptom, all content for a specified side effect, a designated number of highest ranked content for a specified medical condition (e.g., "top 10 content for hypertension"), and a designated number of highest ranked content for a specified symptom (e.g., "top 25 content for headache") as some examples. In some cases, the medical condition, symptom, or side effect being filtered may be indicated by the text in the search text input field 800.

A "filter by content type" 808 can provide filtering options 810 such as—but not limited to—enabling a search of all content types, or a search of one or more individually selected content types, for example medical devices, therapies, drugs, products, procedures, exams, tests, and treatments. Sub-types are also possible, including, but not limited to, controlled substances, over-the-counter products, herbal substances, in-patient procedures, and out-patient procedures. In some embodiments, sub-types may include sub-components or properties of content types. For instance, pharmaceuticals may be filtered by such further sub-components as "active ingredient" so that, for example, particular classes of chemical the user is allergic to may be excluded. In another instance, if medical *Cannabis* is returned as a result after a search for "epilepsy," additional filtering options may filter the *Cannabis* types by properties such as type of administration or formulation (e.g., dried leaf/flower, oil, edible, pill form, chewable, extract, concentrate), botanical categorization (e.g., leaf), and/or component substances (e.g., chemical compounds, e.g., cannabinoids, e.g., CBD, THC, CBN, CBC, CBG, and/or etc) or levels of component substances. In some embodiments, user can control to use one or more component substances and/or levels of component substances, for example, for searching, filtering, tie breaking, and/or weighting. In some embodiments, user can control for, for example, flowers only, side by side edibles only, side by side concentrates only, side by side a mixed result. In some embodiments, user can control to use, for example, flowers, and/or edibles, and/or concentrates to be used for, for example, for searching, filtering, tie breaking, weighting, and/or the like. Other sub-type filters may be envisioned depending on content type.

A "filter by provider" 812 can provide filtering options 814 such as, but not limited to, enabling a search of all providers (e.g., medical facilities and healthcare professionals), for top providers in a designated specialty (e.g., "top cancer hospitals" or "top oncologists"), for the top 100 (or other "top" number) providers according to a designated ranking service (e.g., "top 100 providers from the U.S. News and World Report (USNWR) rankings"), for providers by designated locality (e.g., "providers in Florida"), and for providers by a designated type (e.g., "outpatient orthopedic surgical centers") as some examples. In some cases, filtering can be according to insurance policies.

Other filter types (not shown in FIG. 8) are also possible, enabling further filtering of some results. In some embodiments, available filter options may be determined or dynamically redefined by prior filter selections, as for example when selection of a "symptom" filter surfaces an additional filter based on different symptom names or categories. In some cases, a filter selection may initiate the display of an additional interface or interface element. For example, a "product" content type may initiate the display of an interface for navigating product subcategories, such as "pacemakers," "stents," or "artificial valves." Other filters may include demographics characteristics (e.g., sex, age, weight, etc), or even animal type (e.g., when veterinary information is sought).

Of course, other designations may be provided and even natural language queries may be used in certain implementations. The described search and ranking engine may be accessible via a personal assistant such as Siri® available from Apple Inc., Google Now®, or Cortana® available from Microsoft Corp. Queries may be input through voice commands or by touch or text or other input. The manner of applying the filter(s) may be any suitable tool bar, input field, or menu for providing the information.

Returning to FIG. 7, search terms entered via the user interface 700 are used by a medical content search and ranking engine 710 to search a database (DB) 720. The database 720 can include structured information regarding medical content. A wide variety of medical content information may be stored, some of which may support the use of filtering categories described above. The database can be generated, for example, based on data provided by healthcare providers, insurance companies, consumer data companies, medical device manufacturers, medical product suppliers, pharmacies, and medical researchers.

The medical content search and ranking engine 710 can use the search terms provided via the user interface 700 to identify relevant medical content from the database 720. The identified medical content can be ranked by the medical content search and ranking engine 710 based on the number of times the content has been referenced.

Characteristics of the healthcare provider that referenced the medical content may also influence the rankings (through filtering and/or weighting the number). In some implementations, the number of references to a particular medical content item may be counted per provider, or may be subdivided by medical facility and healthcare professional.

The relevant identified medical content can then be displayed at the user interface 700 in an ordered list that is ordered based on the number of times the content has been referenced. In some cases, an indication of the number of times the content has been referenced can be provided. In some cases the indication of the number of times the content has been referenced may be tabulated per healthcare provider. The listing within the UI 700 can show trending, such as new surgical techniques or medications. Recent trends can affect the weighting—for example, bypass surgeries may have dominated 20 years ago, but angioplasty and stent implants are the dominant trend today. The relevant identified medical content can also reflect recent FDA approvals.

In one embodiment, an initial search query may not be through the UI 700 and, instead, is a result of the request from a web browser to return information from a website (providing the UI 700) at a particular uniform resource location (URL). For example, when a user enters a URL in their web browser to go to the website specifically covering a designated condition (e.g., "lupus"), the hypertext language protocol (HTTP) request for the URL can initiate a query (e.g., based on a default search query in the string or as a field of the request) by the search and ranking engine 710 and those results can be rendered in the web browser as a default result list that can be part of the UI 700 before a user enters a specific query.

In one embodiment, an initial search query may not be through a UI 700 and, instead, is the result of a request from a mobile device application connected through a mobile device to a sensor, for example, a biometric sensor. For example, a user may be wearing one or more biometric sensors to detect, e.g., pulse, blood oxygen, airflow, body temperature, galvanic skin response, patient position, or heart rhythms. The biometric sensors may be connected to a mobile device running an application that may send queries to the medical content search and ranking engine 710 (for example, via HTTP, as noted above). The application or an associated data store may contain a mapping between biometric sensor readings and search terms for querying. In some cases, the search terms or ranges of sensor data corresponding to a search term may be user-definable. In some embodiments, search results of medical content may be presented to the user via UI 700 when an out-of-boundary reading is detected by the application via the one or more biometric sensors. As a specific example, a biometric sensor might detect a user's blood pressure is 150/90, a reading which the application generally (or user specifically) has defined as "high." This may cause the mobile device application to query using the search term "high blood pressure," which prompts the display of results. In some cases the results may be ranked by, e.g., prevalence of a condition among groups with similar demographic, health history, and/or genetic characteristics. In some cases, results may be communicated to emergency response personnel or other interested parties. An example of a supporting user interface is shown in FIG. 9C. Techniques for reading biometric sensors from a mobile device are supported by application frameworks such as the "e-Health Sensor Platform for Raspberry Pi." In one embodiment, a detection of an erratic heartbeat or rhythm by a biometric sensor might cause the mobile device application to search "arrhythmia" and prompt the display of results.

In some embodiments, multiple readings can be used; for example, heart rate (e.g., BPM), blood pressure, and body temperature, can be used. In some embodiments, for example, user can execute, and/or a user's (and/or e.g. content(s) profile(s) and/or reference(s) profile(s) and/or source(s) profile(s) and/or patient(s)/subject(s)/the like profile(s) (and/or any other profile(s))) or any part(s) thereof) profile (or any part(s) thereof), which may be stored in DB 720, can be used for (e.g., whether by default, through user's control, and/or otherwise), for example, searching and/or filtering (and/or tie breaking and/or weighting and/or the like), for example, in conjunction with, for example, data from one or more sensors; for example, the user can (or default can) search and/or filter by, for example, one or more side effect(s) and/or symptom(s) and/or condition(s) (e.g., pregnancy, dravet syndrome, etc), to further influence the parameters. In some embodiments, a user's profile (and/or other profile(s)) can comprise, for example, a user's DNA/ genetic profile, medical image(s) (e.g., X-ray image(s), PET image(s), CT image(s), MRI image(s), Ultrasound image(s), IR image(s), UV image(s), DTI image(s), and/or any other image(s) (e.g., can even be image(s) captured, for example, using a smartphone)), medical video(s), and/or medical audio(s) (side bar—e.g., one or more medical video(s) and/or audio(s) and/or image(s) data (e.g., pattern(s)), info, characteristic(s), and/or property(ies), can be used for, for example, searching, filtering, tie breaking, weighting, and/or the like (eg can use eg a medical image/medical image's data/info/characteristic(s)/property(ies))), and/or health/ medical history/record(s), and/or data from one or more sensors, and/or any factor(s), and/or feature(s), and/or function(s), and/or characteristic(s), and/or property(ies), and/or pattern(s), and/or information, and/or data; e.g., microbiome, environment(al), biomarker, phenotypic, omic (e.g., genomic, proteomic, metabolomic), and/or any other data, info, characteristic(s), property(ies) (e.g., demographic, medical result(s) (e.g. healthcare/health/medical, for example, biopsy(ies) (e.g., data/info obtained from biopsy), screening(s), scan(s), assessment(s), exam(s)/examination(s), test(s), and/or the like (and/or otherwise), report(s)/ result(s)/the like) data (e.g., a medical test's result's data, info, characteristic(s), property(ies)), info, characteristic(s), property(ies)); and can be used in conjunction with the foregoing, and/or the like, and/or otherwise; for example, can be used for searching, filtering, tie breaking, weighting, and/or the like. In some embodiments, a user's (and/or any other profile(s)) profile (or any part(s) thereof), for example, any data, information, characteristic(s) (e.g., pattern(s)), and/or property(ies) thereof/therefrom, for example, can be used to, for example, apply one or more filters (and/or, e.g., can be used for (e.g., whether the user controls for it, or otherwise), for example, searching, filtering, tie breaking, weighting, and/or the like); for example, by default can, e.g., filter out contents (e.g. drugs) that are contraindicated for pregnant women. The user may control the default(s) or default behavior(s) by modifying the default(s) or default behavior(s). In some embodiments, for example, labeling, packaging, contraindications, instructions, descriptions, package inserts (e.g., patient package inserts), warnings, precautions, and/or the like, can be used, whether for any of the foregoing (and/or the like), for searching, for filtering, for tiebreaking, for weighting, and/or the like, and/or otherwise. In some embodiments, the user can control for/do anything. In some embodiments, the default(s) can be anything.

In some embodiments, for example, activity(ies) (e.g., brain activity) data, info, characteristic(s), and/or property (ies), can be used, for example, for searching, filtering, tie breaking, weighting, and/or the like.

In some embodiments, for example, level(s) (e.g., glucose level(s)) data, info, characteristic(s), and/or property(ies), can be used, for example, for searching, filtering, tie breaking, weighting, and/or the like.

In some embodiments, for example, lifestyle data, info, characteristic(s), and/or property(ies), can be used, for example, for searching, filtering, tie breaking, weighting, and/or the like.

In some embodiments, for example, wellness data, info, characteristic(s), and/or property(ies), can be used, for example, for searching, filtering, tie breaking, and/or weighting.

In one embodiment, a user's medical history may be stored in DB 720. The user may enter the medical history directly through an interface 700 of the medical content search and ranking engine 710, or the user may select an option to interchange data with another health database storing the user's medical history. An example of a commercial medical history storage service that may allow data interchange is "MyMedicalRecords.com." A user's stored medical history may be used, in some cases, to assist in identifying relevant medical content related to the search term. In some embodiments, for example, a user's medical history, genetic information (including comparison of the genetic information to the genetic information of a population), and/or demographics (e.g., sex, gender, sexual orientation, age, weight, etc) may also provide information to the ranking engine to shape or inform the weights assigned to medical content references, provide additional filters, or provide relevant information for tie-breakers. For example, if it is known (e.g., via the stored medical history) that a user is allergic to painkillers containing codeine, then drugs containing codeine may not be presented as medical content in relation to a symptom or condition search. As an alternative example, if a user's medical history indicates that user has difficulty awakening from the anesthesia given for surgery, medical content for surgical procedures may be weighted lower than non-surgical treatment options, even when some surgical medical content may be weighted higher for patients not having difficulties with anesthesia. A user's medical history may include, when available, a parent or other relative's medical history.

Characteristics of the user's insurance coverage may also be used, in some cases, to assist in identifying or ranking relevant medical content related to the search term. For example, the user can control to, for example, make a treatment not covered by the user's insurance not be shown in the search results, or may receive a different weight, may lose tie to content that is covered by the user's insurance (or, e.g., is covered for more, covered for a greater percentage, or has lower out of pocket costs).

Figure 9A:
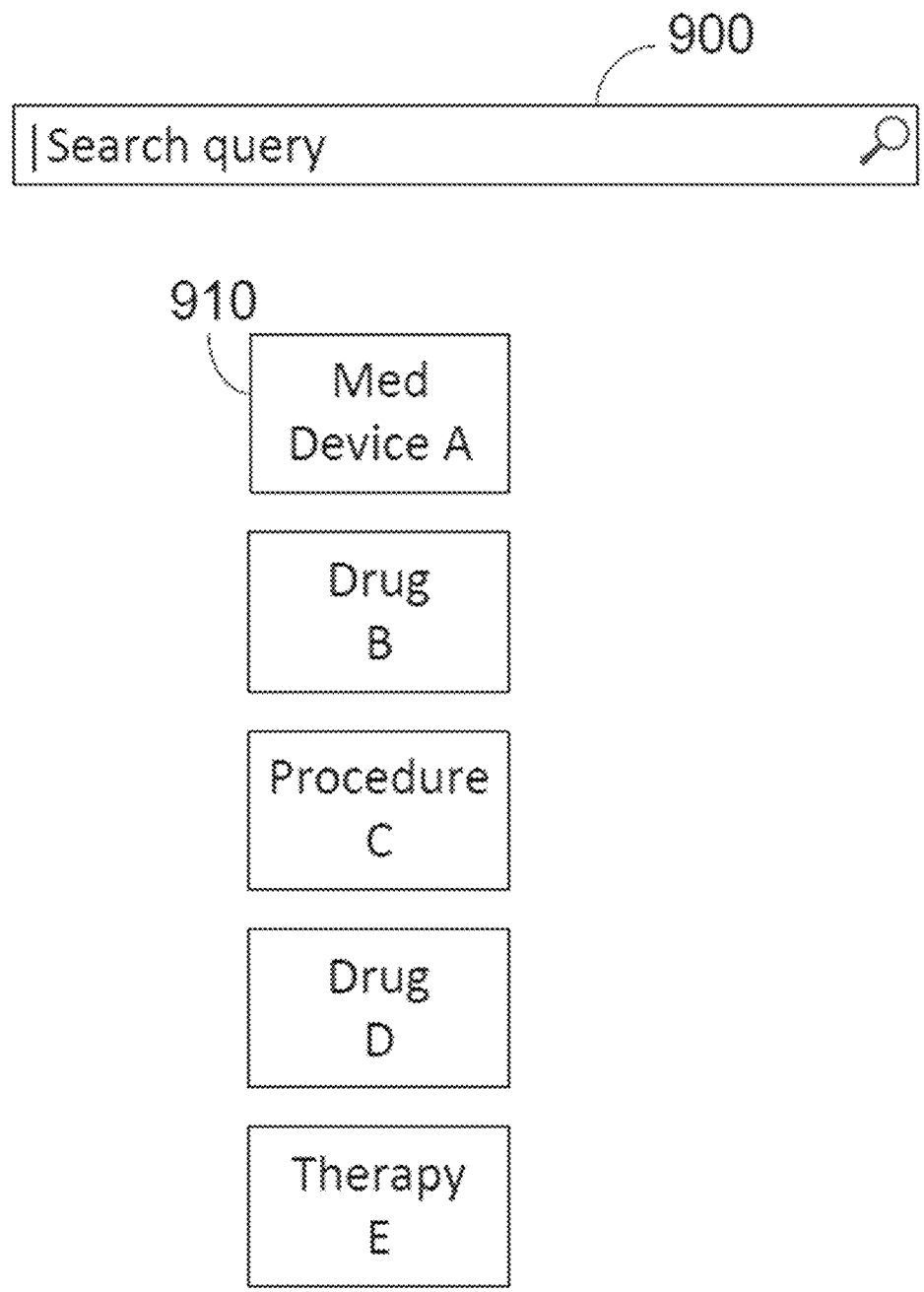
FIGS. 9A-9D illustrate example search result ordered list presentations.
Figure 9B:
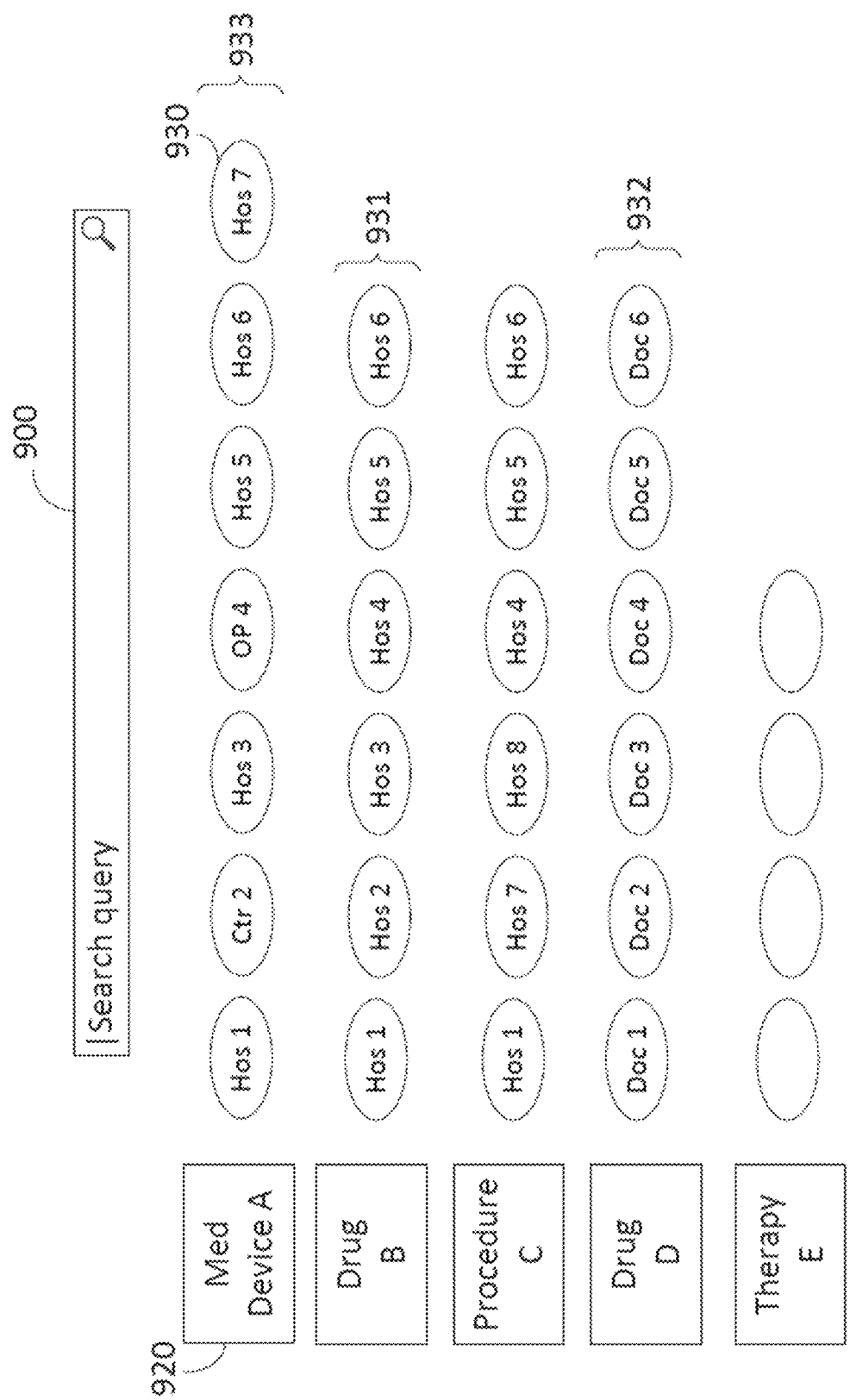
Figure 9C:
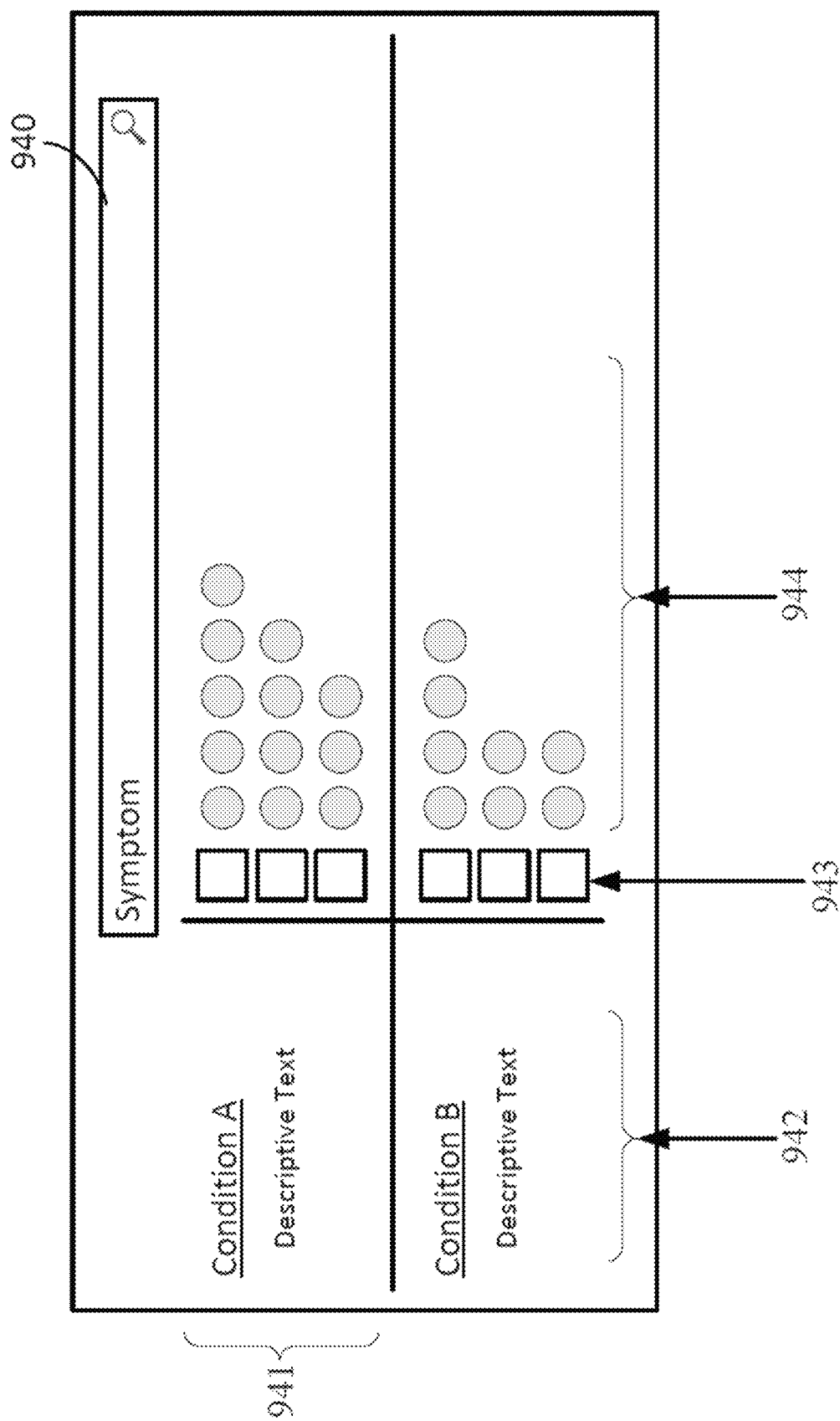

FIGS. 9A and 9B illustrate example search result ordered list presentations. Several kinds of medical content are exemplified in FIGS. 9A-9B, but should not be considered as limiting. In response to receiving a search query in the search input field 900 of a user interface, an ordered listing of medical content can be displayed. In FIG. 9A, the medical content 910 may be presented in a list from most referenced to least referenced. Additional filters (such as shown in FIG. 8) may be applied to further narrow the listing.

Results of the search can be presented with indicators of the number of providers that referenced the medical content, a specific indicator (e.g., a badge or icon) for each provider that references the content, an individual healthcare professional that references the content within a facility, a specific condition or symptom that the content is targeted toward, a demographic attribute, credentials of a healthcare provider, the level or severity of side effects that may be caused by the treatment option represented by the content, and/or other information that can support the ranking of the medical content (e.g., provide information regarding the relevancy) and/or provide additional information that a user may use to select an item of content or obtain additional information. Different types of indicator (e.g., a professional indicator and a facility indicator) may be shown in the same view for a single ranked content in a single result.

For example, referring to FIG. 9B, the medical content 920 may be presented with an indicator 930 of the providers that referenced the content. In one implementation using an indicator (e.g., icon or badge) for a particular medical facility provider that referenced an item of content, the indicator can be used once per content even if the content is referenced by multiple healthcare professionals at the facility 931. Thus, each indicator represents that a medical facility has referenced the content at least once. In another implementation, the indicator for a particular facility that referenced a content item may be used to represent each reference to the content so that multiple indicators for that particular facility may be shown for the referenced content when multiple healthcare professionals at that facility reference the content. In some cases, each indicator may show a healthcare provider name (such as a healthcare professional's name, or a facility name) and/or other information 932. In some cases the indicator may show both the facility name and the healthcare professional's name. In another implementation, a counter may be displayed on the healthcare provider indicator to indicate the number of times the content was referenced. In some cases, results content may show indicators for multiple kinds of healthcare providers (e.g., indicators for facilities and professionals).

As described with respect to FIG. 8, results can be filtered. In one scenario, the results are filtered by provider or a select grouping of providers. For example, the results can be filtered to show rankings based on ranking services of top healthcare providers, by providers in a particular geographical locality, by a user-specified provider or providers, by a top number of providers in a specialty area (as ranked by a provider ranking system), by a type of provider, and/or by other provider-related configuration.

As illustrated in FIG. 9B, each item of medical content can include one or more indicators of the healthcare provider referencing the content. The indicators can be presented in order (e.g., left to right) of the provider's ranking on the U.S. News and World Report medical provider ranking system, Top 100 Hospitals Website, Hospital Webometrics, or other healthcare provider ranking system. Sometimes, healthcare providers may be of mixed type, for example showing indicators for hospitals, surgical centers, and outpatient facilities with respect to the same content 933. In some cases, whether indicators are shown in mixed mode may depend on the type of content (e.g., whether the content is a procedure, drug, device, therapy, etc.). In some embodiments, healthcare providers may be of a single type designated by the user in the search and filtering interface of FIG. 8. In some cases, individual healthcare professionals may be grouped together by their facility to create a single indicator badge. In some embodiments, the indicator badges may show the name (or other details) about a referencing healthcare professional. In some embodiments, selecting a healthcare facility indicator badge (e.g., a hospital) may cause additional interfaces to be rendered that display the individual healthcare professionals within the facility who prescribed, purchased, recommended, and/or used the medical content. Each of the combinations may be controllable by user selections and/or interface elements.

In some implementations, when multiple medical content (e.g., devices, drugs, procedures, therapies) within the results have a same number of providers that reference the content, the content having a same number of references may be presented in alphabetical order. In other implementations, the content may be presented in reverse chronological order, the results being weighted for recency of reference.

In some implementations, various mechanisms may be used to break ties between content that may have the same rankings (or are the same within a designated range). In some cases, the ranking order of tied results may be presented based on a ranking system of the healthcare providers that reference the content, such as the U.S. News and World Report. As noted, other ranking systems or sources may be used.

Another kind of tie-breaking mechanism that may be used to sort equally-ranked content is the content type (or sub-type) of the medical content. For example, drugs may be prioritized above surgical procedures as preferential in some cases. Certain means of administration may be prioritized above other types, such as a preference for oils containing *Cannabis* to dried-leaf forms.

Another type of tie-breaker that may be used refers to the credentials of the healthcare provider (medical facility or healthcare professional). For example, some healthcare professionals are board certified in particular specialties such as "internal medicine." Thus, ties may be effectively broken among content by considering the board certification/specialty status of healthcare professionals in comparison to the content referenced by individuals without board certification status. As a specific example, if a medical device and a drug are tied in the number of references received, but the drug received more prescriptions by board certified professionals, the drug may be ranked higher than the medical device.

Another type of tie-breaking mechanism may consider the incidence of side-effects caused by the medical content. Side-effect data may be stored in database 720 and accessed and analyzed by the medical content search and ranking engine 710. Among the side-effect data that may be stored in database 720 are the type, severity, and frequency of side-effects. Any or all of this side-effect data may be a factor in ranking a given item of medical content with respect to other medical content. For example, a tie between two items of medical content might be broken based on a lower frequency of side effects in one content. The frequency of side effects in a given content may also, for example, take into consideration the prevalence of the side effects in a population having similar genetic, demographic, or medical history characteristics of the user. An aspect of side-effect data may sometimes be a consequence related to the strength of the dosage of a substance; this might include not only higher dosages of typical pharmaceuticals, but also differing dosage properties of different types of botanical or herbal treatments (e.g., different variants of *Cannabis* may have different levels of component substances per mass unit). In some embodiments, for example, to provide user with additional information, side effects of one or more contents can be, for example, linked to/listed/etc and, for example, ordered based on frequency; or side effects within a given population (as known from the database or other structured data stored on a resource for the medical content search and ranking engine).

It should also be noted that provider rankings and credentials, medical content type, and side-effect data as described with respect to tie-breaking mechanisms may also be used as weighting factors (as described above) to minimize or strengthen the numerical count of an individual reference.

In addition, one or more tie-breaking mechanisms may be applied to the listings of the results where a first tie breaking method does not break all the ties. As a non-limiting illustrative example, the ranking or credentials of the referencing provider may be first considered to break ties within the same ranked content. Any remaining ties may be broken by type of medical content or incidence of side-effects.

In some implementations, a user's option selection or user's medical history may be considered in choosing a tie-breaking mechanism. For example, if it is known via a user's medical history data stored in a DB 720 that the user has an allergy to a specific drug or substance, a "drug" medical content may be ranked lower than a surgical option. As another example, if a user has selected an option via a user interface 700 element to favor drug therapies over surgical options as medical content, a drug medical content may be shown above an equally-referenced surgical option.

Indicators may show other kinds of ranking criteria for medical content. Indicator types might include, for example, the type of reference (e.g., prescribed, recommended, used, purchased), healthcare professional name, specialty, board certification, geographic locality, and ranking organization (e.g., USNWR) indicators may be shown in some cases, depending on the criteria for ranking. In some cases, more than one indicator type may be shown, and the indicators may be grouped by type. In some cases, multiple indicators may be present for the same content. Groups of badges may include, for example, groups for the medical facilities, healthcare professionals, and specialties referencing the content.

The user may sometimes desire to sort or filter results differently after the search results have been displayed in the search results list presentation. In some embodiments (not shown in FIG. 9B), user interface elements displaying additional filters can allow a user to group or select/deselect content types, provider types, reference types, or other filter criteria from the results on the search results list presentation.

FIG. 9C shows an example ordered search result list presentation that may be used in some implementations. An interface is shown in FIG. 9C that may be appropriate for displaying search results for a designated symptom indicated by a search term, filter, or interpreted from a biometric sensor device. The interface in FIG. 9C shows search results grouped by condition first, and then by ordered content with indicator badges.

The conditions displayed may be selected and ordered by likelihood that the symptom search term relates to a given condition. Information about a symptom's probability of relationship to a condition may be informed by accessing an existing medical diagnostic system (for example, the WebMD® "Symptom Checker"). A probability of association between a symptom and a condition may in some cases be informed by the reference counting data recorded by the medical content search and ranking system.

In the figure, the results for an example search of conditions and content related to a symptom 940 are shown. Content is grouped by condition 941, which may have such interface elements as a condition name and/or descriptive text 942. Conditions may in some cases be ordered by likelihood that the symptom relates to the condition. In another area of the interface, a list of content 943 may be presented for each condition 941 that is ordered in accordance with the techniques disclosed herein. Each content 943 may show a series of indicator badges 944 indicating information about the referencing provider (or other information).

Figure 9D:
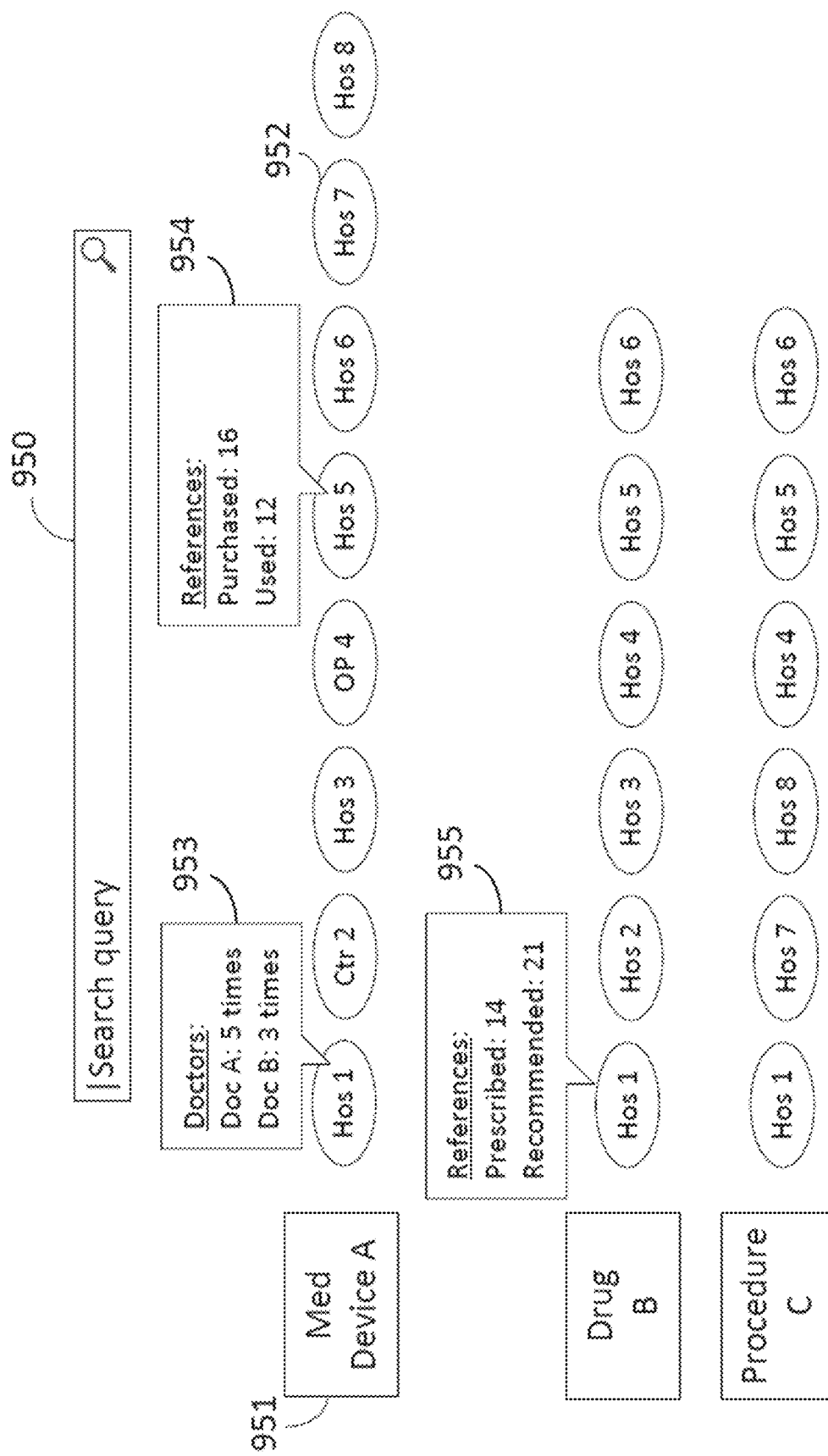

FIG. 9D illustrates an example ordered search result list presentation that may be used in some implementations. The example in FIG. 9D shows search query results of medical content with indicator badges and indicator popups. The search query 950 returns several search results of medical content 951. Each medical content result displays one or more indicator badges 952 of hospitals, doctors, medical facilities, and/or healthcare providers.

Indicator popups (953, 954, 955) may show additional information about the selection criteria for an indicator badge, including such information as the individual doctors at a medical facility who referenced the medical content, or the number of references of a reference type. The indicator popups may show information that is appropriate or relevant both to the medical content type, the reference type, and the nature of the indicator badge. For example, in the figure, "Medical device A" was referenced by two individual doctors ("Doc A" and "Doc B") at "Hospital 1" for a total of 5 and 3 times, respectively 953. The indicator popup for "Hospital 5" 954 shows the information divided by reference type indicating the number of times the "Hospital 5" purchased and used "Medical Device A" 951. "Drug B" has a different indicator popup for "Hospital 1" 955, reflecting the nature of drug medical content, showing the number of times "Hospital 1" has prescribed and recommended the drug.

Naturally, other information may be displayed in indicator popups. For example, indicator popups may show condition information, symptom information, side effect data, board certifications, specialties, provider rankings, and/or other information that may be used to understand the basis for ranking indicators and/or provide more detail to a user. The information in indicator popups will, of course, vary by the nature and type of indicator used shown in the results presentation. Use of the term "indicator popups" is not intended to be limiting of the type and manner of presenting additional information about an indicator. Many other types of interface elements are possible, as will be appreciated by practitioners in the art.

In some embodiments, for example, clinical trials, medical facilities, medical professionals, healthcare providers, specialists, specialties, healthcare/health/medical services, and/or medical indications, can be contents.

In some embodiments, any data/info (e.g., characteristic(s), property(ies), information) (e.g., symptoms, and/or any other data/info) can be used for a query.

In some embodiments, for example, a result can comprise medical condition contents only. In some super awesome embodiments, medical condition contents can each have respective groupings of contents; for example, medical condition x can be a ranked content and medical condition x content can have a respective grouping of contents, for example, to the right of the medical condition x content (e.g., condition x could be, for example, Trisomy e.g. 21, Klinefelter syndrome, Triple X syndrome, Sickle cell disease, Beta thalassemia, or medical condition X), and the respective grouping of contents can comprise ranked contents. Further still, in some embodiments, instead of, for example, there only being a single result, there can instead be multiple results side by side one another (e.g., the user can control for anything/the default can be anything), for example, drugs as contents side by side medical devices as contents side by side medical procedures as contents side by side clinical trials as contents side by side specialists as contents side by side Xs as contents side by side a mixed result.

In some embodiments, the user can control (default can be anything), for example, to have (or, e.g., control to not have) source indicators used. In some embodiments, for example, wherein medical conditions are contents, the source indicators can comprise one or more, for example, healthcare/ health/medical video(s), audio(s), and/or image(s) (e.g., a video and an image, or e.g., two videos, or e.g., two images, or the like. In some embodiments, the user can control for anything. In some embodiments, the default can be anything). In some embodiments, a source indicator can comprise one or more images (e.g., of respective content for/ from/used by/the like respective source), for example, medical images, for example, of, for example, a respective medical condition content from (or e.g., used by (e.g., to make or help make a diagnosis) a respective source. In some embodiments, for example, if medical condition x is a ranked content, a respective source indicator therefore can comprise a respective image of the respective content from/ used by/the like the respective source (e.g., X-ray (or otherwise) for/of, for example, injury X). In some embodiments, the user can control for anything. In some embodiments, the default can be anything. In some embodiments, multiple images can be comprised in a single source indicator, for example, if the content is a medical condition content (or not), a respective source indicator can comprise, for example, an image of respective condition before, for example, non-condition content(s) from respective source, and an image of respective condition after, for example, non-condition content(s) from respective source. In some embodiments, the user can control for anything. In some embodiments, the default can be anything.

In some embodiments, for example, wherein a non-medical condition content (e.g., T-cell therapy, etc) is a ranked content, the image (or e.g., video or audio) is pre-content, post content, or even intra-content (e.g., intra-operative, e.g., image), for example, of the respective medical condition (and/or, e.g., of the respective non-medical condition content, e.g., a medical product; for example, can have medical condition image on one side of a respective source indicator, and medical product image on the other side of the respective source indicator). In some embodiments, for example, a single source indicator can comprise, for example, pre, intra, and post content, for example, images. In some embodiments, for example, a single source indicator can comprise, for example, just one image (or e.g. two images, for example, left (or, e.g., top) half of indicator can comprise pre content image (or images), and right or bottom half can comprise post content (e.g., can after certain amount of time has passed, for example, 45 days have passed/image from $45^{th}$ day can be used) image (or images)), for example, a pre content image (or e.g., multiple pre content images), for example, an X-ray (or, e.g., PET scan, etc), for example, of, for example, Synovial Sarcoma (e.g., see Adaptimmune Therapeutics' before treatment with NY-ESO TCR and/or after treatment with NY-ESO TCR image(s)) image(s)). In some embodiments, the user can control for anything. In some embodiments, the default can be anything.

In some embodiments, medical exam(s)/test(s)/the like result(s)/report(s)/the like, for example, can be used, for example, for searching, filtering, tie breaking, weighting, and/or the like. In some embodiments, one or more medical test(s) result(s) data, info, characteristic(s), property(ies), can be used, for example, for searching, filtering, tie breaking, weighting, and/or the like. In some embodiments, for example, a medical test's result's data, info, characteristic(s), property(ies), can be used, for example, for searching, filtering, tie breaking, weighting, and/or the like. In some embodiments, grouping of contents can be grouped for each possible (e.g., for a certain population) medical test result, for example, the groupings can be ordered, for example, using most common/prevalent first to the top, then second can be below first, then third grouping below second, and so forth. In some embodiments, for example, user's medical test's result's data/info can be used to make that respective grouping of contents as, for example, the first to the top grouping (e.g., even if otherwise would not be there) and/or user's grouping can fall where it falls organically/naturally, but for example be indicated as to inform the user that the grouping is the user's, which can also be done if the grouping is instead or additionally at the top/as the top grouping because it is the user's. In some embodiments, the groupings can be ordered, for example, based on, for example, amount of references using all contents from a respective grouping, or for example using the highest ranked content of each grouping as the group/grouping representative, and either the former or the latter can be used as a tie breaker for the whichever one is used. In some embodiments, amount of references for a grouping and amount of references for the highest ranked content of a grouping, can be added together for a single total that is used to order the grouping against other grouping(s) (and either or both can be used, for example, for tie breaking, and/or weighting). In some embodiments, for example, user's medical test's result's data/info can be used to make that respective grouping of contents as, for example, the first to the top grouping (e.g., even if otherwise would not be there) and/or user's grouping can fall where it falls organically/naturally, but for example be indicated as to inform the user that the grouping is the user's, which can also be done if the grouping is instead or additionally at the top/as the top grouping because it is the user's. In some embodiments, a respective grouping can have respective content thereof as a single result, or, for example, can have, for example, a result for Xs only, side by side a result for Ys only, side by side a result for Zs only, side by side a mixed result. In some embodiments, the user can control for anything. In some embodiments, the default can be anything.

In some embodiments, immunotherapies can be contents. In some embodiments, a content could be, for example, a website, IMCgp100, Epidiolex®, a biologic, cognitive behavioral therapy (CBT), systematic desensitization, gene therapy, or hardware.

In some embodiments, contents can be, for example, therapeutics, diagnostics, cell-based therapies/cell therapies (e.g., genetically engineered T-cell therapies, etc), books, articles, videos, audios, or Apps.

In some embodiments, contents can be monoclonal antibodies, bispecific antibodies, trispecific antibodies, or checkpoint inhibitors.

In some embodiments, for example, a combination of contents can be single ranked contents, for example, a combination of contents can be referenced and the referenced combination of contents can be a single ranked content (e.g., content x and content y as a single ranked content); for example, side by side no combination of contents as a single ranked content, for example, a referenced combination of contents not as a single ranked content but as separately/independently ranked contents (e.g., a result can comprise content x (e.g., Opdivo®) as a single ranked content and content y as a single ranked content, for example, can contribute references even if referenced not by themselves but in combo/as a combination (e.g., default can be or user can control so, for example, can use only references for single contents, or extract references from referenced combo of contents/content combo and apply for single contents/single ranked contents, or both; in regard to a result comprising no combo of contents as a single ranked content)).

In some embodiments, the temporal order of contents can be used, for example, a single ranked content can be a referenced combination of contents (e.g., X, Y, and Z) but wherein the order of contents needs to be exact (e.g., x then y then z as single ranked content, and x then z then y as a different single ranked content, and so forth) or else it would be a different ranked content. In one embodiment, a single ranked content could be, for example, X, then Y, then if Z, then ABC, but if not Z, then DEF. In some embodiments, the user can control for anything. In some embodiments, the default can be anything.

In some embodiments, genetic information/data can be used, for example, for searching, filtering, tie breaking, weighting, and/or the like.

In some embodiments, the user can control for anything. In some embodiments, for example, in some embodiments, what tie breaker(s) are/is used, and/or order(s) of tie breaker(s), can be controlled for by user. In some embodiments, the default can be anything.

In some embodiments, the user can control, for example, for any weighting(s). In some embodiments, the default can be anything.

In some embodiments, the user can control for anything. In some embodiments, the default can be anything.

Mixed Content Types

An aggregation of information can be presented so that other search engines and databases, including those available through a search engine like Google® and Bing®, can be performed and the results presented side-by-side together. In some cases, multiple types of searches (e.g., educational content searches, medical content searches, web search engines like GOOGLE and BING and BAIDU and YANDEX, video/audio content searches like available through YOUTUBE, and specific database searches) can be performed and presented simultaneously in a side-by-side arrangement (side bar—e.g., even, for example, Twitter, Facebook, Amazon, Alibaba, eBay, and/or clinicaltrials.gov, can be presented in a side-by-side arrangement (the user can control for anything/the default can be anything)). For example, if a user searches for the term "epilepsy," a search result presentation having varied content types, such as medical content, educational content, internet search results, internet video/audio, and television content may be desirable.

In some cases, the multi-type search can involve a universal query (e.g., a same query or terms and/or filtering applied to all search types being presented) and specific search query functionality associated directly with each search type. In this manner, various levels of granularity of searching may be applied. In some implementations, multiple types of content may be ranked and grouped within the respective content type and then presented together.

Figure 10:
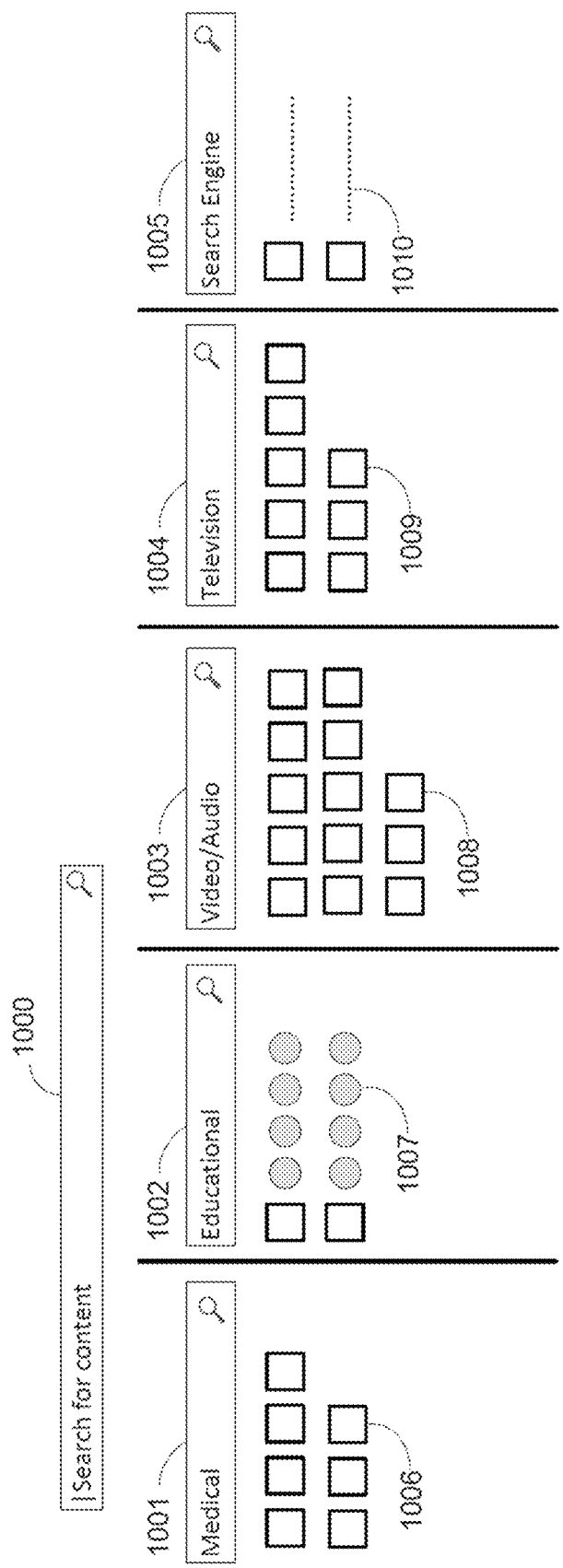
FIG. 10 shows an example search result presentation having multiple content types.

FIG. 10 shows an example search result presentation having multiple content types. In response to receiving a search query in the search input field 1000 of a user interface, an ordered listing of various types of content can be displayed. Medical content 1001 and educational content 1002 may be shown alongside audio/video 1003, television 1004, and search engine 1005 content. In some cases, audio/video content may be displayed within the medical and/or educational content. It should be noted that the types and categorizations for a search result presentation having multiple content types will be dependent on the nature and terms of the search query, as well as on user preferences which may be set using additional user interface elements (not shown). In some cases, a search input field may be provided for each content type in the search result presentation, e.g., separate search interface elements appropriate to searching and/or filtering within the medical content and/or the educational content or other types of content.

Medical content 1001 may include results ordered or grouped in several ways, for example as shown in FIGS. 9A-9D. In the case of a search query for "epilepsy," for example, medical content may include therapies, procedures, and drugs (including medicinal use of *Cannabis* as a therapy). Depending on the nature of the results, search results may be grouped or ordered 1006 by content type, sub-type, or other filter as described, for example by placing medical devices side by side with pharmaceuticals side by side with medical procedures.

Educational content 1002 may include results presented in a variety of ways 1007, discussed with respect to FIGS. 3A-3E, 4, and 5. For example, indicators may present rankings information, indicator popups may show further information about sources, and content may be navigable with further navigation interfaces. In the case of a query for "epilepsy," for example, educational content may include textbooks, journal articles, or other content related to the topic.

In some cases, educational content may include audio/video content, as previously described; however, sometimes audio/video content may be grouped as its own content type 1003. Audio/video content 1003 may, of course, be further grouped and filtered 1008, for example by website (e.g., YouTube®, Coursera®), and/or by sub-type (e.g., lectures, entertainment, how-to). Searches or filters for audio/video content can include, e.g., movie, series, show, season, episode, category (e.g., comedy, sports, documentary), commentator, speaker, time slot, channel, producer, and/or key actors. These are merely examples of filters that may be applied based on content metadata and are not intended to be limiting. Additional navigation interfaces (not shown) for directing the user to specific content within an audio or video file, for example by transcribing a video and searching for terms within the transcription, may be provided in some cases. Navigation interfaces for videos were discussed with respect to 357 of FIG. 3D. In the case of a query for "epilepsy," for example, an internet audio/video search result might include a training video depicting the proper first aid procedure for a person having an epileptic seizure. Any and all educational content, including search bars to search specific content, may be presented side by side other content. In some cases, content may be presented in multiple side by side interfaces simultaneously, as for example when an audio/video is included both as class content and as a search result content from a video sharing site such as YouTube®.

A single video/audio content can be traversed like a specific content match can be, wherein descending ranked previews for transcripts with matches and video/audio at the time of the match so when user hits play the video and transcript run simultaneously, although one or the other could be searched or traversed independently (e.g., search merely the transcript side by side leaving the video where it was/is, traverse the video by the matches therein but leave the transcript or preview in place). Both can be searched/traversed at once as to make the transcript always match the video/audio, even when traversing both or one or the other even, and even when playing the video/audio as to have the transcript thereto run with it while being next to it in the other of the side by sides.

Television content 1004 may be ranked according to techniques disclosed herein where referencing can include viewership. Television content 1004 may be filtered and/or grouped, such as by content type 1009 (e.g., news, documentary, drama) and origin (e.g., Bloomberg, CNBC, CNN, CBS). In the case of a query for "epilepsy," for example, a TV search result might include a documentary on epilepsy research recently airing on an educational channel.

Viewership for TV could be determined for a specific second or for highest point in the TV program. Viewership for TV transcribed embodiments (and/or internet video/ audio embodiments), can be done multiple ways. For example, each show or TV program can be used unlimited amounts of times for the ranking as to have every match be an independent content ranked and allow for a single show in the same hour to be ranked more than once in the ranking; each show or program can be merely a single ranked content (for rankings, but queued at first to the highest ranked match for the content) only once for that particular show (such as a different episode of a series); only allow a specific episode to be a single content in the ranking of all TV contents, but have the episode be queued to highest ranked match therein, and be traversed by the rank of matches. Controls for traversing matches (e.g., front to back, back-to-front) may be present.

Ranking of video/audio can be used as a tie breaker for video/audio with the same amount of references (or vice versa). Also, in some embodiments, viewership may serve as a tiebreaker. In some cases, video/audio rank based on viewership rank may be crossed with other rankings to alter the rankings. In some cases, viewership ranking and number of websites pointing at the video/audio may be combined to alter the rankings. In some cases, the relative contribution of number of referencing websites and content viewership may be weighted and/or user-adjustable. For example, each of these factors (viewership and referencing amount) may initially be equally rated, and the user may be abled adjust the relative importance of each type of tiebreaker in a particular search.

In some embodiments, additional content types may be shown. For example, traditional search engine results 1005 may be shown in some cases to display other relevant content 1010. In some cases the search engine results may be modified or grouped as appropriate. In some cases the search engine results may be positioned side by side with other search engine results but grouped in a content category.

Certain aspects may be made suitable for small form factors such as available through smartphones. In some embodiments for either within book search for matching words and/or a search for content in general, indicators may be omitted and/or represented in a different manner. For example, a link can be provided instead of a set of icons so that a user can select the link to see the source (or sources) that references the content. As another example that may be used in addition to or as an alternative to the link, a number, ratio or percentage can be provided adjacent the content title or description to indicate number of times the content is referenced (and provide a rank).

Certain aspects may be included that are suitable for large form factors. For example, large displays or projector screens may enable multiple results listings and previews. In addition, side-by-side views can be provided in a user interface to enable independent searching, filtering and/or types of results within a same view screen. For example, individual selections of content, content groups, content categories, or content grouped by filter types may be presented as their own side-by-sides. As another example, results from multiple search sources, e.g., websites such as Google®, Bing®, Baidu®, and WebMD®, may be presented as side-by-side views in a user interface. In some cases, the search results for the search query may be shown unmodified as returned from the search source, and in some cases the results from a search source may be filtered, ranked, and presented in one or more of the manners described herein. Sometimes, comparative results may be shown. In some cases (not shown in FIG. 10), additional search query boxes or interface elements may allow the user to search within the results of a single side-by-side view. In some embodiments, a side-by-side view may be divisible into further side-by-sides, for example educational content may be divisible into further side-by-sides containing books and videos separately; also, for example, a video only result may be divisible into further side-by-sides grouped by website (e.g., YouTube®, Coursera®, etc.).

The side-by-side views may be customizable and/or adjustable by the user in a particular search.

It should be noted that the described search and ranking engine may be accessible via a personal assistant such as Siri® available from Apple Inc., Google Now®, or Cortana® available from Microsoft Corp. Search Queries may be input through voice commands or by touch or text or other input.

Figure 11:
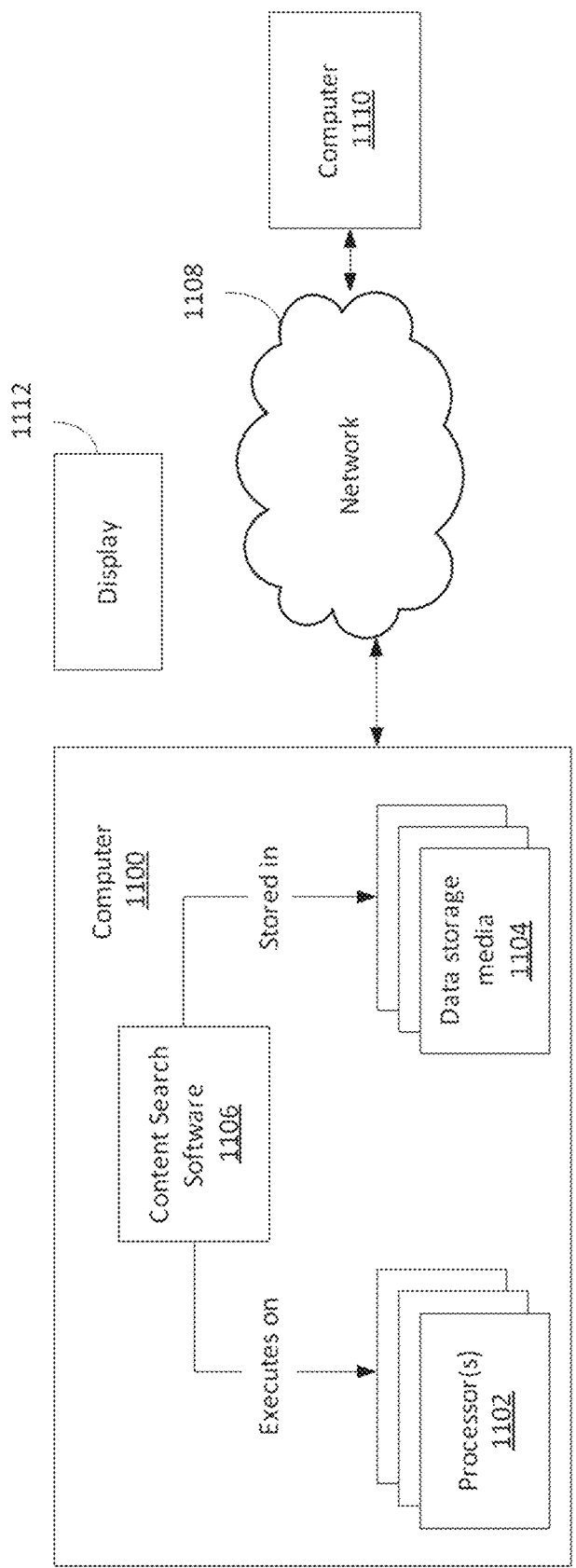
FIG. 11 is a block diagram of example components that may be used in connection with implementations of the subject matter described herein.

FIG. 11 shows an example environment in which aspects of the subject matter described herein may be deployed.

Computer 1100 includes one or more processors 1102 and one or more data storage media 1104. Processor(s) 1102 are typically microprocessors, such as those found in a personal desktop or laptop computer, smartphone, tablet, a server, a handheld computer, or another kind of computing device. Data storage media 1104 are components that are capable of storing data for either the short or long term. Examples of data storage media 1104 include, but are not limited to, hard disks, removable disks (including optical and magnetic disks), volatile and non-volatile random-access memory (RAM), read-only memory (ROM), flash memory, magnetic tape, and the like. The data storage media may also include other computer-readable storage media; however it should be understood that the data storage media and computer-readable storage media do not include propagating signals and carrier waves.

The computer 1100 may include, or be associated with, display 1112, which may be a cathode ray tube (CRT) monitor, a liquid crystal display (LCD) monitor, or any other type of monitor or display device.

Software may be stored in the data storage media 1104. The software can be executed by the one or more processor(s) 1102. An example of such software is content search software 1106, which may implement some or all of the functionality described herein, although any type of software could be used. Software 1106 may be implemented, for example, through one or more components, which may be components in a distributed system, separate files, separate functions, separate objects, separate lines of code, etc.

A computer in which a program is stored on hard disk (or solid state drive or other storage media), loaded into RAM, and executed on the computer's processor(s) typifies the scenario depicted in FIG. 11, although the subject matter described herein is not limited to this example. Computer 1100 can be a personal desktop or laptop computer, smartphone, tablet, a server, a handheld computer, smart TV, gaming device, wearable device such as Apple Watch® or Google Glass®, or another kind of computing device.

The subject matter described herein can be implemented as software that is stored in one or more of the data storage media 1104 (or computer-readable storage media) and that executes on one or more of the processor(s) 1102. The instructions to perform the acts could be stored on one medium, or could be spread out across plural media, so that the instructions might appear collectively on the one or more computer-readable storage media, regardless of whether all of the instructions happen to be on the same medium. It is noted that there is a distinction between media on which signals are "stored" (which may be referred to as "storage media"), and—in contradistinction—media that contain or transmit propagating signals. DVDs, flash memory, magnetic disks, etc., are examples of storage media. On the other hand, wires or fibers on which signals exist ephemerally are examples of transitory signal media. Thus, it will be understood that a storage media is non-transitory.

Additionally, any acts described herein (whether or not shown in a diagram) may be performed by a processor (e.g., one or more of processors 1102) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C. In one example environment, computer 1100 may be communicatively connected to one or more other devices through network 1108. Computer 1110, which may be similar in structure to computer 1100, is an example of a device that can be connected to computer 1100, although other types of devices may also be so connected.

Figure 12:
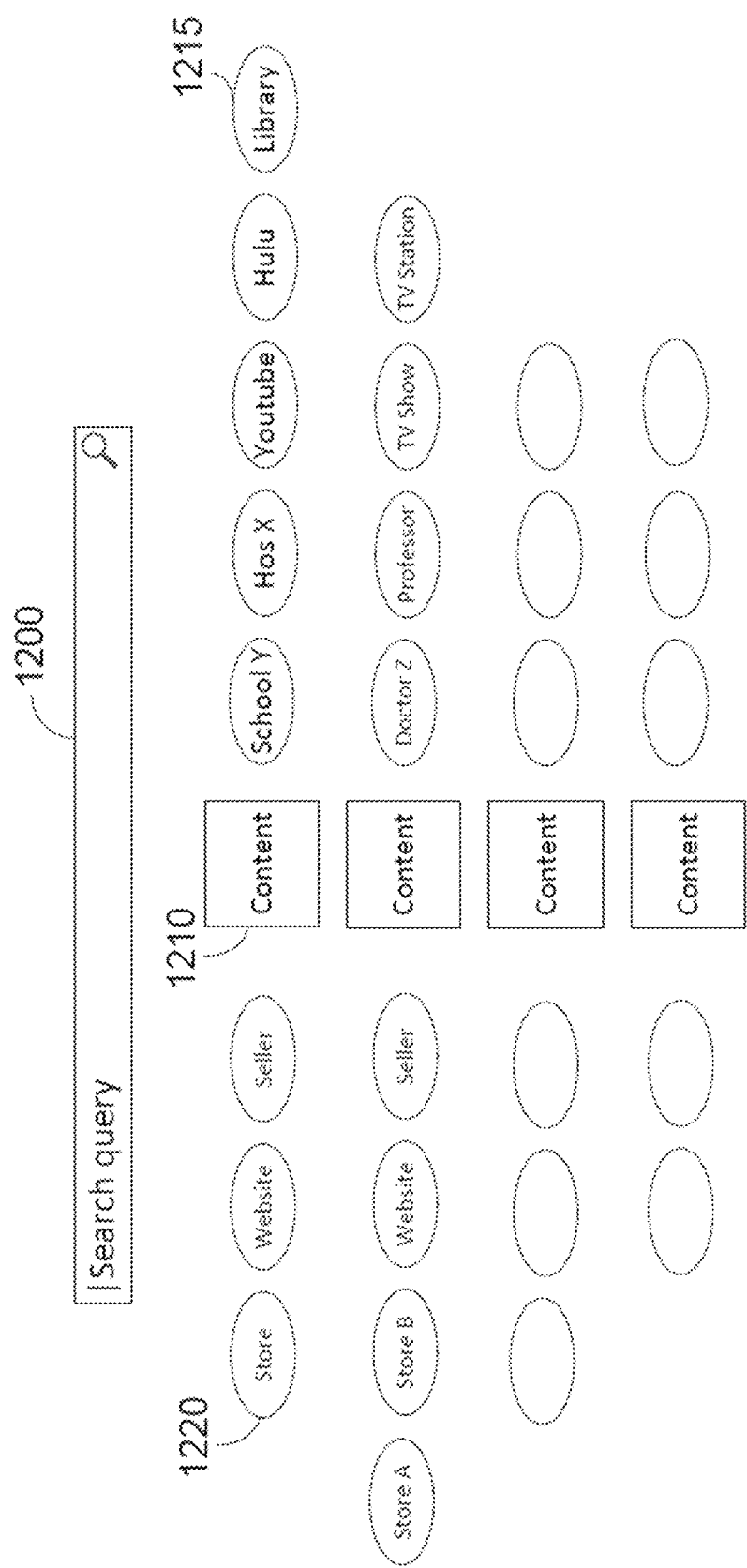
FIG. 12 shows an example of a search result.

FIG. 12 shows an example of a search result list presentation containing mixed content and commercial sources. In FIG. 12, the search results have a mixed list of referencing source types, rather than being grouped by referencing source type, as in FIG. 10. In response to receiving a search query in the search input field 1200 of a user interface, an ordered listing of content 1210 can be displayed. The content 1210 can be, for example, educational content, medical content, video/audio content, search engine content, library content, and/or television content as described with respect to FIG. 10. The content 1210 may be presented, as described herein, ordered the number of references and applying tiebreakers, weighting, rank points, and other factors as previously described.

Results of the search can be presented with indicators 1215 showing sources of the reference. For example, an indicator 1215 (e.g., a badge or icon) may show the referencing entity for an educational institution (or subdivision or entity, such as professor name, department name, class), hospital, doctor, website, TV show, TV station, video library, etc. Several non-limiting examples of the types of content that may be shown in an indicator 1215 are shown in FIG. 12. The indicator may have information that can support the ranking of the content (e.g., provide information regarding the relevancy) and/or provide additional information that a user may use to select content or obtain additional information.

FIG. 12 also shows examples of commercial content indicators 1220. Commercial content indicators 1220 may show the availability of content 1210 for purchase, lease, or download, for example. The commercial content indictors 1220 may show, for example, a brick-and-mortar store, website, app, or even a particular seller on a website. The commercial content indicators 1220 can be ordered, e.g., the left-most or right-most being the most significant for a particular content 1210. The ordering of the indicators may be determined using tiebreakers, for example, price, location of the user with respect to the commercial source, the alphabetical order of the commercial source name, and user ratings. In some implementations, the user can control which tiebreakers are used, the relative weights of the tiebreakers, and the order or priority of the tiebreakers (e.g., the user may specify that price is more important to the ordering than location).

In some implementations, the number or type of commercial content indicators 1220 can affect the overall ranking of the search results (e.g., the top-to-bottom ranking of the content 1210). In FIG. 12, for example, the number of commercial content indicators may break a tie between two contents with an equal number of reference source indicators.

In some embodiments, the user can control for anything. In some embodiments, for example, in some embodiments, what tie breaker(s) are/is used, and/or order(s) of tie breaker(s), can be controlled for by user. In some embodiments, the default can be anything.

In some embodiments, the user can control, for example, for any weighting(s). In some embodiments, the default can be anything.

In some embodiments, for example, source location(s), and/or user location(s), and/or content location(s), and/or reference location(s), can be used, for example, for searching, filtering, tie breaking, weighting, and/or the like. In some embodiments, the user can control for anything. In some embodiments, the default can be anything. In some embodiments, within distance x from user's current location can be used, and/or user can control by location(s), place(s), territory(ies), jurisdiction(s), nation-state(s), country(ies), state(s), continent(s), county(ies), school district(s), city(ies), town(s), and/or the like, for example, for searching, filtering, tie breaking, weighting, and/or the like. In some embodiments, a map can be side-by-side a result of contents, for example, commercial contents; and, for example, in some embodiments, a map could, for example show sources and/or contents currently being referenced/currently referencing within a certain distance controlled for by user (or defaulted); for example, a single image (or e.g. video or audio) of respective content can be used (e.g., an image provided by the source (or e.g. provided by a user or otherwise (e.g., third party)) can be used, and/or e.g., an image rated highest by users/voted on/liked the most/the like can be used, or for example, the e.g., top 5 images can be used, for example highest rated in center and the other 4 can be one on top, one to left, one to right, and one on bottom, the center image of the top ranked/rated/liked/the like image, or for example, simply have a single image on top of the source's location on the map, or e.g., a single (or multiple images (e.g., 2, or 3, or X), or all images) image comprised within a source indicator (e.g., can be any shape(s), e.g., can be different shape for each different source characteristic, or e.g., all (or some) are the same. Side bar—this can be used for source indicators for contents) on a map. In some embodiments, the user can control for anything. In some embodiments, the default can be anything.

In some embodiments, for example, telemedicine/the like can be used. In some embodiments, a healthcare provider, for example, healthcare professional, for example, a doctor on demand (and/or, e.g., Watson/the like (e.g., both Watson and a healthcare professional can be used at the same time, or individually (the user can control for anything/the default can be anything))), can be side-by-side a ranked result (or simply in the air as to not be side-by-side as a result, as user/patient does not need to see a person (but can, as user can control for anything, and default can be anything), and definitely need not see IBM's Watson); for example a relevant specialists could automatically (or by user's control) appear side-by-side a result in response to a query, or for example, an option is presented, for example a button to start the, for example, video (or audio) conference side-by-side a ranked result, or for example, user can control for an advance so the healthcare provider is presented side-by-side a result. In some embodiments, a healthcare professional can have as much (e.g., all, or less) or as little access to the user's data/info as the user wants. In some embodiments, certain sensor(s) data can cause a healthcare professional to appear side-by-side result of contents, or full screen, but for example the healthcare professional has a result of contents side-by-side user, for example, video conference; for example, in an emergency this would be quite useful, especially because relevant emergency personnel can be contacted, given results and user's current location and sensor data and other user data/info and/or the like; and in some embodiments, the personnel that is for example on the way to user, can be the telehealthcare provider, or have access to that audio and/or video, and the result of contents (side bar—in some embodiments, healthcare providers (e.g., Watson, professional) can control for/do anything). In some embodiments, the healthcare provider can do everything user can, and see/access/use everything user can. In some embodiments, the telehealth/medicine provider can take over for user, as to guide the user, for example working with the user to, for example, search, filter, tie break, weight, and/or the like, and/or to, for example, understand results, talk about data/info, talk about options, reference content, and/or so forth. In some embodiments, the healthcare provider can merely see and talk to the user. In some embodiments, the medical provider can use the user's data, info, characteristic(s), for example, for searching, filtering, tie breaking, weighting, and/or the like. In some embodiments, a map can be side-by-side a result of contents side-by-side healthcare professional. In some embodiments, the user can control for certain telehealth provider(s) e.g., certain professional(s) (and/or certain characteristic(s) of professional(s)) and/or service(s). In some embodiments, for example, one or more images, videos, and/or audios, can be provided to a healthcare provider by, for example, user. In some embodiments, a live video conference (or audio conference) will allow or help a healthcare professional find out data/info, see (or hear, or hear about) a medical condition (e.g., injury X), talk to user/patient, and/or the like. In some embodiments, user can control for anything, and default can be anything. In some embodiments, for example, language(s) (e.g., spoken, written, or signed (e.g., ASL)) can be used, for example, user can control for (or default can be) only professional(s) (e.g., one professional side-by-side a result of contents side-by-side another professional, as to have two professionals helping the user) that, for example, speak language X.

In some embodiments, the user can control for, for example, what specific source(s) are used, and/or what specific group(s) of sources are used, and/or what source type(s), and/or category(ies), and/or characteristic(s), and/or information, and/or kind(s), and/or property(ies) and/or brand(s), and/or the like, are used. In some embodiments, the user can control so certain sources or certain source characteristic(s) are used, for example, to make some source(s) only used for, for example, tie breaking and/or weighting (or not, e.g, all (or some) sources used not simply for tie breaking and/or weighting). In some embodiments, such sources can, for example, if source indicators are used, have source indicators thereof going, for example, to the left of respective contents. In some embodiments, what sources are used, and which way source indicators go, and if there are source indicators used at all or for some sources, and/or the like, is all completely controllable by the user, and the default can be anything. In some embodiments, for example, X (e.g., commercial, TV, internet (e.g., internet video/audio, internet search engine), educational, medical, library, and/or part) source indicators can go to the left of contents, and Y source indicators to the right of contents. For example, commercial to the left and part source indicators to the right. For example, all source indicators to, for example, the right.

For example, X Y and Z to the right but A to the left. For example, W and Y to the right and X and Z to the left. In some embodiments, the user can control for anything. In some embodiments, the default can be anything. In some embodiments, the user can control so sources to the left and to the right are used the same way, for example the left is not merely for tie breaking and/or weighting and/or the like, but used as if was on the right even though source indicators are going to the left. In some embodiments, the user can control for anything. In some embodiments, the default can be anything. In some embodiments, everything is used. In some embodiments, some user controlled for or defaulted sources are only used for tie breaking and/or weighting. In some embodiments, user can control for, for example, what source indicators go to the right of contents, and what source indicators go to the left of contents, and/or what sources have source indicators, if any do at all. In some embodiments, the default can be anything. In some embodiments, the user can control for anything.

In some embodiments, source indicators can be used for some sources but not for others (or not used for any sources, or used for all sources. The user can control for anything. The default can be anything). In some embodiments, for example, the user can control so specific source(s) or specific source characteristic(s), for example, source type(s) and/or source category(ies) and/or source information, are used to, for example, for searching, filtering, tie breaking, weighting, and/or the like. In some embodiments, the user can control for anything (e.g., by, for example, using various means/interface elements). In some embodiments, the default can be anything.

In some embodiments, the user can control (or default be) to have as many side-by-sides as user wants (default is), and whatever composition(s), and whatever controls, and whatever sources, contents, reference types, and/or otherwise, user wants to control for, can be controlled for by user, and the default can be anything. In some embodiments, user can control for any, for example, searching, filtering, tie breaking, weighting, and/or the like, for any or all or just some of, the results that are or will be side by side one another. In some embodiments, the user can control for anything. In some embodiments, the default can be anything.

In some embodiments, for example, reference type(s), can be used, for example, for searching, filtering, tie breaking, weighting, and/or the like. In some embodiments, the user can control for anything. In some embodiments, the default can be anything.

In some embodiments, the user/the like can control for anything(s). In some embodiments, the default(s) can be anything(s).

In some embodiments, for example, a healthcare provider can control for anything(s).

In some embodiments, images can be contents, for example, a result of image contents only side-by-side a mixed result is possible. In some embodiments, user can control for anything, for example, have X and Y mixed for single result side-by-side Z only side-by-side everything mixed, and/or the like. In some embodiments, the user can control for anything. In some embodiments, the default can be anything.

In some embodiments, user data/info (e.g., characteristic(s)) (e.g., student data/info, patient data/info, customer data/info, and/or X data/info) can be used, for example, for searching, filtering, tie breaking, weighting, and/or the like. In some embodiments, the user can control for anything. In some embodiments, the default can be anything.

In some embodiments, user can control for or default be, for example, Pre-K only (or, e.g., K-12 only, or K-5 only, or 5$^{th}$ grade only, or higher education only, or college and universities only, or medical schools only, or law schools only, or X degrees only, or charter schools only, or X schools only, or high school only, or elementary school only, or 3$^{rd}$-5$^{th}$ grade only, or x-y grade only, and/or the like, and/or any combination(s) thereof), for example, for searching, filtering, tie breaking, weighting, and/or the like. In some embodiments, user can control for anything. In some embodiments, the default can be anything.

In some embodiments, for example, primary schools, secondary schools, trade schools, and/or tertiary schools, can be used for, for example, searching, filtering, tie breaking, and/or weighting.

In some embodiments, for example, sources can be (e.g., can have source indicators for (or not)), for example, degrees, majors, degrees/majors, minors, degree/minors, certificates, class names, departments, schools/colleges within schools/colleges/universities, teachers, schools, educational services, services, Watson/the like, and/or the like, and/or any combination(s) thereof. In some embodiments, whether as source(s) (or not as source(s)) and/or otherwise (e.g., used e.g., for searching, filtering, tie breaking, and/or weighting), the user can control to use any of the foregoing (e.g., degrees, etc) or the like, or specific ones (eg specific degrees, specific etc), or specific characteristic(s), information, and/or the like, and/or any combination(s) thereof, for example, for searching, filtering, tie breaking, weighting, and/or the like. In some embodiments, the user can control for anything. In some embodiments, the default can be anything.

In some embodiments, for example, the user can control for (or default can be), in regard to, for example, source indicators and/or rank points, to limit (e.g., to e.g., most e.g., one, or two, or three, or any number/amount user wants to control for, or default is), and/or have unlimited. In some embodiments, for example, the controls can be the same for both source indicators and for rank points. In other embodiments, for example, the controls can be different for source indicators and rank points, for example, limit a source to, for example, most one source indicator for a respective content, but for example, rank points can be differently limited, or unlimited, or vice versa, for example, source indicators unlimited and rank points limited to most one rank point, or for example, both can be limited to most, for example, one, or for example, both can be unlimited (e.g., the user can control for anything, and the default can be anything). In some embodiments, the user can control (or default be), for example, so reference, and/or source, and/or content, and/or patient/subject/the like, for example, data, information, characteristic(s), property(ies), type(s), category(ies), kind(s), and/or the like, can be used, for example, to determine if limited and/or how limited and/or the like, as (like always), in some embodiments, user can control for anything/default can be anything.

In some embodiments, for example, user(s), and/or content(s), and/or source(s), and/or reference(s), and/or patient(s)/subject(s)/the like, and/or customer(s), and/or client(s), and/or student(s), and/or the like, for example, data, information, type(s), category(ies), kind(s), characteristic(s), brand(s), functionality(ies), feature(s), function(s), factor(s), circumstance(s), situation(s), scenario(s), and/or property(ies), can be used, for example, for searching, filtering, tie breaking, weighting, and/or the like (e.g., in some embodiments, the user can control for/do anything. In some embodiments, the default can be anything).

In some embodiments, for example, patient's, and/or student's, and/or customer's, and/or client's, and/or user's, and/or subject's, and/or plant's, and/or animal's, and/or content's, and/or reference's, and/or source's, for example, data, information, type(s), category(ies), kind(s), characteristic(s), brand(s), functionality(ies), feature(s), function(s), factor(s), circumstance(s), situation(s), scenario(s), and/or property(ies), can be used, for example, for searching, filtering, tie breaking, weighting, and/or the like (e.g., in some embodiments, the user can control for/do anything. In some embodiments, the default can be anything).

In some embodiments, recency of the reference(s) data/recency data (e.g., characteristic(s)) can be used, for example, for searching, filtering, tie breaking, weighting, and/or the like. In some embodiments, user can control for anything. In some embodiments, the default can be anything.

In some embodiments, the user can control for anything(s). In some embodiments, the default can be anything(s).

Non-limiting examples of features and implementations of the subject invention are described below:

EXAMPLES

Example 1: A method for facilitating commercial content search and results, the method comprising: identifying a plurality of commercial content in response to receiving a search query; identifying a number of times each commercial content of the plurality of commercial content has been referenced by sources of a set of at least one designated source; and generating a search result of the plurality of commercial content that is ordered based on the number of times each commercial content has been referenced.

Example 2: The method of example 1, wherein the commercial content is menu content.

Example 3: The method of example 1, wherein the set of at least one designated source comprises at least one restaurant.

Example 4: The method of example 1, wherein the commercial content comprises menu content and the set of at least one designated source comprises at least one restaurant.

Example 4a: The method of example 1, wherein the commercial content is or comprises menu content and the set of at least one designated source comprises at least one brick-and-mortar source Example 5: The method of example 1, wherein the set of at least one designated source comprises at least one of a restaurant, website, or grocery store.

Example 6: The method of example 1, wherein the set of at least one designated source comprises at least one website.

Example 7: The method of example 1, wherein the set of at least one designated source comprises at least one of a store, restaurant, or website.

Example 8: The method of example 1, wherein the set of at least one designated source comprises at least one store.

Example 9: The method of example 1, wherein the set of at least one designated source comprises at least one brick-and-mortar source and at least one website source.

Example 10: The method of example 1, wherein the set of at least one designated source comprises at least one brick-and-mortar location or at least one website.

Example 11: The method of example 1, wherein the set of at least one designated source comprises a set searched, filtered, selected, or otherwise controlled for by the user.

Example 12: The method of example 4, wherein the menu content comprises menu item content.

Example 12a: The method of example 4, wherein the menu content comprises menu item content or menu item category content.

Example 12b: The method of example 4, wherein the menu content comprises menu item content and menu item category content.

Example 12c: The method of example 12b, wherein menu item content and menu item category content are presented in separate results that are side-by-side one another.

Example 12d: The method of example 12b, wherein menu item content and menu item category content are not in separate results that are side-by-side one another, but are in a single mixed result comprising both menu item content and menu item category content.

Example 13: The method of example 1, wherein identifying the plurality of commercial content comprises searching a database of commercial content organized by content name, content category name, and source name.

Example 13a: The method of example 1, wherein identifying the plurality of commercial content comprises searching a database of commercial content organized by product name, product category name, and source name.

Example 13b: The method of example 1, wherein identifying the plurality of commercial content comprises searching a database of commercial content organized by service name, service category name, and source name.

Example 14: The method of example 1, wherein identifying the plurality of commercial content comprises searching a database of commercial content by one or more of content name and content category name.

Example 15: The method of example 12, wherein identifying the plurality of commercial content comprises searching a database of commercial content by one or more of menu item content name and menu item category content name.

Example 16: The method of example 12, wherein identifying the plurality of commercial content comprises searching a database of commercial content organized by menu item name, source name, and menu item category name.

Example 17: The method of example 1, wherein the commercial content is *Cannabis* or comprises *Cannabis* or any part thereof.

Example 17a: The method of example 1, wherein at least one resulting commercial content is or comprises *Cannabis* or any part thereof.

Example 17b: The method of example 1, wherein the commercial content is *Cannabis* or a product comprising *Cannabis* or any part thereof.

Example 17c: The method of example 1, wherein the commercial content comprises *Cannabis* flower.

Example 17d: The method of 17c, wherein each commercial content is a different strain of *Cannabis*.

Example 17e: The method of example 17d, wherein generating the search result of the plurality of commercial content comprises: ordering the search result with most referenced first and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Example 17f: The method of example 17d, wherein generating the search result of the plurality of commercial content comprises: ordering the search result with least referenced first and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Example 17g: The method of example 17d, wherein generating the search result of the plurality of commercial content comprises: ordering a search result with most referenced first side-by-side an additional search result ordering the search result with least referenced first, and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Example 17h: The method of example 17, wherein generating the search result of the plurality of commercial content comprises: ordering a search result with most referenced first side-by-side an additional search result ordering the search result with least referenced first, and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Example 17i: The method of example 17c, wherein each commercial content is a different phenotype of *Cannabis*.

Example 17j: The method of example 17c, wherein each commercial content is a different genotype of *Cannabis*.

Example 17k: The method of example 17c, wherein each commercial content is a different genotype of *Cannabis* or a different phenotype of *Cannabis*.

Example 17l: The method of example 1, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different phenotype of *Cannabis* flower.

Example 17m: The method of example 1, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different genotype of *Cannabis* flower.

Example 17n: The method of example 1, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different strain of *Cannabis* flower.

Example 17o: The method of example 1, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different genotype of *Cannabis* flower or a different phenotype of *Cannabis* flower.

Example 17oo: The method of example 1, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein two search results are generated side-by-side one another, wherein one result comprising each commercial content being a different genotype of *Cannabis* flower and the other result comprising each commercial content being a different phenotype of *Cannabis* flower.

Example 17p: The method of example 17l, wherein generating the search result of the plurality of commercial content comprises: ordering a search result with most referenced first side-by-side an additional search result ordering the search result with least referenced first, and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Example 17q: The method of example 17m, wherein generating the search result of the plurality of commercial content comprises: ordering a search result with most referenced first side-by-side an additional search result ordering the search result with least referenced first, and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Example 17r: The method of example 17n, wherein generating the search result of the plurality of commercial content comprises: ordering a search result with most referenced first side-by-side an additional search result ordering the search result with least referenced first, and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Example 17s: The method of example 17o, wherein generating the search result of the plurality of commercial content comprises: ordering a search result with most referenced first side-by-side an additional search result ordering the search result with least referenced first, and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Example 17t: The method of example 17oo, wherein generating the search result of the plurality of commercial content comprises: ordering a search result with most referenced first side-by-side an additional search result ordering the search result with least referenced first, and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Example 17z: The method of example 1, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different menu item content.

Example 17zz: The method of example 1, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different menu content.

Example 17zzz: The method of example 17z, wherein generating the search result of the plurality of commercial content comprises: ordering a search result with most referenced first side-by-side an additional search result ordering the search result with least referenced first, and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Example 17zzzz: The method of example 17zz, wherein generating the search result of the plurality of commercial content comprises: ordering a search result with most referenced first side-by-side an additional search result ordering the search result with least referenced first, and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Example 18: The method of example 1, wherein at least one commercial content has at least one respective source indicator adjacent to it.

Example 19: The method of example 1, wherein every commercial content has at least one respective source indicator next to them.

Example 20: The method of example 1, wherein at least one commercial content has all respective source indicators going away from the commercial content.

Example 21: The method of example 1, wherein generating a search result of the plurality of commercial content comprises every commercial content having all respective source indicators going horizontally away from the respective commercial content and wherein a single source can have at most one respective source indicator for a respective commercial content.

Example 21a: The method of example 1, wherein generating a search result of the plurality of commercial content comprises at least one commercial content having at least one respective source indicator going horizontally away from the respective commercial content and wherein a single source can have at most one respective source indicator for a respective commercial content.

Example 22: The method of example 21, wherein respective source indicators are horizontally ordered starting at the right of the respective commercial content and respective source indicators are ordered going horizontally to the right of the respective commercial content.

Example 23: The method of example 22, wherein the source indicators are ordered based on lowest current price of the respective source for the respective content, or based on distance to source from user's current location, or based on ABC order using source names, or any combination thereof.

Example 24: The method of example 23, wherein one or more of lowest current price of the respective source for the respective content, distance to source from user's current location, or ABC order using source names, is used as one or more tie breakers for one or more of lowest current price of the respective source for the respective content, distance to source from user's current location, ABC order using source names.

Example 25: The method of example 1, wherein every commercial content has respective source indicators going horizontally away from the respective commercial content.

Example 26: The method of example 1, wherein a single source can have at most one respective source indicator for a respective commercial content.

Example 27: The method of example 23, wherein each source is limited to at most one respective source indicator for a respective commercial content.

Example 28: The method of example 1, wherein every commercial content has at least one respective source indicator going away from the commercial content.

Example 29: The method of example 1, wherein the commercial content comprises at least one product or at least one service.

Example 30: The method of example 1, wherein the commercial content comprises at least one product and at least one service.

Example 31: The method of example 1, wherein the commercial content comprises at least one product, good, item, or service.

Example 31a: The method of example 1, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different vehicle.

Example 31b: The method of example 1, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different make of vehicle.

Example 31c: The method of example 1, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different model of vehicle.

Example 31d: The method of example 1, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different make and model of vehicle.

Example 31e: The method of example 1, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different make or model of vehicle.

Example 31f: The method of example 1, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different make, model, or year of vehicle.

Example 31z: The method of example 1, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different make of vehicle or a different model of vehicle or a different year of vehicle.

Example 32: The method of example 1, wherein identifying the number of times each commercial content of the plurality of commercial content has been referenced comprises identifying the number of sources that are currently selling, leasing, renting, licensing, or assigning, the commercial content.

Example 32a: The method of example 1, wherein identifying the number of times each commercial content of the plurality of commercial content has been referenced comprises identifying the number of sources that are currently referencing the commercial content.

Example 32b: The method of example 1, wherein identifying the number of times each commercial content of the plurality of commercial content has been referenced comprises identifying the number of sources that have referenced the commercial content.

Example 32c: The method of example 1, wherein identifying the number of times each commercial content of the plurality of commercial content has been referenced comprises identifying the number of times each commercial content of the plurality of commercial content has been referenced.

Example 32d: The method of example 1, wherein identifying the number of times each commercial content of the plurality of commercial content has been referenced comprises identifying the number of sources that are currently referencing the commercial content, or identifying the number of sources that have referenced the commercial content, or identifying the number of times each commercial content of the plurality of commercial content has been referenced, or any combination thereof.

Example 32e: The method of example 1, wherein identifying the number of times each commercial content of the plurality of commercial content has been referenced comprises identifying the number of sources that are currently referencing the commercial content, and identifying the number of sources that have referenced the commercial content.

Example 32f: The method of example 1, wherein identifying the number of times each commercial content of the plurality of commercial content has been referenced comprises identifying the number of sources that are currently referencing the commercial content, and identifying the number of times each commercial content of the plurality of commercial content has been referenced.

Example 32g: The method of example 1, wherein identifying the number of times each commercial content of the plurality of commercial content has been referenced comprises identifying the number of sources that have referenced the commercial content, and identifying the number of times each commercial content of the plurality of commercial content has been referenced.

Example 33: The method of example 1, wherein identifying the number of times each commercial content of the plurality of commercial content has been referenced comprises identifying the number of sources that have sold, leased, rented, licensed, or assigned, the commercial content.

Example 34: The method of example 1, wherein identifying the number of times each commercial content of the plurality of commercial content has been referenced comprises identifying the number of sources that are currently selling, leasing, renting, licensing, or assigning, the commercial content, and identifying the number of sources that have sold, leased, rented, licensed, or assigned, the commercial content.

Example 34a: The method of example 1, wherein identifying the number of times each commercial content of the plurality of commercial content has been referenced comprises identifying the number of sources that are currently selling the commercial content, and identifying the number of sources that have sold the commercial content.

Example 34aa: The method of example 1, wherein identifying the number of times each commercial content of the plurality of commercial content has been referenced comprises identifying the number of sources that are currently selling the commercial content, or identifying the number of sources that have sold the commercial content, or identifying the number of times the commercial content has been sold, or any combination thereof.

Example 34aaa: The method of example 1, wherein identifying the number of times each commercial content of the plurality of commercial content has been referenced comprises identifying the number of sources that are currently referencing the commercial content, or identifying the number of sources that have referenced the commercial content, or identifying the number of times the commercial content has been referenced, or any combination thereof.

Example 34b: The method of example 1, wherein identifying the number of times each commercial content of the plurality of commercial content has been referenced comprises identifying the number of sources that are currently selling and, leasing or renting or licensing, the commercial content, and identifying the number of sources that have sold and, leased or rented or licensed, the commercial content.

Example 34bb: The method of example 1, wherein identifying the number of times each commercial content of the plurality of commercial content has been referenced comprises identifying the number of sources that are currently selling and, leasing or renting or licensing, the commercial content.

Example 34bbc: The method of example 1, wherein identifying the number of times each commercial content of the plurality of commercial content has been referenced comprises identifying the number of sources that have sold and, leased or rented or licensed, the commercial content.

Example 34bbb: The method of example 1, wherein identifying the number of times each commercial content of the plurality of commercial content has been referenced comprises identifying the number of sources that are currently selling or leasing or renting or licensing, the commercial content.

Example 34c: The method of example 1, wherein identifying the number of times each commercial content of the plurality of commercial content has been referenced comprises identifying the number of sources that are currently selling and renting the commercial content, or identifying the number of sources that have sold and rented the commercial content, or identifying the number of times the commercial content has been sold and rented, or any combination thereof.

Example 34d: The method of example 1, wherein identifying the number of times each commercial content of the plurality of commercial content has been referenced comprises identifying the number of sources that are currently selling and licensing the commercial content, or identifying the number of sources that have sold and licensed the commercial content, or identifying the number of times the commercial content has been sold and licensed, or any combination thereof.

Example 34dd: The method of example 1, wherein identifying the number of times each commercial content of the plurality of commercial content has been referenced comprises identifying the number of sources that are currently selling or licensing the commercial content, or identifying the number of sources that have sold or licensed the commercial content, or identifying the number of times the commercial content has been sold or licensed, or any combination thereof.

Example 34e: The method of example 1, wherein identifying the number of times each commercial content of the plurality of commercial content has been referenced comprises identifying the number of sources that are currently selling and leasing the commercial content, or identifying the number of sources that have sold and leased the commercial content, or identifying the number of times the commercial content has been sold and leased, or any combination thereof.

Example 35: The method of example 1, wherein identifying the number of times each commercial content of the plurality of commercial content has been referenced comprises identifying the number of times each commercial content of the plurality of commercial content has been sold, leased, rented, licensed, or assigned.

Example 36: The method of example 35, wherein a single source can only contribute a max of one rank point for a single commercial content, even if a single source has multiple references for the single ranked commercial content in a time filtered for.

Example 36a: The method of example 35, wherein a single source can only contribute a max of one rank point and a max of one source indicator, for a single commercial content, even if a single source has multiple references for the single ranked commercial content in a time filtered for.

Example 36b: The method of example 1, wherein a single source can only contribute a max of one rank point and a max of one source indicator, for a single commercial content, even if a single source has multiple references for the single ranked commercial content in a time filtered for.

Example 36c: The method of example 1, wherein a single source can only contribute a max of one rank point or a max of one source indicator, for a single commercial content, even if a single source has multiple references for the single ranked commercial content in a time filtered for.

Example 36d: The method of example 1, wherein a single source can only contribute a max of one rank point for a single commercial content, even if a single source has multiple references for the single ranked commercial content in a time filtered for.

Example 36e. The method of example 1, wherein a single source can only contribute a max of one source indicator for a single commercial content, even if a single source has multiple references for the single ranked commercial content in a time filtered for.

Example 37. The method of example 1, wherein identifying the number of times each commercial content of the plurality of commercial content has been referenced comprises identifying the number of sources that are currently selling the commercial content.

Example 38: The method of example 1, wherein identifying the number of times each commercial content of the plurality of commercial content has been referenced comprises identifying the number of sources that are currently selling, or have sold, the commercial content.

Example 39: The method of example 1, wherein identifying the number of times each commercial content of the plurality of commercial content has been referenced comprises identifying the number of sources that have sold the commercial content.

Example 40: The method of example 1, wherein identifying the number of times each commercial content of the plurality of commercial content has been referenced comprises identifying the number of sources that have rented, leased, or licensed the commercial content.

Example 40a: The method of example 1, wherein identifying the number of times each commercial content of the plurality of commercial content has been referenced comprises identifying the number of sources that are currently selling or renting or licensing or leasing, the commercial content.

Example 40b: The method of example 1, wherein identifying the number of times each commercial content of the plurality of commercial content has been referenced comprises identifying the number of sources that are currently selling and renting the commercial content.

Example 40c: The method of example 1, wherein identifying the number of times each commercial content of the plurality of commercial content has been referenced comprises identifying the number of sources that are currently selling and licensing the commercial content.

Example 40d: The method of example 1, wherein identifying the number of times each commercial content of the plurality of commercial content has been referenced comprises identifying the number of sources that are currently selling or licensing the commercial content.

Example 41: The method of example 1, wherein identifying the number of times each commercial content of the plurality of commercial content has been referenced comprises identifying the number of sources that are currently selling and, renting or licensing or leasing, the commercial content.

Example 41a: The method of example 1, wherein identifying the number of times each commercial content of the plurality of commercial content has been referenced comprises identifying the number of sources that are currently selling or renting or licensing or leasing, the commercial content.

Example 42: The method of example 1, wherein identifying the number of times each commercial content of the plurality of commercial content has been referenced comprises identifying the number of sources that are currently leasing, renting, or licensing, the commercial content.

Example 43: The method of example 1, wherein identifying the number of times each commercial content of the plurality of commercial content has been referenced comprises identifying the number of sources that are currently leasing the commercial content.

Example 44: The method of example 1, wherein identifying the number of times each commercial content of the plurality of commercial content has been referenced comprises identifying the number of sources that are currently renting the commercial content.

Example 45: The method of example 1, wherein identifying the number of times each commercial content of the plurality of commercial content has been referenced comprises identifying the number of sources that are currently licensing the commercial content.

Example 46: The method of example 1, wherein identifying the number of times each commercial content of the plurality of commercial content has been referenced comprises identifying the number of sources that are currently assigning the commercial content.

Example 47: The method of example 1, wherein identifying the number of times each commercial content of the plurality of commercial content has been referenced comprises identifying the number of sources that have rented the commercial content.

Example 48: The method of example 1, wherein identifying the number of times each commercial content of the plurality of commercial content has been referenced comprises identifying the number of sources that have licensed the commercial content.

Example 49: The method of example 1, wherein identifying the number of times each commercial content of the plurality of commercial content has been referenced comprises identifying the number of sources that have leased the commercial content.

Example 50: The method of example 1, wherein identifying the number of times each commercial content of the plurality of commercial content has been referenced comprises identifying the number of sources that have assigned the commercial content.

Example 50a: The method of example 1, wherein identifying the number of times each commercial content of the plurality of commercial content has been referenced comprises identifying the number of sources that have sold the commercial content.

Example 51: The method of example 1, wherein identifying the number of times each commercial content of the plurality of commercial content has been referenced comprises identifying the number of times each commercial content of the plurality of commercial content has been sold.

Example 52: The method of example 1, wherein identifying the number of times each commercial content of the plurality of commercial content has been referenced comprises identifying the number of times each commercial content of the plurality of commercial content has been leased.

Example 53: The method of example 1, wherein identifying the number of times each commercial content of the plurality of commercial content has been referenced comprises identifying the number of times each commercial content of the plurality of commercial content has been rented.

Example 54: The method of example 1, wherein identifying the number of times each commercial content of the plurality of commercial content has been referenced comprises identifying the number of times each commercial content of the plurality of commercial content has been licensed.

Example 55: The method of example 1, wherein identifying the number of times each commercial content of the plurality of commercial content has been referenced comprises identifying the number of times each commercial content of the plurality of commercial content has been assigned.

Example 56: The method of example 1, wherein identifying the number of times each commercial content of the plurality of commercial content has been referenced comprises identifying the number of sources that are currently selling, leasing, renting, licensing, assigning, or using, the commercial content, and identifying the number of sources that have purchased, used, sold, leased, rented, licensed, or assigned, the commercial content Example 57: The method of example 1, wherein identifying the number of times each commercial content of the plurality of commercial content has been referenced comprises identifying the number of sources that are currently selling, leasing, renting, licensing, or assigning, the commercial content, and identifying the number of sources that have sold, leased, rented, licensed, or assigned, the commercial content, and identifying the number of times each commercial content of the plurality of commercial content has been sold, leased, rented, licensed, or assigned.

Example 58: The method of example 1, wherein identifying the number of times each commercial content of the plurality of commercial content has been referenced comprises identifying the number of sources that are currently selling, leasing, renting, licensing, or assigning, the commercial content, or identifying the number of sources that have sold, leased, rented, licensed, or assigned, the commercial content, and identifying the number of times each commercial content of the plurality of commercial content has been sold, leased, rented, licensed, or assigned.

Example 59: The method of example 1, wherein identifying the number of times each commercial content of the plurality of commercial content has been referenced comprises identifying the number of sources that are currently selling, leasing, renting, licensing, or assigning, the commercial content, or identifying the number of sources that have sold, leased, rented, licensed, or assigned, the commercial content, or identifying the number of times each commercial content of the plurality of commercial content has been sold, leased, rented, licensed, or assigned.

Example 59a: The method of example 1, wherein identifying the number of times each commercial content of the plurality of commercial content has been referenced comprises identifying the number of sources that are currently selling, leasing, renting, licensing, or assigning, the commercial content, or identifying the number of sources that have sold, leased, rented, licensed, or assigned, the commercial content, or identifying the number of times each commercial content of the plurality of commercial content has been sold, leased, rented, licensed, or assigned, or any combination thereof.

Example 60: The method of example 1, wherein identifying the number of times each commercial content of the plurality of commercial content has been referenced comprises identifying the number of sources that are currently selling, leasing, renting, licensing, or assigning, the commercial content, and identifying the number of times each commercial content of the plurality of commercial content has been sold, leased, rented, licensed, or assigned.

Example 61: The method of example 1, wherein identifying the number of times each commercial content of the plurality of commercial content has been referenced comprises identifying the number of sources that have sold, leased, rented, licensed, or assigned, the commercial content, and identifying the number of times each commercial content of the plurality of commercial content has been sold, leased, rented, licensed, or assigned.

Example 62: The method of example 1, wherein generating the search result of the plurality of commercial content comprises: ordering the search result with most referenced first and breaking ties by at least one tie-breaker from the group consisting of: price of commercial content; lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; key word matches to commercial content title; recency of references; a user's option selection; closest brick-and-mortar source to a location; closest brick-and-mortar source to user's current location; and alphabetical order by commercial content title.

Example 62a: The method of example 1, wherein generating a search result of the plurality of commercial content comprises every commercial content having all respective source indicators going horizontally away from the respective commercial content and wherein a single source can have at most one respective source indicator for a respective commercial content, and wherein generating the search result of the plurality of commercial content comprises: ordering a search result with most referenced first side-by-side an additional search result ordering the search result with least referenced first, and breaking ties by at least one tie-breaker from the group consisting of: price of commercial content; lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; key word matches to commercial content title; recency of references; a user's option selection; closest brick-and-mortar source to a location; closest brick-and-mortar source to user's current location; and alphabetical order by commercial content title.

Example 62b. The method of example 1, wherein generating the search result of the plurality of commercial content comprises: ordering the search result with least referenced first and breaking ties by at least one tie-breaker from the group consisting of: price of commercial content; lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; key word matches to commercial content title; recency of references; a user's option selection; closest brick-and-mortar source to a location; closest brick-and-mortar source to user's current location; and alphabetical order by commercial content title.

Example 63: The method of example 1, wherein generating the search result of the plurality of commercial content comprises: ordering the search result with most referenced first and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Example 63a: The method of example 1, wherein generating the search result of the plurality of commercial content comprises: ordering a search result with most referenced first side-by-side an additional search result ordering the search result with least referenced first, and breaking ties by at least one tie-breaker from the group consisting of: lowest current price of commercial content; highest current price of commercial content; average current price of commercial content; average current price of commercial content using only the lowest current price of commercial content from each source of a commercial content for the calculation;

median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Example 63b: The method of example 1, wherein generating the search result of the plurality of commercial content comprises: ordering the search result with least referenced first and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Example 63c: The method of example 1, wherein generating the search result of the plurality of commercial content comprises ordering the search result with most referenced first.

Example 63d: The method of example 1, wherein generating the search result of the plurality of commercial content comprises ordering the search result with least referenced first.

Example 63e: The method of example 1, wherein generating the search result of the plurality of commercial content comprises ordering a search result with most referenced first side-by-side an additional search result ordering the search result with least referenced first.

Example 64: The method of example 12, wherein generating the search result of the plurality of commercial content comprises: ordering the search result with most referenced first and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Example 64a: The method of example 12, wherein generating the search result of the plurality of commercial content comprises: ordering the search result with least referenced first and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Example 64b: The method of example 12, wherein generating the search result of the plurality of commercial content comprises: ordering a search result with most referenced first side-by-side an additional search result ordering the search result with least referenced first, and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Example 65: The method of example 4, wherein identifying the number of times each commercial content of the plurality of commercial content has been referenced comprises identifying the number of sources that currently have the commercial content on a menu.

Example 65z: The method of example 4, wherein identifying the number of times each commercial content of the plurality of commercial content has been referenced comprises identifying the number of sources that had the commercial content on a menu.

Example 65y: The method of example 4, wherein identifying the number of times each commercial content of the plurality of commercial content has been referenced comprises identifying the number of sources that currently have the commercial content on a menu or identifying the number of sources that had the commercial content on a menu.

Example 65x: The method of example 4, wherein identifying the number of times each commercial content of the plurality of commercial content has been referenced comprises identifying the number of sources that currently have the commercial content on a menu and identifying the number of sources that had the commercial content on a menu.

Example 65a: The method of example 4, wherein identifying the number of times each commercial content of the plurality of commercial content has been referenced comprises identifying the number of sources that currently have the commercial content on a menu or other listing of commercial content.

Example 65b: The method of example 4, wherein identifying the number of times each commercial content of the plurality of commercial content has been referenced comprises identifying the number of menus that currently have the commercial content on the menu.

Example 65c: The method of example 4, wherein identifying the number of times each commercial content of the plurality of commercial content has been referenced comprises identifying the number of sources that currently have the commercial content on a website, menu or other listing of commercial content.

Example 66: The method of example 4, wherein identifying the number of times each commercial content of the plurality of commercial content has been referenced comprises identifying the number of sources that currently have the commercial content available for purchase.

Example 66a: The method of example 1, wherein identifying the number of times each commercial content of the plurality of commercial content has been referenced comprises identifying the number of sources that currently have the commercial content available for purchase.

Example 66b: The method of example 1, wherein identifying the number of times each commercial content of the plurality of commercial content has been referenced comprises identifying the number of sources that currently have the commercial content available for purchasing, renting, leasing, licensing, or assigning.

Example 67: The method of example 66, wherein identifying the number of sources that currently have the commercial content available for purchase comprises counting commercial content as available for purchase from a respective source if the commercial content is on at least one menu of the respective source.

Example 68: The method of example 21, wherein each source indicator comprises an image.

Example 68a: The method of example 68, wherein the image is of the respective commercial content from the respective source.

Example 69: A commercial content search and ranking system, the system comprising: one or more computer readable storage media; a commercial content database or table stored on the one or more computer readable storage media; and a commercial content search and ranking engine that, when executed by one or more processors, directs the one or more processors to: identify a plurality of commercial content from the commercial content database in response to receiving a search query; identify a number of times each commercial content of the plurality of commercial content has been referenced by sources of a set of at least one designated source; and generate a search result of the plurality of commercial content that is ordered based on the number of times each commercial content has been referenced.

Example 70: The system of example 69, wherein the commercial content comprises menu item content, and wherein the set of at least one designated source comprises at least one store or at least one restaurant.

Example 71: The system of example 70, wherein identifying the plurality of commercial content comprises searching the commercial content database by menu item name.

Example 72: The system of example 69, wherein receiving the search query comprises receiving at least one term.

Example 73: The system of example 70, wherein identifying the number of times each commercial content of the plurality of commercial content has been referenced comprises identifying the number of sources that currently have the commercial content available for purchase, and wherein identifying the number of sources that currently have the commercial content available for purchase comprises counting commercial content as available for purchase from a respective source if the commercial content is on at least one menu of the respective source.

Example 74: The system of example 73, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source.

Example 75: The system of example 69, wherein identifying the number of times each commercial content of the plurality of commercial content has been referenced comprises identifying the number of sources that are currently selling and, leasing or renting or licensing, the commercial content.

Example 76: The system of example 69, wherein identifying the number of times each commercial content of the plurality of commercial content has been referenced comprises identifying the number of sources that are currently selling the commercial content.

Example 77: The system of example 69, wherein identifying the number of times each commercial content of the plurality of commercial content has been referenced comprises identifying the number of sources that are currently selling, leasing, renting, or licensing, the commercial content.

Example 78: The system of example 69, wherein identifying the number of times each commercial content of the plurality of commercial content has been referenced comprises identifying the number of sources that are currently selling, leasing, renting, licensing, or assigning, the commercial content, or identifying the number of sources that have sold, leased, rented, licensed, or assigned, the commercial content, or identifying the number of times each commercial content of the plurality of commercial content has been sold, leased, rented, licensed, or assigned, or any combination thereof.

Example 79: The system of example 69, wherein identifying the plurality of commercial content comprises searching the commercial content database, which comprises commercial content organized by commercial content name, commercial content category name, and source name.

Example 80: A method for facilitating content search and results, the method comprising: identifying a plurality of content in response to receiving a search query; identifying a number of times each content of the plurality of content has been referenced by sources of a set of at least one designated source; and generating a search result of the plurality of content that is ordered based on the number of times each content has been referenced.

Example 81: A method for facilitating library content search and results, the method comprising: identifying a plurality of library content in response to receiving a search query; identifying a number of times each library content of the plurality of library content has been referenced by sources of a set of at least one designated source; and generating a search result of the plurality of library content that is ordered based on the number of times each library content has been referenced.

Example 82: A method for facilitating TV content search and results, the method comprising: identifying a plurality of TV content in response to receiving a search query; identifying a number of times each TV content of the plurality of TV content has been referenced by sources of a set of at least one designated source; and generating a search result of the plurality of TV content that is ordered based on the number of times each TV content has been referenced.

Example 83: A method for facilitating internet video/audio content search and results, the method comprising: identifying a plurality of internet video/audio content in response to receiving a search query; identifying a number of times each internet video/audio content of the plurality of internet video/audio content has been referenced by sources of a set of at least one designated source; and generating a search result of the plurality of internet video/audio content that is ordered based on the number of times each internet video/audio content has been referenced.

Example 84: A method for facilitating part content search and results, the method comprising: identifying a plurality of part content in response to receiving a search query; identifying a number of times each part content of the plurality of part content has been referenced by sources of a set of at least one designated source; and generating a search result of the plurality of part content that is ordered based on the number of times each part content has been referenced.

Example 85: A method for facilitating internet search engine content search and results, the method comprising: identifying a plurality of internet search engine content in response to receiving a search query; identifying a number of times each internet search engine content of the plurality of internet search engine content has been referenced by sources of a set of at least one designated source; and generating a search result of the plurality of internet search engine content that is ordered based on the number of times each internet search engine content has been referenced.

Example 86: A method for facilitating educational content search and results, the method comprising: identifying a plurality of educational content in response to receiving a search query; identifying a number of times each educational content of the plurality of educational content has been referenced by sources of a set of at least one designated source; and generating a search result of the plurality of educational content that is ordered based on the number of times each educational content has been referenced.

Example 87: A method for facilitating medical content search and results, the method comprising: identifying a plurality of medical content in response to receiving a search query; identifying a number of times each medical content of the plurality of medical content has been referenced by healthcare providers of a set of at least one designated healthcare provider; and generating a search result of the plurality of medical content that is ordered based on the number of times each medical content has been referenced.

Example 88: A method for facilitating content search and results, the method comprising: identifying a plurality of content in response to receiving a search query; identifying a number of times each content of the plurality of content has been referenced by sources of a set of at least one designated source; and generating a search result of the plurality of content that is ordered based on the number of times each content has been referenced.

Example 88b: The method of example 88, wherein generating a search result of the plurality of content comprises every content having all respective source indicators going horizontally away from the respective content and wherein a single source can have at most one respective source indicator for a respective content.

Example 88c: The method of example 88b, wherein respective source indicators are horizontally ordered starting at the right of the respective content and indicators ordered going horizontally to the right of the respective content.

Example 88d: The method of example 88c, wherein the source indicators are ordered based on lowest current price of the respective source for the respective content, or based on distance to source from user's current location, or based on user rating of source, or based on average user ratings of source, or based on rank of source, or based on ranking from a ranking organization for the source, or based on ABC order using source name, or any combination thereof.

Example 88e: The method of example 88d, wherein one or more of lowest current price of the respective source for the respective content, distance to source from user's current location, based on user rating of source, based on average user ratings of source, based on rank of source, based on ranking from a ranking organization for the source, based on ABC order using source name, is used as one or more tie breakers for one or more of, lowest current price of the respective source for the respective content, distance to source from user's current location, based on user rating of source, based on average user ratings of source, based on rank of source, based on ranking from a ranking organization for the source, based on ABC order using source name.

Example 89: The method of examples 88-88e, wherein the set of at least one designated source comprises a set searched, filtered, selected, or otherwise controlled for by the user.

Example 89a: The method of example 88, wherein the set of at least one designated source comprises at least one website.

Example 90: The method of example 88, wherein identifying a plurality of content comprises identifying at least one educational content.

Example 91: The method of example 88, wherein identifying a plurality of content comprises identifying at least one medical content.

Example 92: The method of example 88, wherein identifying a plurality of content comprises identifying at least one commercial content.

Example 93: The method of example 88, wherein identifying a plurality of content comprises identifying at least one library content.

Example 94: The method of example 88, wherein identifying a plurality of content comprises identifying at least one TV content.

Example 95: The method of example 88, wherein identifying a plurality of content comprises identifying at least one Internet video/audio content.

Example 96: The method of example 88, wherein identifying a plurality of content comprises identifying at least one audio.

Example 97: The method of example 88, wherein identifying a plurality of content comprises identifying at least one vehicle.

Example 98: The method of example 88, wherein identifying a plurality of content comprises identifying at least one menu item.

Example 98a: The method of example 88, wherein identifying a plurality of content comprises identifying at least one electronic device.

Example 98b: The method of example 88, wherein identifying a plurality of content comprises identifying at least one app.

Example 98c: The method of example 88, wherein identifying a plurality of content comprises identifying at least one book, article, video, audio, product, service, item, or good.

Example 98d: The method of example 88, wherein identifying a plurality of content comprises identifying at least one book.

Example 99: The method of example 88, wherein identifying a plurality of content comprises identifying at least one educational content and at least one medical content.

Example 100: The method of example 88, wherein identifying a plurality of content comprises identifying at least one of a book, article, app, video, audio, product, service, item, and good.

Example 101: The method of example 88, wherein identifying a plurality of content comprises identifying at least one book.

Example 102: The method of example 88, wherein identifying a plurality of content comprises identifying at least one video.

Example 103: The method of example 88, wherein identifying a plurality of content comprises identifying at least one educational content and at least one medical content, and wherein generating a search result of the plurality of content comprises educational contents side-by-side medical contents.

Example 104: The method of example 88, wherein the content is library content comprising at least one book, video, audio, article, or magazine.

Example 105: The method of example 88, wherein the content is library content and wherein the set of at least one designated source comprises at least one library.

Example 106: The method of example 88, wherein the content is library content and wherein the set of at least one designated source comprises at least one library, collection, catalogue, or service.

Example 107: The method of example 88, wherein the content is library content and wherein the set of at least one designated source comprises at least one not school library or at least one school library.

Example 108: The method of example 88, wherein the content is library content and wherein the set of at least one designated source comprises at least one not brick-and-mortar library or at least one brick-and-mortar library.

Example 109: The method of example 88, wherein the content is medical content and wherein the set of at least one designated source comprises at least one healthcare provider.

Example 110: The method of example 88, wherein the content is educational content and wherein the set of at least one designated source comprises at least one school.

Example 111: The method of example 88, wherein the content is educational content and wherein the set of at least one designated source comprises at least one school, teacher, or library.

Example 112: The method of example 88, wherein the content is educational content and wherein the set of at least one designated source comprises at least one school, teacher, library, degree, class, or department.

Example 113: The method of example 88, wherein the content is commercial content and wherein the set of at least one designated source comprises at least one not brick-and-mortar source or at least one brick-and-mortar source.

Example 114: The method of example 88, wherein the content is commercial content and wherein the set of at least one designated source comprises at least one not brick-and-mortar source and at least one brick-and-mortar source.

Example 115: The method of example 88, wherein the content is part content and wherein the set of at least one designated source comprises at least one vehicle, automobile, aircraft, watercraft, computer, machine, device, apparatus, electronic device, or product.

Example 116: The method of example 88, wherein the content is TV content and wherein the set of at least one designated source comprises at least one TV station/channel or at least one TV show.

Example 117: The method of example 88, wherein the content is internet video/audio and wherein the set of at least one designated source comprises at least one website.

Example 118: The method of example 88, wherein the content is menu content and wherein the set of at least one designated source comprises at least one restaurant.

Example 119: The method of example 88, wherein identifying the number of times each content of the plurality of content has been referenced comprises identifying the number of sources that have referenced each content of the plurality of content.

Example 120: The method of example 88, wherein generating the search result of the plurality of content comprises ordering the search result with most referenced first and breaking ties by at least one tie-breaker from the group consisting of: most referenced by most sources content; and alphabetical order by content title.

Example 121: The method of example 88, wherein identifying the number of times each content of the plurality of content has been referenced comprises identifying the number of sources that have referenced the content, and wherein generating the search result of the plurality of content comprises ordering the search result with most referenced first and breaking ties by at least one tie-breaker from the group consisting of: most referenced content; and alphabetical order by content title.

Example 122: The method of example 88, wherein the content is medical content comprising at least one medical device, medical product, drug, botanical, dietary supplement, medical procedure, medical therapy, and medical treatment and wherein the set of at least one designated source comprises at least one healthcare provider.

Example 122a: The method of example 88, wherein the content is medical content comprising at least one supply, tool, book, video, audio, nutritional supplement, pharmaceutical, electronic device, or service.

Example 122b: The method of example 88, wherein the content is medical content comprising at least one document, pamphlet, leaflet, magazine, booklet, audio, or video.

Example 123: The method of example 1, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is different from all other resulting commercial content in at least one of the following ways: make of vehicle, model of vehicle, year of vehicle, or color of vehicle.

Example 124: The method of example 1, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different make, model, year, or color of vehicle.

Example 125: The method of example 1, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is different from all other commercial content by at least one of make of vehicle, model of vehicle, year of vehicle, or color of vehicle.

Example 126: The method of example 1, wherein the set of at least one designated source comprises at least one business, individual, seller, vendor, or professional.

Example 127: The method of example 88, wherein the set of at least one designated source comprises at least one app.

Example 128: The method of example 88, wherein generating a search result of the plurality of content comprises a search result comprising descending content previews.

Example 129: The method of example 88, wherein the set of at least one designated source comprises at least one school, teacher, degree, class, school-within-school, healthcare provider, library, TV station/channel, TV show, TV episode, TV season, website, automobile dealership, dispensary, pharmacy, restaurant, marketplace, shop, or store; or any combination thereof.

Example 130: The method of example 88, wherein the set of at least one designated source comprises at least one school, teacher, healthcare professional, store, website, library, or medical facility, or any combination thereof.

Example 131: The method of example 88, wherein the set of at least one designated source comprises at least one school, teacher, healthcare professional, store, library, or medical facility, or any combination thereof.

Example 132: The method of example 88, wherein the set of at least one designated source comprises at least one school, teacher, healthcare professional, library, or medical facility, or any combination thereof.

Example 133: The method of example 88, wherein identifying a plurality of content comprises identifying at least one educational content or at least one medical content.

Example 134: The method of example 88, wherein identifying a plurality of content comprises identifying at least one educational content and at least one medical content.

Example 135: The method of example 88, wherein identifying a plurality of content comprises identifying at least one educational content, or at least one medical content, or at least one library content, or at least one commercial content, or any combination thereof.

Example 136: The method of example 88, wherein identifying a plurality of content comprises identifying at least one educational content, or at least one medical content, or at least one library content, or at least one commercial content, or at least one TV content, or at least one internet video/audio content, or any combination thereof.

Example 137: The method of example 88, wherein identifying a plurality of content comprises identifying at least one book, or at least one video, or at least one audio, or at least one medical product, or any combination thereof.

Example 138: The method of example 88, wherein the set of at least one designated source comprises at least one school or teacher, and at least one healthcare provider.

Example 139: The method of example 88, wherein the set of at least one designated source comprises at least one school and at least one teacher.

Example 140: The method of example 88, wherein the set of at least one designated source comprises at least one medical facility and at least one healthcare professional.

Example 141: The method of example 88, wherein the set of at least one designated source comprises at least one school, and at least one healthcare provider.

Example 142: The method of example 88, wherein the set of at least one designated source comprises at least one school, degree, class, school-within-school, healthcare provider, library, TV station/channel, TV show, website, and store.

Example 143: The method of example 88, wherein the set of at least one designated source comprises at least one school and at least one healthcare provider.

Example 144: The method of example 88, wherein the set of at least one designated source comprises at least one school or at least one healthcare provider.

Example 145: The method of example 88, wherein the set of at least one designated source comprises at least one school and at least one healthcare provider and at least one library.

Example 146: The method of example 88, wherein the set of at least one designated source comprises at least one school and at least one healthcare provider and at least one store.

Example 147: The method of example 88, wherein the set of at least one designated source comprises at least one school or at least one healthcare provider or at least one store or at least one library or at least one app.

Example 148: The method of example 88, wherein the set of at least one designated source comprises at least one school, teacher, degree, class, school-within-school, healthcare provider, library, TV station/channel, TV show, website, and store.

Example 149: The method of example 88, wherein the set of at least one designated source comprises at least one app.

Example 150: The method of example 88, wherein the set of at least one designated source comprises at least one dentist office or at least one dentist.

Example 151: The method of example 88, wherein the set of at least one designated source comprises at least one medical office.

Example 152: The method of example 88, wherein the set of at least one designated source comprises at least one medical facility and at least one medical professional.

Example 153: The method of example 88, wherein the set of at least one designated source comprises at least one medical facility or at least one healthcare professional.

Example 154: The method of example 88, wherein the set of at least one designated source comprises at least website.

Example 155: The method of example 88, wherein the set of at least one designated source comprises at least two different sources from a group consisting of: school, teacher, degree, class, department, school-within-school, healthcare provider, library, store, TV station/channel, TV show, and website.

Example 156: The method of example 128, wherein the content is educational content, or medical content, or library content, or TV content, or internet video/audio content, or any combination thereof.

Example 157: The method of example 128, wherein the set of at least one designated source comprises at least one school, teacher, healthcare provider, library, store, TV show episode, or website.

Example 158: The method of example 1, wherein the set of at least one designated source comprises at least one shop.

Example 159: The method of example 128, wherein the content is educational content, or medical content, or commercial content, or library content, or TV content, or internet video/audio content, or any combination thereof.

Example 160: A method for facilitating part content search and results, the method comprising: identifying a plurality of part content in response to receiving a search query; identifying a number of times each part content of the plurality of part content has been referenced by sources of a set of at least one designated source; and generating a search result of the plurality of part content that is ordered based on the number of times each part content has been referenced.

Example 161: The method of example 160, wherein identifying a plurality of part content comprises identifying at least one product part.

Example 162: The method of example 160, wherein identifying a plurality of part content comprises identifying at least one airplane part.

Example 163: The method of example 160, wherein identifying a plurality of part content comprises identifying at least one aircraft part.

Example 164: The method of example 160, wherein identifying a plurality of part content comprises identifying at least one vehicle part.

Example 165: The method of example 160, wherein identifying a plurality of part content comprises identifying at least one electronic device part.

Example 166: The method of example 160, wherein identifying a plurality of part content comprises identifying at least one device part, machine part, or apparatus part.

Example 167: The method of example 160, wherein identifying a plurality of part content comprises identifying at least one building part or at least one structure part.

Example 168: The method of example 160, wherein identifying a plurality of part content comprises identifying at least one component part.

Example 169: The method of example 160, wherein identifying a plurality of part content comprises identifying at least one automobile part.

Example 170: The method of example 160, wherein identifying the plurality of part content comprises searching a database of part content by one or more of part content name, source name, and part category name.

Example 171: The method of example 160, wherein identifying a plurality of part content comprises identifying at least one item part.

Example 172: The method of example 160, wherein generating a search result of the plurality of part content comprises every part content having all respective source indicators going horizontally away from the respective part content and wherein a single source can have at most one respective source indicator for a respective part content.

Example 173: The method of example 160, wherein identifying a plurality of part content comprises identifying at least one home part or at least one vehicle part.

Example 174: The method of example 160, wherein the set of at least one designated source comprises at least one automobile or at least one airplane or at least one product or at least one building.

Example 175: The method of example 160, wherein the set of at least one designated source comprises at least one UAV, or at least one automobile, or at least one electronic device, or at least one apparatus.

Example 176: The method of example 160, wherein the set of at least one designated source comprises at least one vehicle.

Example 177: The method of example 176, wherein identifying a plurality of part content comprises identifying at least one car part, or at least one airplane part, or at least one motorcycle part, or at least one toy vehicle part, or at least one SUV part.

Example 178: The method of example 160, wherein identifying a plurality of part content comprises identifying a car part, an airplane part, a UAV part, a motorcycle part, a submarine part, and a boat part, and wherein generating a search result of the plurality of part content comprises every part content having all respective source indicators going horizontally away from the respective part content and wherein a single source can have at most one respective source indicator for a respective part content.

Example 179: A method for facilitating internet search engine content search and results, the method comprising: identifying a plurality of internet search engine content in response to receiving a search query; identifying a number of times each internet search engine content of the plurality of internet search engine content has been referenced by sources of a set of at least one designated source; and generating a search result of the plurality of internet search engine content that is ordered based on the number of times each internet search engine content has been referenced.

Example 180: The method of example 179, wherein the set of at least one designated source comprises at least two sources from a group consisting of: Baidu, Bing, Google, and Yandex.

Example 181: The method of example 179, wherein the set of at least one designated source comprises Baidu, Bing, Google, or Yandex.

Example 182: The method of example 179, wherein generating a search result of the plurality of internet search engine content comprises every internet search engine content having all respective source indicators going horizontally away from the respective internet search engine content and wherein a single source can have at most one respective source indicator for a respective internet search engine content Example 183: The method of example 179, wherein the set of at least one designated source comprises a set searched, filtered, or otherwise controlled for by the user.

Example 184: The method of example 183, wherein the set of at least one designated source comprises at least one of Baidu, Bing, Google, or Yandex.

Example 185: The method of example 184, wherein identify a plurality of internet search engine content comprises identifying at least one URL, book, article, image, or video, or any combination thereof.

Example 186: The method of example 183, wherein the set of at least one designated source comprises Baidu, Bing, Google, and Yandex.

Example 187: The method of example 88, wherein generating a search result of the plurality of content comprises a search result comprising descending ranked previews, and wherein the content is educational content, or medical content, or commercial content, or library content, or TV content, or internet video/audio content, or any combination thereof.

Example 188: The method of example 88, wherein identifying the number of times each content of the plurality of content has been referenced comprises identifying the number of sources that have referenced each content of the plurality of content, and identifying the number of times each content of the plurality of content has been referenced.

Example 189: The method of example 188, wherein generating a search result of the plurality of content comprises generating at least two search results side-by-side one another, wherein at least one search result is ordered based on the number of times each content has been referenced, and at least one search result is ordered based on the number of sources that have referenced each content.

Example 190: The method of example 188, wherein the number of sources that have referenced each content and the number of times each content of the plurality of content has been referenced are added together to create a single rank point amount for each content.

Example 191: The method of example 188, wherein the content is educational content, or medical content, or library content, or commercial content, or any combination thereof.

Example 192: The method of example 188, wherein the content is educational content, or medical content, or library content, or TV content, or internet video/audio content, or part content, or commercial content, or any combination thereof.

Example 193: The method of example 88, wherein identifying the number of times each content of the plurality of content has been referenced comprises identifying the number of sources that have referenced each content of the plurality of content, or identifying the number of times each content of the plurality of content has been referenced.

Example 194: The method of example 193, wherein the content is educational content, or medical content, or library content, or internet search engine content, or TV content, or internet video/audio content, or part content, or commercial content, or any combination thereof.

Example 195: The method of example 88, wherein a single source can only contribute a max of one rank point and a max of one source indicator, for a single content, even if a single source has multiple references for the single ranked content in a time filtered for.

Example 196: The method of example 88, wherein a single source can only contribute a max of one rank point or a max of one source indicator, for a single content, even if a single source has multiple references for the single ranked content in a time filtered for.

Example 197: The method of example 88, wherein a single source can only contribute a max of one rank point for a single content, even if a single source has multiple references for the single ranked content in a time filtered for.

Example 198: The method of example 88, wherein a single source can only contribute a max of one source indicator for a single content, even if a single source has multiple references for the single ranked content in a time filtered for.

Example 199: The method of example 88, wherein a single source can only contribute a max of one rank point and a max of one source indicator, to a single content.

Example 200: The method of example 88, wherein a single source can only contribute a max of one rank point or a max of one source indicator, to a single content.

Example 201: The method of example 88, wherein a single source can only contribute a max of one rank point to a single content.

Example 202: The method of example 88, wherein a single source can only contribute a max of one source indicator to a single content.

Example 203: The method of example 1, or example 81, or example 82, or example 83, or example 86, or example 87, or example 88, or example 160, or example 179, wherein a single source can only contribute a max of one rank point and a max of one source indicator, for a single content, even if a single source has multiple references for the single ranked content in a time filtered for.

Example 204: The method of example 1, or example 81, or example 82, or example 83, or example 86, or example 87, or example 88, or example 160, or example 179, wherein a single source can only contribute a max of one rank point or a max of one source indicator, for a single content, even if a single source has multiple references for the single ranked content in a time filtered for.

Example 205: The method of example 1, or example 81, or example 82, or example 83, or example 86, or example 87, or example 88, or example 160, or example 179, wherein a single source can only contribute a max of one rank point for a single content, even if a single source has multiple references for the single ranked content in a time filtered for.

Example 206: The method of example 1, or example 81, or example 82, or example 83, or example 86, or example 87, or example 88, or example 160, or example 179, wherein a single source can only contribute a max of one source indicator for a single content, even if a single source has multiple references for the single ranked content in a time filtered for.

Example 207: The method of example 1, or example 81, or example 82, or example 83, or example 86, or example 87, or example 88, or example 160, or example 179, wherein at least one source indicator comprises at least one image, or least one video, or at least one audio, or any combination thereof.

Example 208: The method of example 1, or example 81, or example 82, or example 83, or example 86, or example 87, or example 88, or example 160, or example 179, wherein generating a search result of the plurality of content comprises every content having all respective source indicators going horizontally away from the respective content and wherein a single source can have at most one respective source indicator for a respective content.

Example 209: The method of example 1, or example 81, or example 82, or example 83, or example 86, or example 87, or example 88, or example 160, or example 179, wherein generating a search result of the plurality of content comprises every content having all respective source indicators going horizontally away from the respective content and wherein a single source can have at most one respective source indicator for a respective content, and wherein each source indicator comprises at least one image, or at least one video, or at least one audio, of the respective content from the respective source.

Example 210: The method of example 1, or example 81, or example 82, or example 83, or example 86, or example 87, or example 88, or example 160, or example 179, wherein generating a search result of the plurality of content comprises every content having all respective source indicators going horizontally away from the respective content and wherein a single source can have at most one respective source indicator for a respective content, and wherein at least one source indicator comprises at least one video, or at least one audio, or at least one image, of the respective content from the respective source.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The subject invention includes, but is not limited to, the following exemplified embodiments.

Embodiment 1. A method for facilitating content search and results, the method comprising:
  identifying a plurality of content in response to receiving a search query;

identifying a number of times each content of the plurality of content has been referenced by sources of a set of at least one designated source; and generating a search result of the plurality of content that is ordered based on the number of times each content has been referenced.

Embodiment 2. The method of embodiment 1, wherein the content is educational content comprising at least one of books, audios, videos, and articles.

Embodiment 3. The method of embodiment 2, wherein receiving the search query comprises receiving a degree audit request.

Embodiment 4. The method of embodiment 2, wherein the set of at least one designated source comprises at least one of a primary school, a secondary school, a trade school, a tertiary school, and a library.

Embodiment 5. The method of embodiment 2, wherein identifying the plurality of content comprises searching a database of educational content organized by at least any two of degree, source name, course title, instructor name, department title, and book or other content title.

Embodiment 6. The method of embodiment 2, wherein identifying the plurality of content comprises searching a database of educational content by title of the educational content.

Embodiment 7. The method of embodiment 2, wherein identifying the plurality of content comprises searching within the educational content for at least one related search term.

Embodiment 8. The method of embodiment 2, wherein identifying the plurality of content comprises searching within the table of contents, index, and glossary of the educational content for at least one related search term.

Embodiment 9. The method of embodiment 8, further comprising:
including the educational content in the plurality of content only if the at least one related search term is found in the table of contents, index, or glossary of the educational content.

Embodiment 10. The method of embodiment 2, wherein identifying the number of times each content of the plurality of content has been referenced comprises:
identifying the number of times each content of the plurality of content has been required and recommended by each source, course, department, degree, or combination thereof.

Embodiment 11. The method of embodiment 2, wherein identifying the number of times each content of the plurality of content has been referenced comprises:
identifying the number of times each content of the plurality of content has been required by each source, course, department, degree, or combination thereof.

Embodiment 12. The method of embodiment 2, wherein identifying the number of times each content of the plurality of content has been referenced comprises:
identifying the number of times each content of the plurality of content has been used and purchased by each source, course, department, degree, or combination thereof.

Embodiment 13. The method of embodiment 2, wherein generating the search result of the plurality of content comprises:
ordering the search result by a number of references of each content of the plurality of content, and
breaking ties by at least one tie-breaker from the group consisting of:
key word matches to content title;
key word matches to class name;
average ranking by at least one ranking organization for the sources that reference the content; and
alphabetical order by content title.

Embodiment 14. The method of embodiment 13, wherein the number of references is determined by the number of times a particular content of the plurality of content has been referenced, weighted by a weight assigned one or more reference types associated with the particular content.

Embodiment 15. The method of embodiment 14, wherein the weight is user-selectable.

Embodiment 16. The method of embodiment 2, further comprising displaying a content graph indicating a number of times a segment of a particular content has been referenced.

Embodiment 17. The method of embodiment 16, wherein the segment is a page range.

Embodiment 18. The method of embodiment 16, wherein the segment is a timing range in a video.

Embodiment 19. The method of embodiment 16, wherein the number of times is calculated for a particular one or more sources.

Embodiment 20. The method of embodiment 1, wherein the set of at least one designated source comprises at least one healthcare provider.

Embodiment 21. The method of embodiment 20, wherein identifying the plurality of content comprises searching a database of medical content organized by medical condition, symptom, and side effect.

Embodiment 22. The method of embodiment 20, wherein identifying the plurality of content comprises searching a database of medical content by one or more of medical content name, source name, medical condition, symptom, and side effect.

Embodiment 23. The method of embodiment 20, wherein identifying the number of times each medical content of the plurality of content has been referenced comprises:
identifying the number of times each medical content of the plurality of content has been purchased, used, prescribed, and recommended by each healthcare provider or combination thereof.

Embodiment 24. The method of embodiment 20, wherein generating the search result of the plurality of content comprises:
ordering the search result by a number of references of each content of the plurality of content, and
breaking ties by at least one tie-breaker from the group consisting of:
average ranking by at least one ranking organization for the healthcare providers that reference the content;
the medical content type;
credentials of the healthcare providers that reference the medical content;
recency of the references;
incidence of side-effects caused by the medical content;
characteristics from a medical history of a user;
characteristics from a demographic profile of the user;
characteristics from a genetic data of the user;
characteristics of an insurance coverage of the user; and
an option selection of the user.

Embodiment 25. The method of embodiment 24, wherein the number of references is determined by the number of times a particular content of the plurality of content has been referenced, weighted by a weight assigned one or more reference types associated with the particular content.

Embodiment 26. The method of embodiment 25, wherein the weight is user-selectable.

Embodiment 27. The method of embodiment 20, wherein receiving the search query comprises receiving data from a biometric sensor.

Embodiment 28. The method of embodiment 20, wherein the content is medical content comprising at least one of medical devices, medical products, pharmaceuticals, botanicals, medical procedures, medical therapies, medical treatments, and medical information.

Embodiment 29. The method of embodiment 1, wherein the content is video/audio content.

Embodiment 30. The method of embodiment 29, wherein the video/audio content is television content.

Embodiment 31. The method of embodiment 29, wherein the set of at least one designated source comprises at least one of a channel and an internet audio/video provider.

Embodiment 32. The method of embodiment 29, wherein identifying the plurality of content comprises searching a database of video/audio content.

Embodiment 33. The method of embodiment 29, wherein identifying the plurality of content comprises searching within the video/audio content for at least one related search term.

Embodiment 34. The method of embodiment 29, wherein identifying the number of times each content of the plurality of content has been referenced comprises:
  identifying the number of times each content of the plurality of content has been required and recommended by a source; and
  identifying the number of times each content of the plurality of content has been viewed.

Embodiment 35. The method of embodiment 29, wherein generating the search result of the plurality of content comprises:
  ordering the search result by a number of references of each content of the plurality of content, and
  breaking ties by at least one tie-breaker from the group consisting of:
  key word matches to content title;
  average ranking by at least one ranking organization for the sources that reference the content; and
  alphabetical order by content title.

Embodiment 36. The method of embodiment 35, wherein the number of references is determined by the number of times a particular content of the plurality of content has been referenced, weighted by a weight assigned one or more reference types associated with the particular content.

Embodiment 37. The method of embodiment 36, wherein the weight is user-selectable.

Embodiment 38. The method of embodiment 1, further comprising displaying the search result grouped by one or more content type.

Embodiment 39. The method of embodiment 38, wherein each of the one or more content type is selected from educational content, medical content, library content, and video/audio content.

Embodiment 40. The method of embodiment 38, wherein displaying the search result having more than one group comprises rendering the groups side-by-side.

Embodiment 41. The method of embodiment 1, further comprising displaying the search result grouped by one or more content filter.

Embodiment 42. The method of embodiment 41, wherein displaying the search result having more than one group comprises rendering the groups side-by-side.

Embodiment 43. The method of embodiment 1, further comprising:
  providing access to the content.

Embodiment 44. The method of embodiment 43, wherein providing access to the content comprises:
  presenting text, images, audio, or video of the content; and
  presenting one or more advertisements at designated times or according to an amount of content consumed by a user.

Embodiment 45. The method of embodiment 1, wherein the content is educational content comprising at least one of books, video contents, audio contents, products, and articles.

Embodiment 46. The method of embodiment 45, wherein receiving the search query comprises receiving a degree audit request.

Embodiment 47. The method of embodiment 45, wherein the set of at least one designated source comprises at least one school, or at least one teacher, or at least one library, or at least one degree, or at least one class, or at least one school-within-a-school, or any combination thereof.

Embodiment 48. The method of embodiment 45, wherein identifying the plurality of educational content comprises searching a database of educational content organized by degree, source name, course title, instructor name, department title, and book or other content title.

Embodiment 49. The method of embodiment 45, wherein identifying the plurality of content comprises searching a database of educational content by title of the educational content.

Embodiment 50. The method of embodiment 45, wherein identifying the plurality of content comprises searching within the educational content for at least one related search term.

Embodiment 51. The method of embodiment 45, wherein identifying the plurality of content comprises searching within the table of contents, index, and glossary of the educational content for at least one related search term.

Embodiment 52. The method of embodiment 51, further comprising:
  excluding the educational content from the plurality of content if the at least one related search term is found in the table of contents, index, or glossary of the educational content.

Embodiment 53. The method of embodiment 51, further comprising:
  including the educational content in the plurality of content only if the at least one related search term is found in the table of contents, index, or glossary of the educational content.

Embodiment 54. The method of embodiment 45, wherein identifying the number of times each content of the plurality of content has been referenced comprises:
  identifying the number of times each content of the plurality of content has been required and recommended by each source, course, department, degree, or combination thereof.

Embodiment 55. The method of embodiment 45, wherein identifying the number of times each content of the plurality of content has been referenced comprises:
  identifying the number of times each content of the plurality of content has been required by each source, course, department, degree, or combination thereof.

Embodiment 56. The method of embodiment 45, wherein generating the search result of the plurality of content comprises:
 ordering the search result with most referenced first and breaking ties by at least one tie-breaker from the group consisting of:
 key word matches to content title;
 key word matches to class name;
 average ranking by at least one ranking organization for the sources that reference the content; and
 alphabetical order by content title.

Embodiment 57. The method of embodiment 45, further comprising:
 providing access to the educational content.

Embodiment 58. The method of embodiment 57, wherein providing access to the educational content comprises:
 presenting text, images, audio, or video of the educational content; and
 presenting one or more advertisements at designated times or according to an amount of educational content consumed by a user.

Embodiment 59. The method of embodiment 1, wherein the content is medical content comprising at least one of medical devices, medical products, pharmaceuticals, medical procedures, medical therapies, and medical treatments and wherein the set of at least one designated source comprises at least one healthcare provider.

Embodiment 60. The method of embodiment 59, wherein identifying the plurality of content comprises searching a database of medical content organized by medical condition, symptom, and side effect.

Embodiment 61. The method of embodiment 59, wherein identifying the plurality of content comprises searching a database of medical content by one or more of medical content name, medical condition, symptom, and side effect.

Embodiment 62. The method of embodiment 59, wherein identifying the number of times each medical content of the plurality of content has been referenced comprises:
 identifying the number of times each medical content of the plurality of content has been purchased, used, prescribed, and recommended by each healthcare provider or combination thereof.

Embodiment 63. The method of embodiment 59, wherein generating the search result of the plurality of content comprises:
 ordering the search result with most referenced content first and breaking ties by at least one tie-breaker from the group consisting of:
 average ranking by at least one ranking organization for the healthcare providers that reference the content;
 the medical content type;
 credentials of healthcare providers that reference the medical content;
 recency of the references;
 incidence of side-effects caused by the medical content;
 a user's medical history; and
 a user's option selection.

Embodiment 64. The method of embodiment 59, wherein receiving the search query comprises receiving data from a biometric sensor.

Embodiment 65. The method of embodiment 1, wherein receiving the search query comprises receiving at least one term.

Embodiment 66. The method of embodiment 1, wherein receiving the search query comprises receiving a hypertext transfer protocol (HTTP) request for a webpage.

Embodiment 67. A content search and ranking system, the system comprising:
 one or more computer readable storage media;
 a content database or table stored on the one or more computer readable storage media; and
 program instructions stored on the one or more computer readable storage media for a content search and ranking engine that, when executed by one or more processors, directs the one or more processors to:
 identify a plurality of content from the content database in response to receiving a search query;
 identify a number of times each content of the plurality of content has been referenced by sources of a set of at least one designated source; and
 generate a search result of the plurality of content that is ordered based on the number of times each content has been referenced.

Embodiment 68. The system of embodiment 67, wherein the content is educational content comprising at least one of books, videos, and articles, and wherein the set of at least one designated source comprises at least one of a primary school, a secondary school, a trade school, a tertiary school, and a library.

Embodiment 69. The system of embodiment 67, wherein the content is commercial content, or educational content, or medical content, or library content, or any combination thereof.

Embodiment 70. The system of embodiment 68, wherein identifying the plurality of educational content comprises searching the content database, which comprises educational content organized by degree, source name, course title, instructor name, department title, and content title.

Embodiment 71. The system of embodiment 68, wherein identifying the number of times each educational content of the plurality of content has been referenced comprises:
 identifying the number of times each educational content of the plurality of content has been required and recommended by each source, course, department, degree, or combination thereof.

Embodiment 72. The system of embodiment 68, wherein generating the search result of the plurality of educational content comprises:
 ordering the search result with most referenced first and breaking ties by at least one tie-breaker from the group consisting of:
 key word matches to content title;
 key word matches to class name;
 average ranking by at least one ranking organization for the sources that reference the content; and
 alphabetical order by content title.

Embodiment 73. The system of embodiment 67, wherein the content is medical content comprising at least one of medical devices, medical products, pharmaceuticals, medical procedures, medical therapies, and medical treatments, and wherein the set of at least one designated source comprises at least one healthcare provider.

Embodiment 74. The system of embodiment 73, wherein identifying the plurality of content comprises searching the content database, which comprises medical content organized by medical content name, medical condition, symptom, and side effect.

Embodiment 75. The system of embodiment 73, wherein identifying the number of times each medical content of the plurality of content has been referenced comprises:

identifying the number of times each medical content of the plurality of content has been purchased, used, prescribed, and recommended by each healthcare provider or combination thereof.

Embodiment 76. The system of embodiment 73, wherein generating the search result of the plurality of content comprises:
ordering the search result with most referenced content first and breaking ties by at least one tie-breaker from the group consisting of:
average ranking by at least one ranking organization for the healthcare providers that reference the content;
the medical content type;
credentials of healthcare providers that reference the medical content;
recency of the references;
incidence of side-effects caused by the medical content;
a user's medical history; and
a user's option selection.

Embodiment 77. The system of embodiment 67, wherein generating the search result of the plurality of content comprises:
ordering the search result by a number of references of each content of the plurality of content, and
breaking ties by at least one tie-breaker from the group consisting of:
average ranking by at least one ranking organization for the healthcare providers that reference the content;
key word matches to content title;
key word matches to class name;
average ranking by at least one ranking organization for the sources that reference the content;
alphabetical order by content title;
the content type;
credentials of the healthcare providers that reference the medical content;
recency of the references;
incidence of side-effects caused by the medical content;
characteristic from a medical history of a user;
characteristic from a demographic profile of the user;
characteristic from a genetic data of the user;
characteristic of insurance coverage of the user;
lowest current price of content;
highest current price of content;
average current price of content;
average current price of content using only the lowest current price of content from each source of a content for the calculation;
median current price of content;
median current price of content using only the lowest current price of content from each source of a content for the calculation;
closest brick-and-mortar source to a location;
closest brick-and-mortar source to user's current location; and
an option selection of the user.

Embodiment 78. The system of embodiment 73, wherein generating the search result of the plurality of content comprises:
ordering the search result by a number of references of each content of the plurality of content, and
breaking ties by at least one tie-breaker from the group consisting of:
average ranking by at least one ranking organization for the healthcare providers that reference the content;
the medical content type;
credentials of the healthcare providers that reference the medical content;
recency of the references;
incidence of side-effects caused by the medical content;
characteristic from a medical history of a user;
characteristic from a demographic profile of the user;
characteristic from a genetic data of the user;
characteristic of insurance coverage of the user; and
an option selection of the user.

Embodiment 79. The method of embodiment 1, wherein identifying the number of times each content of the plurality of content has been referenced comprises:
identifying the number of times each content of the plurality of content has been required, recommended, prescribed, used, purchased, sold, rented, leased, or licensed, or any combination thereof.

Embodiment 80. The method of embodiment 1, wherein identifying the number of times each content of the plurality of content has been referenced comprises identifying the number of sources that have referenced each content of the plurality of content.

Embodiment 81. The method of embodiment 1, wherein identifying the number of times each content of the plurality of content has been referenced comprises identifying the number of sources that have referenced each content of the plurality of content and identifying the number of times each content of the plurality of content has been referenced.

Embodiment 82. The method of embodiment 1, wherein generating the search result of the plurality of content comprises:
ordering the search result by a number of references of each content of the plurality of content, and
breaking ties by at least one tie-breaker from the group consisting of:
the number of sources that have referenced each content; and
alphabetical order by content title.

Embodiment 83. The method of embodiment 80, wherein generating the search result of the plurality of content comprises:
ordering the search result by a number of sources that have referenced each content of the plurality of content, and
breaking ties by at least one tie-breaker from the group consisting of:
the number of references for each content; and
alphabetical order by content title.

Embodiment 84. The method of embodiment 1, wherein generating a search result of the plurality of content comprises every content having all respective source indicators going horizontally away from the respective content and wherein a single source can have at most one respective source indicator for a respective content.

Embodiment 85. The method of embodiment 1, wherein generating a search result of the plurality of content comprises every content having all respective source indicators going horizontally away from the respective content and wherein a single source can have at most one respective source indicator for a respective content, and wherein the content is educational content, or medical content, or library content, or commercial content, or any combination thereof.

Embodiment 86. The method of embodiment 84, wherein the content is educational content, or medical content, or library content, or commercial content, or any combination thereof.

Embodiment 87. The method of embodiment 1, wherein generating a search result of the plurality of content comprises every content having all respective source indicators going horizontally away from the respective content and wherein a single source can have at most one respective source indicator for a respective content, and wherein the content is educational content, or medical content, or library content, or commercial content, or TV content, or internet video/audio content, or any combination thereof.

Embodiment 88. The method of embodiment 20, wherein the content is medical content comprising at least one of medical devices, medical products, pharmaceuticals, botanicals, medical procedures, medical therapies, and medical treatments.

Embodiment 89. The method of embodiment 20, wherein identifying a plurality of content comprises identifying at least one medical device, pharmaceutical, botanical, medical procedure, medical therapy, medical treatment, or medical product.

Embodiment 90. A method for facilitating commercial content search and results, the method comprising:
identifying a plurality of commercial content in response to receiving a search query;
identifying a number of times each commercial content of the plurality of commercial content has been referenced by sources of a set of at least one designated source; and
generating a search result of the plurality of commercial content that is ordered based on the number of times each commercial content has been referenced.

Embodiment 91. The method of embodiment 90, wherein the commercial content is menu content.

Embodiment 92. The method of embodiment 90, wherein the set of at least one designated source comprises at least one restaurant.

Embodiment 93. The method of embodiment 90, wherein the commercial content comprises menu content and the set of at least one designated source comprises at least one restaurant.

Embodiment 94. The method of embodiment 90, wherein the commercial content is or comprises menu content and the set of at least one designated source comprises at least one brick-and-mortar source Embodiment 95. The method of embodiment 90, wherein the set of at least one designated source comprises at least one of a restaurant, website, or grocery store.

Embodiment 96. The method of embodiment 90, wherein the set of at least one designated source comprises at least one website.

Embodiment 97. The method of embodiment 90, wherein the set of at least one designated source comprises at least one of a store, restaurant, or website.

Embodiment 98. The method of embodiment 90, wherein the set of at least one designated source comprises at least one store.

Embodiment 99. The method of embodiment 90, wherein the set of at least one designated source comprises at least one brick-and-mortar source and at least one website source.

Embodiment 100. The method of embodiment 90, wherein the set of at least one designated source comprises at least one brick-and-mortar location or at least one website.

Embodiment 101. The method of embodiment 90, wherein the set of at least one designated source comprises a set searched, filtered, selected, or otherwise controlled for by the user.

Embodiment 102. The method of embodiment 93, wherein the menu content comprises menu item content.

Embodiment 103. The method of embodiment 93, wherein the menu content comprises menu item content or menu item category content.

Embodiment 104. The method of embodiment 93, wherein the menu content comprises menu item content and menu item category content.

Embodiment 105. The method of embodiment 104, wherein menu item content and menu item category content are presented in separate results that are side-by-side one another.

Embodiment 106. The method of embodiment 104, wherein menu item content and menu item category content are not in separate results that are side-by-side one another, but are in a single mixed result comprising both menu item content and menu item category content.

Embodiment 107. The method of embodiment 90, wherein identifying the plurality of commercial content comprises searching a database of commercial content organized by content name, content category name, and source name.

Embodiment 108. The method of embodiment 90, wherein identifying the plurality of commercial content comprises searching a database of commercial content organized by product name, product category name, and source name.

Embodiment 109. The method of embodiment 90, wherein identifying the plurality of commercial content comprises searching a database of commercial content organized by service name, service category name, and source name.

Embodiment 110. The method of embodiment 90, wherein identifying the plurality of commercial content comprises searching a database of commercial content by one or more of content name and content category name.

Embodiment 111. The method of embodiment 102, wherein identifying the plurality of commercial content comprises searching a database of commercial content by one or more of menu item content name and menu item category content name.

Embodiment 112. The method of embodiment 102, wherein identifying the plurality of commercial content comprises searching a database of commercial content organized by menu item name, source name, and menu item category name.

Embodiment 113. The method of embodiment 90, wherein the commercial content is *Cannabis* or comprises *Cannabis* or any part thereof.

Embodiment 114. The method of embodiment 90, wherein at least one resulting commercial content is or comprises *Cannabis* or any part thereof.

Embodiment 115. The method of embodiment 90, wherein the commercial content is *Cannabis* or a product comprising *Cannabis* or any part thereof.

Embodiment 116. The method of embodiment 90, wherein the commercial content comprises *Cannabis* flower.

Embodiment 117. The method of 116, wherein each commercial content is a different strain of *Cannabis*.

Embodiment 118. The method of embodiment 117, wherein generating the search result of the plurality of commercial content comprises: ordering the search result with most referenced first and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Embodiment 119. The method of embodiment 117, wherein generating the search result of the plurality of commercial content comprises: ordering the search result with least referenced first and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Embodiment 120. The method of embodiment 117, wherein generating the search result of the plurality of commercial content comprises: ordering a search result with most referenced first side-by-side an additional search result ordering the search result with least referenced first, and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Embodiment 121. The method of embodiment 113, wherein generating the search result of the plurality of commercial content comprises: ordering a search result with most referenced first side-by-side an additional search result ordering the search result with least referenced first, and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Embodiment 122. The method of embodiment 116, wherein each commercial content is a different phenotype of *Cannabis*.

Embodiment 123. The method of embodiment 116, wherein each commercial content is a different genotype of *Cannabis*.

Embodiment 124. The method of embodiment 116, wherein each commercial content is a different genotype of *Cannabis* or a different phenotype of *Cannabis*.

Embodiment 125. The method of embodiment 90, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different phenotype of *Cannabis* flower.

Embodiment 126. The method of embodiment 90, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different genotype of *Cannabis* flower.

Embodiment 127. The method of embodiment 90, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different strain of *Cannabis* flower.

Embodiment 128. The method of embodiment 90, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different genotype of *Cannabis* flower or a different phenotype of *Cannabis* flower.

Embodiment 129. The method of embodiment 90, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein two search results are generated side-by-side one another, wherein one result comprising each commercial content being a different genotype of *Cannabis* flower and the other result comprising each commercial content being a different phenotype of *Cannabis* flower.

Embodiment 130. The method of embodiment 125, wherein generating the search result of the plurality of commercial content comprises: ordering a search result with most referenced first side-by-side an additional search result ordering the search result with least referenced first, and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Embodiment 131. The method of embodiment 126, wherein generating the search result of the plurality of commercial content comprises: ordering a search result with most referenced first side-by-side an additional search result ordering the search result with least referenced first, and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Embodiment 132. The method of embodiment 127, wherein generating the search result of the plurality of commercial content comprises: ordering a search result with most referenced first side-by-side an additional search result ordering the search result with least referenced first, and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Embodiment 133. The method of embodiment 128, wherein generating the search result of the plurality of commercial content comprises: ordering a search result with most referenced first side-by-side an additional search result ordering the search result with least referenced first, and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Embodiment 134. The method of embodiment 129, wherein generating the search result of the plurality of commercial content comprises: ordering a search result with most referenced first side-by-side an additional search result ordering the search result with least referenced first, and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Embodiment 135. The method of embodiment 90, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different menu item content.

Embodiment 136. The method of embodiment 90, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different menu content.

Embodiment 137. The method of embodiment 135, wherein generating the search result of the plurality of commercial content comprises: ordering a search result with most referenced first side-by-side an additional search result ordering the search result with least referenced first, and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Embodiment 138. The method of embodiment 136, wherein generating the search result of the plurality of commercial content comprises: ordering a search result with most referenced first side-by-side an additional search result ordering the search result with least referenced first, and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Embodiment 139. The method of embodiment 90, wherein at least one commercial content has at least one respective source indicator adjacent to the at least one commercial content.

Embodiment 140. The method of embodiment 90, wherein every commercial content has at least one respective source indicator adjacent to said content.

Embodiment 141. The method of embodiment 90, wherein at least one commercial content has all respective source indicators going away from the commercial content.

Embodiment 142. The method of embodiment 90, wherein generating a search result of the plurality of commercial content comprises every commercial content having all respective source indicators going horizontally away from the respective commercial content and wherein a single source can have at most one respective source indicator for a respective commercial content.

Embodiment 143. The method of embodiment 90, wherein generating a search result of the plurality of commercial content comprises at least one commercial content having at least one respective source indicator going horizontally away from the respective commercial content and wherein a single source can have at most one respective source indicator for a respective commercial content.

Embodiment 144. The method of embodiment 142, wherein respective source indicators are horizontally ordered starting at the right of the respective commercial content and respective source indicators are ordered going horizontally to the right of the respective commercial content.

Embodiment 145. The method of embodiment 144, wherein the source indicators are ordered based on lowest current price of the respective source for the respective content, or based on distance to source from user's current location, or based on ABC order using source names, or any combination thereof.

Embodiment 146. The method of embodiment 145, wherein one or more of lowest current price of the respective source for the respective content, distance to source from user's current location, or ABC order using source names, is used as one or more tie breakers for one or more of lowest current price of the respective source for the respective content, distance to source from user's current location, ABC order using source names.

Embodiment 147. The method of embodiment 90, wherein every commercial content has respective source indicators going horizontally away from the respective commercial content.

Embodiment 148. The method of embodiment 90, wherein a single source can have at most one respective source indicator for a respective commercial content.

Embodiment 149. The method of embodiment 145, wherein each source is limited to at most one respective source indicator for a respective commercial content.

Embodiment 150. The method of embodiment 90, wherein every commercial content has at least one respective source indicator going away from the commercial content.

Embodiment 151. The method of embodiment 90, wherein the commercial content comprises at least one product or at least one service.

Embodiment 152. The method of embodiment 90, wherein the commercial content comprises at least one product and at least one service.

Embodiment 153. The method of embodiment 90, wherein the commercial content comprises at least one product, good, item, or service.

Embodiment 154. The method of embodiment 90, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different vehicle.

Embodiment 155. The method of embodiment 90, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different make of vehicle.

Embodiment 156. The method of embodiment 90, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different model of vehicle.

Embodiment 157. The method of embodiment 90, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different make and model of vehicle.

Embodiment 158. The method of embodiment 90, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different make or model of vehicle.

Embodiment 159. The method of embodiment 90, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different make, model, or year of vehicle.

Embodiment 160. The method of embodiment 90, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different make of vehicle or a different model of vehicle or a different year of vehicle.

Embodiment 161. The method of embodiment 90, wherein identifying the number of times each commercial content of the plurality of commercial content has been referenced comprises identifying the number of sources that are currently selling, leasing, renting, licensing, or assigning, the commercial content.

Embodiment 162. The method of embodiment 90, wherein identifying the number of times each commercial content of the plurality of commercial content has been referenced comprises identifying the number of sources that are currently referencing the commercial content.

Embodiment 163. The method of embodiment 90, wherein identifying the number of times each commercial content of the plurality of commercial content has been referenced comprises identifying the number of sources that have referenced the commercial content.

Embodiment 164. The method of embodiment 90, wherein identifying the number of times each commercial content of the plurality of commercial content has been referenced comprises identifying the number of times each commercial content of the plurality of commercial content has been referenced.

Embodiment 165. The method of embodiment 90, wherein identifying the number of times each commercial content of the plurality of commercial content has been referenced comprises identifying the number of sources that are currently referencing the commercial content, or identifying the number of sources that have referenced the commercial content, or identifying the number of times each commercial content of the plurality of commercial content has been referenced, or any combination thereof.

Embodiment 166. The method of embodiment 90, wherein identifying the number of times each commercial content of the plurality of commercial content has been referenced comprises identifying the number of sources that are currently referencing the commercial content, and identifying the number of sources that have referenced the commercial content.

Embodiment 167. The method of embodiment 90, wherein identifying the number of times each commercial content of the plurality of commercial content has been referenced comprises identifying the number of sources that are currently referencing the commercial content, and identifying the number of times each commercial content of the plurality of commercial content has been referenced.

Embodiment 168. The method of embodiment 90, wherein identifying the number of times each commercial content of the plurality of commercial content has been referenced comprises identifying the number of sources that have referenced the commercial content, and identifying the number of times each commercial content of the plurality of commercial content has been referenced.

Embodiment 169. The method of embodiment 90, wherein identifying the number of times each commercial content of the plurality of commercial content has been referenced comprises identifying the number of sources that have sold, leased, rented, licensed, or assigned, the commercial content.

Embodiment 170. The method of embodiment 90, wherein identifying the number of times each commercial content of the plurality of commercial content has been referenced comprises identifying the number of sources that are currently selling, leasing, renting, licensing, or assigning, the commercial content, and identifying the number of sources that have sold, leased, rented, licensed, or assigned, the commercial content.

Embodiment 171. The method of embodiment 90, wherein identifying the number of times each commercial content of the plurality of commercial content has been referenced comprises identifying the number of sources that are currently selling the commercial content, and identifying the number of sources that have sold the commercial content.

Embodiment 172. The method of embodiment 90, wherein identifying the number of times each commercial content of the plurality of commercial content has been referenced comprises identifying the number of sources that are currently selling the commercial content, or identifying the number of sources that have sold the commercial content, or identifying the number of times the commercial content has been sold, or any combination thereof.

Embodiment 173. The method of embodiment 90, wherein identifying the number of times each commercial content of the plurality of commercial content has been referenced comprises identifying the number of sources that are currently referencing the commercial content, or identifying the number of sources that have referenced the commercial content, or identifying the number of times the commercial content has been referenced, or any combination thereof.

Embodiment 174. The method of embodiment 90, wherein identifying the number of times each commercial content of the plurality of commercial content has been referenced comprises identifying the number of sources that are currently selling and, leasing or renting or licensing, the commercial content, and identifying the number of sources that have sold and, leased or rented or licensed, the commercial content.

Embodiment 175. The method of embodiment 90, wherein identifying the number of times each commercial content of the plurality of commercial content has been referenced comprises identifying the number of sources that are currently selling and, leasing or renting or licensing, the commercial content.

Embodiment 176. The method of embodiment 90, wherein identifying the number of times each commercial content of the plurality of commercial content has been referenced comprises identifying the number of sources that have sold and, leased or rented or licensed, the commercial content.

Embodiment 177. The method of embodiment 90, wherein identifying the number of times each commercial content of the plurality of commercial content has been referenced comprises identifying the number of sources that are currently selling or leasing or renting or licensing, the commercial content.

Embodiment 178. The method of embodiment 90, wherein identifying the number of times each commercial content of the plurality of commercial content has been referenced comprises identifying the number of sources that are currently selling and renting the commercial content, or identifying the number of sources that have sold and rented the commercial content, or identifying the number of times the commercial content has been sold and rented, or any combination thereof.

Embodiment 179. The method of embodiment 90, wherein identifying the number of times each commercial content of the plurality of commercial content has been referenced comprises identifying the number of sources that are currently selling and licensing the commercial content, or identifying the number of sources that have sold and licensed the commercial content, or identifying the number of times the commercial content has been sold and licensed, or any combination thereof.

Embodiment 180. The method of embodiment 90, wherein identifying the number of times each commercial content of the plurality of commercial content has been referenced comprises identifying the number of sources that are currently selling or licensing the commercial content, or identifying the number of sources that have sold or licensed the commercial content, or identifying the number of times the commercial content has been sold or licensed, or any combination thereof.

Embodiment 181. The method of embodiment 90, wherein identifying the number of times each commercial content of the plurality of commercial content has been referenced comprises identifying the number of sources that are currently selling and leasing the commercial content, or identifying the number of sources that have sold and leased the commercial content, or identifying the number of times the commercial content has been sold and leased, or any combination thereof.

Embodiment 182. The method of embodiment 90, wherein identifying the number of times each commercial content of the plurality of commercial content has been referenced comprises identifying the number of times each commercial content of the plurality of commercial content has been sold, leased, rented, licensed, or assigned.

Embodiment 183. The method of embodiment 182, wherein a single source can only contribute a max of one rank point for a single commercial content, even if a single source has multiple references for the single ranked commercial content in a time filtered for.

Embodiment 184. The method of embodiment 182, wherein a single source can only contribute a max of one rank point and a max of one source indicator, for a single commercial content, even if a single source has multiple references for the single ranked commercial content in a time filtered for.

Embodiment 185. The method of embodiment 90, wherein a single source can only contribute a max of one rank point and a max of one source indicator, for a single commercial content, even if a single source has multiple references for the single ranked commercial content in a time filtered for.

Embodiment 186. The method of embodiment 90, wherein a single source can only contribute a max of one rank point or a max of one source indicator, for a single commercial content, even if a single source has multiple references for the single ranked commercial content in a time filtered for.

Embodiment 187. The method of embodiment 90, wherein a single source can only contribute a max of one rank point for a single commercial content, even if a single source has multiple references for the single ranked commercial content in a time filtered for.

Embodiment 188. The method of embodiment 90, wherein a single source can only contribute a max of one source indicator for a single commercial content, even if a single source has multiple references for the single ranked commercial content in a time filtered for.

Embodiment 189. The method of embodiment 90, wherein identifying the number of times each commercial content of the plurality of commercial content has been referenced comprises identifying the number of sources that are currently selling the commercial content.

Embodiment 190. The method of embodiment 90, wherein identifying the number of times each commercial content of the plurality of commercial content has been referenced comprises identifying the number of sources that are currently selling, or have sold, the commercial content.

Embodiment 191. The method of embodiment 90, wherein identifying the number of times each commercial content of the plurality of commercial content has been referenced comprises identifying the number of sources that have sold the commercial content.

Embodiment 192. The method of embodiment 90, wherein identifying the number of times each commercial content of the plurality of commercial content has been referenced comprises identifying the number of sources that have rented, leased, or licensed the commercial content.

Embodiment 193. The method of embodiment 90, wherein identifying the number of times each commercial content of the plurality of commercial content has been referenced comprises identifying the number of sources that are currently selling or renting or licensing or leasing, the commercial content.

Embodiment 194. The method of embodiment 90, wherein identifying the number of times each commercial content of the plurality of commercial content has been referenced comprises identifying the number of sources that are currently selling and renting the commercial content.

Embodiment 195. The method of embodiment 90, wherein identifying the number of times each commercial content of the plurality of commercial content has been referenced comprises identifying the number of sources that are currently selling and licensing the commercial content.

Embodiment 196. The method of embodiment 90, wherein identifying the number of times each commercial content of the plurality of commercial content has been referenced comprises identifying the number of sources that are currently selling or licensing the commercial content.

Embodiment 197. The method of embodiment 90, wherein identifying the number of times each commercial content of the plurality of commercial content has been referenced comprises identifying the number of sources that are currently selling and, renting or licensing or leasing, the commercial content.

Embodiment 198. The method of embodiment 90, wherein identifying the number of times each commercial content of the plurality of commercial content has been referenced comprises identifying the number of sources that are currently selling or renting or licensing or leasing, the commercial content.

Embodiment 199. The method of embodiment 90, wherein identifying the number of times each commercial content of the plurality of commercial content has been referenced comprises identifying the number of sources that are currently leasing, renting, or licensing, the commercial content.

Embodiment 200. The method of embodiment 90, wherein identifying the number of times each commercial content of the plurality of commercial content has been referenced comprises identifying the number of sources that are currently leasing the commercial content.

Embodiment 201. The method of embodiment 90, wherein identifying the number of times each commercial content of the plurality of commercial content has been referenced comprises identifying the number of sources that are currently renting the commercial content.

Embodiment 202. The method of embodiment 90, wherein identifying the number of times each commercial content of the plurality of commercial content has been referenced comprises identifying the number of sources that are currently licensing the commercial content.

Embodiment 203. The method of embodiment 90, wherein identifying the number of times each commercial content of the plurality of commercial content has been referenced comprises identifying the number of sources that are currently assigning the commercial content.

Embodiment 204. The method of embodiment 90, wherein identifying the number of times each commercial content of the plurality of commercial content has been referenced comprises identifying the number of sources that have rented the commercial content.

Embodiment 205. The method of embodiment 90, wherein identifying the number of times each commercial content of the plurality of commercial content has been referenced comprises identifying the number of sources that have licensed the commercial content.

Embodiment 206. The method of embodiment 90, wherein identifying the number of times each commercial content of the plurality of commercial content has been referenced comprises identifying the number of sources that have leased the commercial content.

Embodiment 207. The method of embodiment 90, wherein identifying the number of times each commercial content of the plurality of commercial content has been referenced comprises identifying the number of sources that have assigned the commercial content.

Embodiment 208. The method of embodiment 90, wherein identifying the number of times each commercial content of the plurality of commercial content has been referenced comprises identifying the number of sources that have sold the commercial content.

Embodiment 209. The method of embodiment 90, wherein identifying the number of times each commercial content of the plurality of commercial content has been referenced comprises identifying the number of times each commercial content of the plurality of commercial content has been sold.

Embodiment 210. The method of embodiment 90, wherein identifying the number of times each commercial content of the plurality of commercial content has been referenced comprises identifying the number of times each commercial content of the plurality of commercial content has been leased.

Embodiment 211. The method of embodiment 90, wherein identifying the number of times each commercial content of the plurality of commercial content has been referenced comprises identifying the number of times each commercial content of the plurality of commercial content has been rented.

Embodiment 212. The method of embodiment 90, wherein identifying the number of times each commercial content of the plurality of commercial content has been referenced comprises identifying the number of times each commercial content of the plurality of commercial content has been licensed.

Embodiment 213. The method of embodiment 90, wherein identifying the number of times each commercial content of the plurality of commercial content has been referenced comprises identifying the number of times each commercial content of the plurality of commercial content has been assigned.

Embodiment 214. The method of embodiment 90, wherein identifying the number of times each commercial content of the plurality of commercial content has been referenced comprises identifying the number of sources that are currently selling, leasing, renting, licensing, assigning, or using, the commercial content, and identifying the number of sources that have purchased, used, sold, leased, rented, licensed, or assigned, the commercial content.

Embodiment 215. The method of embodiment 90, wherein identifying the number of times each commercial content of the plurality of commercial content has been referenced comprises identifying the number of sources that are currently selling, leasing, renting, licensing, or assigning, the commercial content, and identifying the number of sources that have sold, leased, rented, licensed, or assigned, the commercial content, and identifying the number of times each commercial content of the plurality of commercial content has been sold, leased, rented, licensed, or assigned.

Embodiment 216. The method of embodiment 90, wherein identifying the number of times each commercial content of the plurality of commercial content has been referenced comprises identifying the number of sources that are currently selling, leasing, renting, licensing, or assigning, the commercial content, or identifying the number of sources that have sold, leased, rented, licensed, or assigned, the commercial content, and identifying the number of times each commercial content of the plurality of commercial content has been sold, leased, rented, licensed, or assigned.

Embodiment 217. The method of embodiment 90, wherein identifying the number of times each commercial content of the plurality of commercial content has been referenced comprises identifying the number of sources that are currently selling, leasing, renting, licensing, or assigning, the commercial content, or identifying the number of sources that have sold, leased, rented, licensed, or assigned, the commercial content, or identifying the number of times each commercial content of the plurality of commercial content has been sold, leased, rented, licensed, or assigned.

Embodiment 218. The method of embodiment 90, wherein identifying the number of times each commercial content of the plurality of commercial content has been referenced comprises identifying the number of sources that are currently selling, leasing, renting, licensing, or assigning, the commercial content, or identifying the number of sources that have sold, leased, rented, licensed, or assigned, the commercial content, or identifying the number of times each commercial content of the plurality of commercial content has been sold, leased, rented, licensed, or assigned, or any combination thereof.

Embodiment 219. The method of embodiment 90, wherein identifying the number of times each commercial content of the plurality of commercial content has been referenced comprises identifying the number of sources that are currently selling, leasing, renting, licensing, or assigning, the commercial content, and identifying the number of times each commercial content of the plurality of commercial content has been sold, leased, rented, licensed, or assigned.

Embodiment 220. The method of embodiment 90, wherein identifying the number of times each commercial content of the plurality of commercial content has been referenced comprises identifying the number of sources that have sold, leased, rented, licensed, or assigned, the commercial content, and identifying the number of times each commercial content of the plurality of commercial content has been sold, leased, rented, licensed, or assigned.

Embodiment 221. The method of embodiment 90, wherein generating the search result of the plurality of commercial content comprises: ordering the search result with most referenced first and breaking ties by at least one tie-breaker from the group consisting of: price of commercial content; lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; key word matches to commercial content title; recency of references; a user's option selection; closest brick-and-mortar source to a location; closest brick-and-mortar source to user's current location; and alphabetical order by commercial content title.

Embodiment 222. The method of embodiment 90, wherein generating a search result of the plurality of commercial content comprises every commercial content having all respective source indicators going horizontally away from the respective commercial content and wherein a single source can have at most one respective source indicator for a respective commercial content, and wherein generating the search result of the plurality of commercial content comprises: ordering a search result with most referenced first side-by-side an additional search result ordering the search result with least referenced first, and breaking ties by at least one tie-breaker from the group consisting of: price of commercial content; lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; key word matches to commercial content title; recency of references; a user's option selection; closest brick-and-mortar source to a location; closest brick-and-mortar source to user's current location; and alphabetical order by commercial content name.

Embodiment 223. The method of embodiment 90, wherein generating the search result of the plurality of commercial content comprises: ordering the search result with least referenced first and breaking ties by at least one tie-breaker from the group consisting of: price of commercial content; lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; key word matches to commercial content title; recency of references; a user's option selection; closest brick-and-mortar source to a location; closest brick-and-mortar source to user's current location; and alphabetical order by commercial content name.

Embodiment 224. The method of embodiment 90, wherein generating the search result of the plurality of commercial content comprises: ordering the search result with most referenced first and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content name.

Embodiment 225. The method of embodiment 90, wherein generating the search result of the plurality of commercial content comprises: ordering a search result with most referenced first side-by-side an additional search result ordering the search result with least referenced first, and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content name.

Embodiment 226. The method of embodiment 90, wherein generating the search result of the plurality of commercial content comprises: ordering the search result with least referenced first and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content name.

Embodiment 227. The method of embodiment 90, wherein generating the search result of the plurality of commercial content comprises ordering the search result with most referenced first.

Embodiment 228. The method of embodiment 90, wherein generating the search result of the plurality of commercial content comprises ordering the search result with least referenced first.

Embodiment 229. The method of embodiment 90, wherein generating the search result of the plurality of commercial content comprises ordering a search result with most referenced first side-by-side an additional search result ordering the search result with least referenced first.

Embodiment 230. The method of embodiment 102, wherein generating the search result of the plurality of commercial content comprises: ordering the search result with most referenced first and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Embodiment 231. The method of embodiment 102, wherein generating the search result of the plurality of commercial content comprises: ordering the search result with least referenced first and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Embodiment 232. The method of embodiment 102, wherein generating the search result of the plurality of commercial content comprises: ordering a search result with most referenced first side-by-side an additional search result ordering the search result with least referenced first, and breaking ties by at least one tie-breaker from the group consisting of: lowest current price of commercial content; highest current price of commercial content; average current price of commercial content; average current price of commercial content using only the lowest current price of commercial content from each source of a commercial content for the calculation; median current price of commercial content; median current price of commercial content using only the lowest current price of commercial content from each source of a commercial content for the calculation; closest brick-and-mortar source to a location; closest brick-and-mortar source to user's current location; and alphabetical order by commercial content title.

Embodiment 233. The method of embodiment 93, wherein identifying the number of times each commercial content of the plurality of commercial content has been referenced comprises identifying the number of sources that currently have the commercial content on a menu.

Embodiment 234. The method of embodiment 93, wherein identifying the number of times each commercial content of the plurality of commercial content has been referenced comprises identifying the number of sources that had the commercial content on a menu.

Embodiment 235. The method of embodiment 93, wherein identifying the number of times each commercial content of the plurality of commercial content has been referenced comprises identifying the number of sources that currently have the commercial content on a menu or identifying the number of sources that had the commercial content on a menu.

Embodiment 236. The method of embodiment 93, wherein identifying the number of times each commercial content of the plurality of commercial content has been referenced comprises identifying the number of sources that currently have the commercial content on a menu and identifying the number of sources that had the commercial content on a menu.

Embodiment 237. The method of embodiment 93, wherein identifying the number of times each commercial content of the plurality of commercial content has been referenced comprises identifying the number of sources that currently have the commercial content on a menu or other listing of commercial content.

Embodiment 238. The method of embodiment 93, wherein identifying the number of times each commercial content of the plurality of commercial content has been referenced comprises identifying the number of menus that currently have the commercial content on the menu.

Embodiment 239. The method of embodiment 93, wherein identifying the number of times each commercial content of the plurality of commercial content has been referenced comprises identifying the number of sources that currently have the commercial content on a website, menu or other listing of commercial content.

Embodiment 240. The method of embodiment 93, wherein identifying the number of times each commercial content of the plurality of commercial content has been referenced comprises identifying the number of sources that currently have the commercial content available for purchase.

Embodiment 241. The method of embodiment 90, wherein identifying the number of times each commercial content of the plurality of commercial content has been referenced comprises identifying the number of sources that currently have the commercial content available for purchase.

Embodiment 242. The method of embodiment 90, wherein identifying the number of times each commercial content of the plurality of commercial content has been referenced comprises identifying the number of sources that currently have the commercial content available for purchasing, renting, leasing, licensing, or assigning.

Embodiment 243. The method of embodiment 240, wherein identifying the number of sources that currently have the commercial content available for purchase comprises counting commercial content as available for purchase from a respective source if the commercial content is on at least one menu of the respective source.

Embodiment 244. The method of embodiment 142, wherein each source indicator comprises an image.

Embodiment 245. The method of embodiment 244, wherein the image is of the respective commercial content from the respective source.

Embodiment 246. An educational content search and ranking system, the system comprising:
  one or more computer readable storage media;
  an educational content database or table stored on the one or more computer readable storage media; and
  program instructions stored on the one or more computer readable storage media for an educational content search and ranking engine that, when executed by one or more processors, directs the one or more processors to:
  identify a plurality of educational content from the educational content database in response to receiving a search query;
  identify a number of times each educational content of the plurality of educational content has been referenced by sources of a set of at least one designated source; and generate a search result of the plurality of educational content that is ordered based on the number of times each educational content has been referenced.

Embodiment 247. A medical content search and ranking system, the system comprising:
one or more computer readable storage media;
a medical content database or table stored on the one or more computer readable storage media; and
program instructions stored on the one or more computer readable storage media for a medical content search and ranking engine that, when executed by one or more processors, directs the one or more processors to:
identify a plurality of medical content from the medical content database in response to receiving a search query;
identify a number of times each medical content of the plurality of medical content has been referenced by sources of a set of at least one designated source; and
generate a search result of the plurality of medical content that is ordered based on the number of times each medical content has been referenced.

Embodiment 248. A library content search and ranking system, the system comprising:
one or more computer readable storage media;
a library content database or table stored on the one or more computer readable storage media; and
program instructions stored on the one or more computer readable storage media for a library content search and ranking engine that, when executed by one or more processors, directs the one or more processors to:
identify a plurality of library content from the library content database in response to receiving a search query;
identify a number of times each library content of the plurality of library content has been referenced by sources of a set of at least one designated source; and
generate a search result of the plurality of library content that is ordered based on the number of times each library content has been referenced.

Embodiment 249. A TV content search and ranking system, the system comprising: one or more computer readable storage media;
a TV content database or table stored on the one or more computer readable storage media; and
program instructions stored on the one or more computer readable storage media for a TV content search and ranking engine that, when executed by one or more processors, directs the one or more processors to:
identify a plurality of TV content from the TV content database in response to receiving a search query;
identify a number of times each TV content of the plurality of content has been referenced by sources of a set of at least one designated source; and
generate a search result of the plurality of TV content that is ordered based on the number of times each TV content has been referenced.

Embodiment 250. An internet video/audio content search and ranking system, the system comprising:
one or more computer readable storage media;
an internet video/audio content database or table stored on the one or more computer readable storage media; and
program instructions stored on the one or more computer readable storage media for an internet video/audio content search and ranking engine that, when executed by one or more processors, directs the one or more processors to:
identify a plurality of internet video/audio content from the internet video/audio content database in response to receiving a search query;
identify a number of times each internet video/audio content of the plurality of internet video/audio content has been referenced by sources of a set of at least one designated source; and
generate a search result of the plurality of internet video/audio content that is ordered based on the number of times each internet video/audio content has been referenced.

Embodiment 251. A commercial content search and ranking system, the system comprising:
one or more computer readable storage media;
a commercial content database or table stored on the one or more computer readable storage media; and
program instructions stored on the one or more computer readable storage media for a commercial content search and ranking engine that, when executed by one or more processors, directs the one or more processors to:
identify a plurality of commercial content from the commercial content database in response to receiving a search query;
identify a number of times each commercial content of the plurality of commercial content has been referenced by sources of a set of at least one designated source; and
generate a search result of the plurality of commercial content that is ordered based on the number of times each commercial content has been referenced.

Embodiment 252. The system of embodiment 251, wherein the commercial content comprises menu item content, and wherein the set of at least one designated source comprises at least one store or at least one restaurant.

Embodiment 253. The system of embodiment 252, wherein identifying the plurality of commercial content comprises searching the commercial content database by menu item name.

Embodiment 254. The system of embodiment 251, wherein receiving the search query comprises receiving at least one term.

Embodiment 255. The system of embodiment 252, wherein identifying the number of times each commercial content of the plurality of commercial content has been referenced comprises identifying the number of sources that currently have the commercial content available for purchase, and wherein identifying the number of sources that currently have the commercial content available for purchase comprises counting commercial content as available for purchase from a respective source if the commercial content is on at least one menu of the respective source.

Embodiment 256. The system of embodiment 255, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source.

Embodiment 257. The system of embodiment 251, wherein identifying the number of times each commercial content of the plurality of commercial content has been referenced comprises identifying the number of sources that are currently selling and, leasing or renting or licensing, the commercial content.

Embodiment 258. The system of embodiment 251, wherein identifying the number of times each commercial content of the plurality of commercial content has been referenced comprises identifying the number of sources that are currently selling the commercial content.

Embodiment 259. The system of embodiment 251, wherein identifying the number of times each commercial content of the plurality of commercial content has been referenced comprises identifying the number of sources that are currently selling, leasing, renting, or licensing, the commercial content.

Embodiment 260. The system of embodiment 251, wherein identifying the number of times each commercial content of the plurality of commercial content has been referenced comprises identifying the number of sources that are currently selling, leasing, renting, licensing, or assigning, the commercial content, or identifying the number of sources that have sold, leased, rented, licensed, or assigned, the commercial content, or identifying the number of times each commercial content of the plurality of commercial content has been sold, leased, rented, licensed, or assigned, or any combination thereof.

Embodiment 261. The system of embodiment 251, wherein identifying the plurality of commercial content comprises searching the commercial content database, which comprises commercial content organized by commercial content name, commercial content category name, and source name.

Embodiment 262. The method of embodiment 1, wherein identifying a plurality of content comprises identifying at least one *Cannabis* product, *Cannabis* flower, product infused with *Cannabis* or any part(s) thereof, or *Cannabis* edible.

Embodiment 263. The method of embodiment 90, wherein identifying a plurality of commercial content comprises identifying at least one *Cannabis* product, *Cannabis* flower, product infused with *Cannabis* or any part(s) thereof, or *Cannabis* edible.

Embodiment 264. The method of embodiment 1, wherein identifying a plurality of content comprises identifying at least one *Cannabis* product, *Cannabis* plant, *Cannabis* flower, product infused with *Cannabis* or any part(s) thereof, or *Cannabis* edible.

Embodiment 265. The method of embodiment 90, wherein identifying a plurality of commercial content comprises identifying at least one *Cannabis* product, *Cannabis* plant, *Cannabis* flower, product infused with *Cannabis* or any part(s) thereof, or *Cannabis* edible.

Embodiment 266. A method for facilitating medical content search and results, the method comprising:
  identifying a plurality of medical content in response to receiving a search query;
  identifying a number of times each medical content of the plurality of medical content has been referenced by sources of a set of at least one designated source; and
  generating a search result of the plurality of medical content that is ordered based on the number of times each medical content has been referenced.

Embodiment 267. The method of embodiment 266, wherein identifying a plurality of medical content comprises identifying at least one *Cannabis* product, *Cannabis* flower, product infused with *Cannabis* or any part(s) thereof, or *Cannabis* edible.

Embodiment 268. The method of embodiment 266, wherein identifying a plurality of medical content comprises identifying at least one *Cannabis* product, *Cannabis* plant, *Cannabis* flower, product infused with *Cannabis* or any part(s) thereof, or *Cannabis* edible.

Embodiment 269. The method of embodiment 266, wherein the medical content is *Cannabis* or comprises *Cannabis* or any part thereof.

Embodiment 270. The method of embodiment 266, wherein at least one resulting medical content is or comprises *Cannabis* or any part thereof.

Embodiment 271. The method of embodiment 266, wherein the medical content is *Cannabis* or a medical product comprising *Cannabis* or any part thereof.

Embodiment 272. The method of embodiment 266, wherein generating a search result of the plurality of medical content comprises at least one resulting medical content comprising *Cannabis* flower, or a product comprising *Cannabis* or any part thereof.

Embodiment 273. The method of embodiment 266, wherein the medical content comprises *Cannabis* flower.

Embodiment 274. A method for facilitating educational content search and results, the method comprising:
  identifying a plurality of educational content in response to receiving a search query;
  identifying a number of times each educational content of the plurality of educational content has been referenced by sources of a set of at least one designated source; and
  generating a search result of the plurality of educational content that is ordered based on the number of times each educational content has been referenced.

Embodiment 275. A method for facilitating TV content search and results, the method comprising:
  identifying a plurality of TV content in response to receiving a search query;
  identifying a number of times each TV content of the plurality of TV content has been referenced by sources of a set of at least one designated source; and
  generating a search result of the plurality of TV content that is ordered based on the number of times each TV content has been referenced.

Embodiment 276. A method for facilitating library content search and results, the method comprising:
  identifying a plurality of library content in response to receiving a search query;
  identifying a number of times each library content of the plurality of library content has been referenced by sources of a set of at least one designated source; and
  generating a search result of the plurality of library content that is ordered based on the number of times each library content has been referenced.

Embodiment 277. A method for facilitating internet video/audio content search and results, the method comprising:
  identifying a plurality of internet video/audio content in response to receiving a search query;
  identifying a number of times each internet video/audio content of the plurality of internet video/audio content has been referenced by sources of a set of at least one designated source; and
  generating a search result of the plurality of internet video/audio content that is ordered based on the number of times each internet video/audio content has been referenced.

Embodiment 278. The method of embodiment 1, wherein the set of at least one designated source comprises at least one dispensary, pharmacy, drugstore, or website, or any combination thereof.

Embodiment 279. The method of embodiment 266, wherein the set of at least one designated source comprises at least one dispensary or at least one pharmacy.

Embodiment 280. The method of embodiment 266, wherein the set of at least one designated source comprises at least one hospital or at least one doctor.

Embodiment 281. The method of embodiment 266, wherein the set of at least one designated source comprises at least one healthcare provider.

Embodiment 282. The method of embodiment 1, wherein the set of at least one designated source comprises at least one healthcare provider.

Embodiment 283. The method of embodiment 1, wherein the set of at least one designated source comprises at least one medical facility or at least one healthcare professional.

Embodiment 284. The method of embodiment 1, wherein the set of at least one designated source comprises at least one medical facility and at least one healthcare professional.

Embodiment 285. The method of embodiment 266, wherein the set of at least one designated source comprises at least one physician.

Embodiment 286. The method of embodiment 266, wherein the set of at least one designated source comprises at least one physician or at least one doctor office.

Embodiment 287. The method of embodiment 266, wherein the set of at least one designated source comprises at least one dentist or at least one animal hospital.

Embodiment 288. The method of embodiment 266, wherein the set of at least one designated source comprises at least one dentist office or at least one veterinary physician.

Embodiment 289. The method of embodiment 266, wherein the set of at least one designated source comprises at least one veterinarian or at least one animal hospital.

Embodiment 290. The method of embodiment 1, wherein the set of at least one designated source comprises at least one medical school.

Embodiment 291. The method of embodiment 1, wherein generating a search result of the plurality of content comprises a search result comprising descending content previews.

Embodiment 292. The method of embodiment 1, wherein generating a search result of the plurality of content comprises a search result comprising descending ranked previews.

Embodiment 293. The method of embodiment 1, wherein generating a search result of the plurality of content comprises descending content previews.

Embodiment 294. The method of embodiment 1, wherein generating a search result of the plurality of content comprises at least one content preview.

Embodiment 295. The method of embodiment 291, wherein the content is educational content, or medical content, or library content, or TV content, or internet video/audio content, or commercial content, or any combination thereof.

Embodiment 296. The method of embodiment 291, wherein the set of at least one designated source comprises at least one school, teacher, degree, class, healthcare provider, library, tv station/channel, website, or store, or any combination thereof.

Embodiment 297. The method of embodiment 291, wherein the set of at least one designated source comprises at least one school, teacher, library, or healthcare provider.

Embodiment 298. The method of embodiment 1, wherein generating a search result of the plurality of content comprises generating a search result comprising at least one content preview.

Embodiment 299. The method of embodiment 298, wherein the content is educational content, or medical content, or library content, or TV content, or internet video/audio content, or commercial content, or any combination thereof.

Embodiment 300. The method of embodiment 90, wherein generating a search result of the plurality of commercial content comprises generating a search result comprising descending ranked previews.

Embodiment 301. The method of embodiment 90, wherein generating a search result of the plurality of commercial content comprises generating a search result comprising at least one commercial content preview.

Embodiment 302. The method of embodiment 266, wherein generating a search result of the plurality of medical content comprises generating a search result comprising descending ranked previews.

Embodiment 303. The method of embodiment 266, wherein generating a search result of the plurality of medical content comprises generating a search result comprising at least one medical content preview.

Embodiment 304. The method of embodiment 274, wherein generating a search result of the plurality of educational content comprises generating a search result comprising descending ranked previews.

Embodiment 305. The method of embodiment 274, wherein generating a search result of the plurality of educational content comprises generating a search result comprising at least one educational content preview.

Embodiment 306. The method of embodiment 275, wherein generating a search result of the plurality of TV content comprises generating a search result comprising descending ranked previews.

Embodiment 307. The method of embodiment 275, wherein generating a search result of the plurality of TV content comprises generating a search result comprising at least one TV content preview.

Embodiment 308. The method of embodiment 276, wherein generating a search result of the plurality of library content comprises generating a search result comprising descending ranked previews.

Embodiment 309. The method of embodiment 276, wherein generating a search result of the plurality of library content comprises generating a search result comprising at least one library content preview.

Embodiment 310. The method of embodiment 277, wherein generating a search result of the plurality of internet video/audio content comprises generating a search result comprising descending ranked previews.

Embodiment 311. The method of embodiment 277, wherein generating a search result of the plurality of internet video/audio content comprises generating a search result comprising at least one internet video/audio content preview.

Embodiment 312. The method of embodiment 1, wherein generating a search result of the plurality of content comprises every content having all respective source indicators going horizontally away from the respective content and wherein a single source can have at most one respective source indicator for a respective content.

Embodiment 313. The method of embodiment 90, wherein generating a search result of the plurality of commercial content comprises every commercial content having all respective source indicators going horizontally away from the respective commercial content and wherein a single source can have at most one respective source indicator for a respective commercial content.

Embodiment 314. The method of embodiment 266, wherein generating a search result of the plurality of medical content comprises every medical content having all respective source indicators going horizontally away from the respective medical content and wherein a single source can have at most one respective source indicator for a respective medical content.

Embodiment 315. The method of embodiment 274, wherein generating a search result of the plurality of educational content comprises every educational content having all respective source indicators going horizontally away from the respective educational content and wherein a single source can have at most one respective source indicator for a respective educational content.

Embodiment 316. The method of embodiment 275, wherein generating a search result of the plurality of TV content comprises every TV content having all respective source indicators going horizontally away from the respective TV content and wherein a single source can have at most one respective source indicator for a respective TV content.

Embodiment 317. The method of embodiment 276, wherein generating a search result of the plurality of library content comprises every library content having all respective source indicators going horizontally away from the respective library content and wherein a single source can have at most one respective source indicator for a respective library content.

Embodiment 318. The method of embodiment 277, wherein generating a search result of the plurality of internet video/audio content comprises every internet video/audio content having all respective source indicators going horizontally away from the respective internet video/audio content and wherein a single source can have at most one respective source indicator for a respective internet video/audio content.

Embodiment 319. The method of embodiment 90, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different make, model, color, or year of vehicle.

Embodiment 320. The method of embodiment 90, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is different from all other commercial content by at least one of make of vehicle, model of vehicle, year of vehicle, or color of vehicle.

Embodiment 321. The method of embodiment 90, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is different from all other resulting commercial content in at least one of the following ways: make of vehicle, model of vehicle, year of vehicle, or color of vehicle.

Embodiment 322. The method of embodiment 90, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is different from all other resulting commercial content in at least one of the following ways: make of vehicle, model of vehicle, or year of vehicle.

Embodiment 323. The method of embodiment 1, wherein the set of at least one designated source comprises at least one educational source, or at least one medical source, or at least one library source, or at least one commercial source, or any combination thereof.

Embodiment 324. The method of embodiment 1, wherein the set of at least one designated source comprises at least one educational source, or at least one medical source, or any combination thereof.

Embodiment 325. The method of embodiment 1, wherein the set of at least one designated source comprises at least one educational source, or at least one medical source, or at least one library source, or at least one commercial source, or at least one TV source, or at least one internet video/audio source, or any combination thereof.

Embodiment 326. The method of embodiment 90, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different make, model, or year of vehicle.

Embodiment 327. The method of embodiment 266, wherein identifying a plurality of medical content comprises identifying at least one medical product.

Embodiment 328. The method of embodiment 266, wherein identifying a plurality of medical content comprises identifying at least one medical product, medical device, pharmaceutical, medical procedure, botanical, medical therapy, or medical treatment.

Embodiment 329. The method of embodiment 266, wherein identifying a plurality of medical content comprises identifying at least one medical test or at least one drug.

Embodiment 330 The method of embodiment 266, wherein identifying a plurality of medical content comprises identifying at least one at least one medical exam.

Embodiment 331. The method of embodiment 1, wherein identifying a plurality of content comprises identifying at least one medical product.

Embodiment 332. The method of embodiment 266, wherein identifying a plurality of medical content comprises identifying at least one nutritional supplement.

Embodiment 333. The method of embodiment 266, wherein the set of at least one designated source comprises at least one healthcare provider.

Embodiment 334. The method of embodiment 1, wherein a set of at least one designated source comprises at least one healthcare provider, school, store, library, website, TV station/channel, TV show, degree, or professor.

Embodiment 335. The method of embodiment 1, wherein the set of at least one designated source comprises at least one healthcare provider.

Embodiment 336. A method for facilitating part content search and results, the method comprising:
- identifying a plurality of part content in response to receiving a search query;
- identifying a number of times each part content of the plurality of part content has been referenced by sources of a set of at least one designated source; and
- generating a search result of the plurality of part content that is ordered based on the number of times each part content has been referenced.

Embodiment 337. The method of embodiment 336, wherein identifying a plurality of part content comprises identifying at least one product part.

Embodiment 338. The method of embodiment 336, wherein identifying a plurality of part content comprises identifying at least one airplane part.

Embodiment 339. The method of embodiment 336, wherein identifying a plurality of part content comprises identifying at least one aircraft part.

Embodiment 340. The method of embodiment 336, wherein identifying a plurality of part content comprises identifying at least one vehicle part.

Embodiment 341. The method of embodiment 336, wherein identifying a plurality of part content comprises identifying at least one electronic device part.

Embodiment 342. The method of embodiment 336, wherein identifying a plurality of part content comprises identifying at least one device part, machine part, or apparatus part.

Embodiment 343. The method of embodiment 336, wherein identifying a plurality of part content comprises identifying at least one building part or at least one structure part.

Embodiment 344. The method of embodiment 336, wherein identifying a plurality of part content comprises identifying at least one component part.

Embodiment 345. The method of embodiment 336, wherein identifying a plurality of part content comprises identifying at least one automobile part.

Embodiment 346. The method of embodiment 336, wherein identifying the plurality of part content comprises searching a database of part content by one or more of part content name, source name, and part category name.

Embodiment 347. The method of embodiment 336, wherein identifying a plurality of part content comprises identifying at least one item part.

Embodiment 348. The method of embodiment 336, wherein generating a search result of the plurality of part content comprises every part content having all respective source indicators going horizontally away from the respective part content and wherein a single source can have at most one respective source indicator for a respective part content.

Embodiment 349. The method of embodiment 336, wherein identifying a plurality of part content comprises identifying at least one home part or at least one vehicle part.

Embodiment 350. The method of embodiment 336, wherein the set of at least one designated source comprises at least one automobile or at least one airplane or at least one product or at least one building.

Embodiment 351. The method of embodiment 336, wherein the set of at least one designated source comprises at least one UAV, or at least one automobile, or at least one electronic device, or at least one apparatus.

Embodiment 352. The method of embodiment 336, wherein the set of at least one designated source comprises at least one vehicle.

Embodiment 353. The method of embodiment 352, wherein identifying a plurality of part content comprises identifying at least one car part, or at least one airplane part, or at least one motorcycle part, or at least one toy vehicle part, or at least one SUV part.

Embodiment 354. The method of embodiment 336, wherein identifying a plurality of part content comprises identifying a car part, an airplane part, a UAV part, a drone part, UUV part, a motorcycle part, a snowmobile part, a golfcart part, seaplane part, a submarine part, a spaceship part, a boat part, a building part, a structure part, and a single family home part, and wherein generating a search result of the plurality of part content comprises every part content having all respective source indicators going horizontally away from the respective part content and wherein a single source can have at most one respective source indicator for a respective part content.

Embodiment 355. A method for facilitating internet search engine content search and results, the method comprising:
- identifying a plurality of internet search engine content in response to receiving a search query;
- identifying a number of times each internet search engine content of the plurality of internet search engine content has been referenced by sources of a set of at least one designated source; and
- generating a search result of the plurality of internet search engine content that is ordered based on the number of times each internet search engine content has been referenced.

Embodiment 356. The method of embodiment 355, wherein the set of at least one designated source comprises at least two sources from a group consisting of: Baidu, Bing, Google, and Yandex.

Embodiment 357. The method of embodiment 355, wherein the set of at least one designated source comprises Baidu, Bing, Google, or Yandex.

Embodiment 358. The method of embodiment 355, wherein generating a search result of the plurality of internet search engine content comprises every internet search engine content having all respective source indicators going horizontally away from the respective internet search engine content and wherein a single source can have at most one respective source indicator for a respective internet search engine content.

Embodiment 359. The method of embodiment 1, wherein the set of at least one designated source comprises at least two sources from a group consisting of: school, teacher, healthcare provider, library, website, TV show, and store.

Embodiment 360. A part content search and ranking system, the system comprising:
- one or more computer readable storage media;
- a part content database or table stored on the one or more computer readable storage media; and
- program instructions stored on the one or more computer readable storage media for a part content search and ranking engine that, when executed by one or more processors, directs the one or more processors to:
  - identify a plurality of part content from the part content database in response to receiving a search query;

identify a number of times each part content of the plurality of part content has been referenced by sources of a set of at least one designated source; and generate a search result of the plurality of part content that is ordered based on the number of times each part content has been referenced.

Embodiment 361. An internet search engine content search and ranking system, the system comprising:

one or more computer readable storage media;

an internet search engine content database or table stored on the one or more computer readable storage media; and program instructions stored on the one or more computer readable storage media for an internet search engine content search and ranking engine that, when executed by one or more processors, directs the one or more processors to:

identify a plurality of internet search engine content from the internet search engine content database in response to receiving a search query;

identify a number of times each internet search engine content of the plurality of internet search engine content has been referenced by sources of a set of at least one designated source; and generate a search result of the plurality of internet search engine content that is ordered based on the number of times each internet search engine content has been referenced.

Embodiment 362. The method of embodiment 1, wherein generating a search result of the plurality of content comprises every content having all respective source indicators going horizontally away from the respective content and wherein a single source can have at most one respective source indicator for a respective content.

Embodiment 363. The method of embodiment 362, wherein the source indicators are ordered based on lowest current price of the respective source for the respective content, or based on distance to source from user's current location, or based on user rating of source, or based on average user ratings of source, or based on rank of source, or based on ranking from a ranking organization for the source, or based on ABC order using source name, or any combination thereof.

Embodiment 364. The method of embodiment 363, wherein one or more of lowest current price of the respective source for the respective content, distance to source from user's current location, based on user rating of source, based on average user ratings of source, based on rank of source, based on ranking from a ranking organization for the source, based on ABC order using source name, is used as one or more tie breakers for one or more of, lowest current price of the respective source for the respective content, distance to source from user's current location, based on user rating of source, based on average user ratings of source, based on rank of source, based on ranking from a ranking organization for the source, based on ABC order using source name.

Embodiment 365. The method of embodiment 364, wherein the set of at least one designated source comprises a set searched, filtered, or otherwise controlled for by the user.

Embodiment 366. The method of embodiment 1, wherein the set of at least one designated source comprises a set searched, filtered, or otherwise controlled for by the user.

Embodiment 367. The method of embodiment 366, wherein the set of at least one designated source comprises at least one school, or at least one teacher, or at least one healthcare provider, or at least one library, or at least one website, or at least one store, or any combination thereof.

Embodiment 368. The method of embodiment 90, wherein the set of at least one designated source comprises a set searched, filtered, or otherwise controlled for by the user.

Embodiment 369. The method of embodiment 368, wherein the set of at least one designated source comprises at least one brick-and-mortar source or at least one not brick-and-mortar source.

Embodiment 370. The method of embodiment 368, wherein the set of at least one designated source comprises at least one brick-and-mortar source and at least one not brick-and-mortar source.

Embodiment 371. The method of embodiment 266, wherein the set of at least one designated source comprises a set searched, filtered, or otherwise controlled for by the user.

Embodiment 372. The method of embodiment 371, wherein the set of at least one designated source comprises at least one healthcare provider.

Embodiment 373. The method of embodiment 371, wherein the set of at least one designated source comprises at least one dispensary or at least one pharmacy or at least one doctor or at least one hospital.

Embodiment 374. The method of embodiment 371, wherein the set of at least one designated source comprises at least one doctor office, medical center, or medical clinic.

Embodiment 375. The method of embodiment 371, wherein the set of at least one designated source comprises at least one animal hospital.

Embodiment 376. The method of embodiment 274, wherein the set of at least one designated source comprises a set searched, filtered, or otherwise controlled for by the user.

Embodiment 377. The method of embodiment 376, wherein the set of at least one designated source comprises at least one school, teacher, class, or degree.

Embodiment 378. The method of embodiment 275, wherein the set of at least one designated source comprises a set searched, filtered, or otherwise controlled for by the user.

Embodiment 379. The method of embodiment 378, wherein the set of at least one designated source comprises at least one TV show or at least one TV station/channel.

Embodiment 380. The method of embodiment 276, wherein the set of at least one designated source comprises a set searched, filtered, or otherwise controlled for by the user.

Embodiment 381. The method of embodiment 380, wherein the set of at least one designated source comprises at least one brick-and-mortar library, or at least one not brick-and-mortar library.

Embodiment 382. The method of embodiment 277, wherein the set of at least one designated source comprises a set searched, filtered, or otherwise controlled for by the user.

Embodiment 383. The method of embodiment 382, wherein the set of at least one designated source comprises at least one website.

Embodiment 384. The method of embodiment 336, wherein the set of at least one designated source comprises a set searched, filtered, or otherwise controlled for by the user.

Embodiment 385. The method of 384, wherein the set of at least one designated source comprises at least one vehicle, building, or electronic device Embodiment 386. The method of embodiment 355, wherein the set of at least one designated source comprises a set searched, filtered, or otherwise controlled for by the user.

Embodiment 387. The method of embodiment 386, wherein the set of at least one designated source comprises at least one of Baidu, Bing, Google, or Yandex.

Embodiment 388. The method of embodiment 386, wherein the set of at least one designated source comprises Baidu, Bing, Google, and Yandex.

Embodiment 389. The method of embodiment 387, wherein identify a plurality of internet search engine content comprises identifying at least one URL, book, article, image, or video, or any combination thereof.

Embodiment 390. The method of embodiment 1, wherein the set of at least one designated source comprises at least one website.

Embodiment 391. The method of embodiment 1, wherein identifying a plurality of content comprises identifying at least one educational content.

Embodiment 392. The method of embodiment 1, wherein identifying a plurality of content comprises identifying at least one medical content.

Embodiment 393. The method of embodiment 1, wherein identifying a plurality of content comprises identifying at least one commercial content.

Embodiment 394. The method of embodiment 1, wherein identifying a plurality of content comprises identifying at least one library content.

Embodiment 395. The method of embodiment 1, wherein identifying a plurality of content comprises identifying at least one TV content.

Embodiment 396. The method of embodiment 1, wherein identifying a plurality of content comprises identifying at least one Internet video/audio content.

Embodiment 397. The method of embodiment 1, wherein identifying a plurality of content comprises identifying at least one audio.

Embodiment 398. The method of embodiment 1, wherein identifying a plurality of content comprises identifying at least one vehicle.

Embodiment 399. The method of embodiment 1, wherein identifying a plurality of content comprises identifying at least one menu item.

Embodiment 400. The method of embodiment 1, wherein identifying a plurality of content comprises identifying at least one electronic device.

Embodiment 401. The method of embodiment 1, wherein identifying a plurality of content comprises identifying at least one app.

Embodiment 402. The method of embodiment 1, wherein identifying a plurality of content comprises identifying at least one book, article, video, audio, product, service, item, or good.

Embodiment 403. The method of embodiment 1, wherein identifying a plurality of content comprises identifying at least one book.

Embodiment 404. The method of embodiment 1, wherein identifying a plurality of content comprises identifying at least one educational content and at least one medical content.

Embodiment 405. The method of embodiment 1, wherein identifying a plurality of content comprises identifying at least one of a book, article, app, video, audio, product, service, item, and good.

Embodiment 406. The method of embodiment 1, wherein identifying a plurality of content comprises identifying at least one book.

Embodiment 407. The method of embodiment 1, wherein identifying a plurality of content comprises identifying at least one video.

Embodiment 408. The method of embodiment 1, wherein identifying a plurality of content comprises identifying at least one educational content and at least one medical content, and wherein generating a search result of the plurality of content comprises educational contents side-by-side medical contents.

Embodiment 409. The method of embodiment 1, wherein the content is library content comprising at least one book, video, audio, article, or magazine.

Embodiment 410. The method of embodiment 1, wherein the content is library content and wherein the set of at least one designated source comprises at least one library.

Embodiment 411. The method of embodiment 1, wherein the content is library content and wherein the set of at least one designated source comprises at least one library, collection, catalogue, or service.

Embodiment 412. The method of embodiment 1, wherein the content is library content and wherein the set of at least one designated source comprises at least one not school library or at least one school library.

Embodiment 413. The method of embodiment 1, wherein the content is library content and wherein the set of at least one designated source comprises at least one not brick-and-mortar library or at least one brick-and-mortar library.

Embodiment 414. The method of embodiment 1, wherein the content is medical content and wherein the set of at least one designated source comprises at least one healthcare provider.

Embodiment 415. The method of embodiment 1, wherein the content is educational content and wherein the set of at least one designated source comprises at least one school.

Embodiment 416. The method of embodiment 1, wherein the content is educational content and wherein the set of at least one designated source comprises at least one school, teacher, or library.

Embodiment 417. The method of embodiment 1, wherein the content is educational content and wherein the set of at least one designated source comprises at least one school, teacher, library, degree, class, or department.

Embodiment 418. The method of embodiment 1, wherein the content is commercial content and wherein the set of at least one designated source comprises at least one not brick-and-mortar source and at least one brick-and-mortar source.

Embodiment 419. The method of embodiment 1, wherein the content is commercial content and wherein the set of at least one designated source comprises at least one not brick-and-mortar source or at least one brick-and-mortar source.

Embodiment 420. The method of embodiment 1, wherein the content is part content and wherein the set of at least one designated source comprises an automobile, aircraft, watercraft, spacecraft, snowmobile, golfcart, seaplane, UUV, UAV, drone, vehicle, object, machine, device, tractor, lawnmower, computer, structure, single family home, and building.

Embodiment 421. The method of embodiment 1, wherein the content is TV content and wherein the set of at least one designated source comprises at least one TV station/channel or at least one TV show.

Embodiment 422. The method of embodiment 1, wherein the content is internet video/audio and wherein the set of at least one designated source comprises at least one website.

Embodiment 423. The method of embodiment 1, wherein the content is menu content and wherein the set of at least one designated source comprises at least one restaurant.

Embodiment 424. The method of embodiment 1, wherein identifying the number of times each content of the plurality of content has been referenced comprises identifying the number of sources that have referenced each content of the plurality of content.

Embodiment 425. The method of embodiment 1, wherein generating the search result of the plurality of content comprises ordering the search result with most referenced first and breaking ties by at least one tie-breaker from the group consisting of: most referenced by most sources content; and alphabetical order by content title.

Embodiment 426. The method of embodiment 1, wherein identifying the number of times each content of the plurality of content has been referenced comprises identifying the number of sources that have referenced the content, and wherein generating the search result of the plurality of content comprises ordering the search result with most referenced first and breaking ties by at least one tie-breaker from the group consisting of: most referenced content; and alphabetical order by content title.

Embodiment 427. The method of embodiment 1, wherein the content is medical content comprising at least one medical device, medical product, drug, botanical, dietary supplement, medical procedure, medical therapy, and medical treatment, and wherein the set of at least one designated source comprises at least one healthcare provider.

Embodiment 428. The method of embodiment 1, wherein the content is medical content comprising at least one supply, tool, book, video, audio, nutritional supplement, pharmaceutical, electronic device, or service.

Embodiment 429. The method of embodiment 1, wherein the content is medical content comprising at least one medical device, medical product, drug, botanical, dietary supplement, medical procedure, medical therapy, or medical treatment, and wherein the set of at least one designated source comprises at least one healthcare provider.

Embodiment 430. The method of embodiment 424, wherein the content is educational content, or medical content, or library content, or commercial content, or any combination thereof.

Embodiment 431. The method of embodiment 425, wherein the content is educational content, or medical content, or library content, or commercial content, or any combination thereof.

Embodiment 432. The method of embodiment 426, wherein the content is educational content, or medical content, or library content, or commercial content, or any combination thereof.

Embodiment 433. The method of embodiment 424, wherein the content is educational content, or medical content, or library content, or commercial content, or TV content, or internet video/audio content, or internet search engine content, or part content.

Embodiment 434. The method of embodiment 424, wherein the content is menu item content.

Embodiment 435. The method of embodiment 1, wherein the content is menu content.

Embodiment 436. The method of embodiment 1, wherein the content is medical content comprising at least one document, pamphlet, leaflet, magazine, booklet, audio, or video.

Embodiment 437. The method of embodiment 90, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is different from all other resulting commercial content in at least one of the following ways: make of vehicle, model of vehicle, year of vehicle, or color of vehicle.

Embodiment 438. The method of embodiment 90, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is a different make, model, year, or color of vehicle.

Embodiment 439. The method of embodiment 90, wherein generating a search result of the plurality of commercial content comprises every commercial content having all respective source indicators going horizontally away from the respective commercial content and wherein a single source can have at most one respective source indicator for a respective commercial content, and wherein each source indicator comprises an image of the respective commercial content from the respective source, and wherein each commercial content is different from all other commercial content by at least one of make of vehicle, model of vehicle, year of vehicle, or color of vehicle.

Embodiment 440. The method of embodiment 90, wherein the set of at least one designated source comprises at least one business, individual, seller, vendor, or professional.

Embodiment 441. The method of embodiment 1, wherein the set of at least one designated source comprises at least one app.

Embodiment 442. The method of embodiment 1, wherein generating a search result of the plurality of content comprises a search result comprising descending content previews.

Embodiment 443. The method of embodiment 1, wherein the set of at least one designated source comprises at least one school, teacher, degree, class, school-within-school, healthcare provider, library, TV station/channel, TV show, TV episode, TV season, website, automobile dealership, dispensary, pharmacy, restaurant, marketplace, shop, or store; or any combination thereof.

Embodiment 444. The method of embodiment 1, wherein the set of at least one designated source comprises at least one school, teacher, healthcare professional, store, website, library, or medical facility, or any combination thereof.

Embodiment 445. The method of embodiment 1, wherein the set of at least one designated source comprises at least one school, teacher, healthcare professional, store, library, or medical facility, or any combination thereof.

Embodiment 446. The method of embodiment 1, wherein the set of at least one designated source comprises at least one school, teacher, healthcare professional, library, or medical facility, or any combination thereof.

Embodiment 447. The method of embodiment 1, wherein identifying a plurality of content comprises identifying at least one educational content or at least one medical content.

Embodiment 448. The method of embodiment 1, wherein identifying a plurality of content comprises identifying at least one educational content and at least one medical content.

Embodiment 449. The method of embodiment 1, wherein identifying a plurality of content comprises identifying at least one educational content, or at least one medical content, or at least one library content, or at least one commercial content, or any combination thereof.

Embodiment 450. The method of embodiment 1, wherein identifying a plurality of content comprises identifying at least one educational content, or at least one medical content, or at least one library content, or at least one commercial content, or at least one TV content, or at least one internet video/audio content, or any combination thereof.

Embodiment 451. The method of embodiment 1, wherein identifying a plurality of content comprises identifying at least one book, or at least one video, or at least one audio, or at least one medical product, or any combination thereof.

Embodiment 452. The method of embodiment 1, wherein the set of at least one designated source comprises at least one school or teacher, and at least one healthcare provider.

Embodiment 453. The method of embodiment 1, wherein the set of at least one designated source comprises at least one school and at least one teacher.

Embodiment 454. The method of embodiment 1, wherein the set of at least one designated source comprises at least one medical facility and at least one healthcare professional.

Embodiment 455. The method of embodiment 1, wherein the set of at least one designated source comprises at least one school, and at least one healthcare provider.

Embodiment 456. The method of embodiment 1, wherein the set of at least one designated source comprises at least one school, degree, class, school-within-school, healthcare provider, library, TV station/channel, TV show, website, and store.

Embodiment 457. The method of embodiment 1, wherein the set of at least one designated source comprises at least one school and at least one healthcare provider.

Embodiment 458. The method of embodiment 1, wherein the set of at least one designated source comprises at least one school or at least one healthcare provider.

Embodiment 459. The method of embodiment 1, wherein the set of at least one designated source comprises at least one school and at least one healthcare provider and at least one library.

Embodiment 460. The method of embodiment 1, wherein the set of at least one designated source comprises at least one school and at least one healthcare provider and at least one store.

Embodiment 461. The method of embodiment 1, wherein the set of at least one designated source comprises at least one school or at least one healthcare provider or at least one store or at least one library or at least one app.

Embodiment 462. The method of embodiment 1, wherein the set of at least one designated source comprises at least one school, teacher, degree, class, school-within-school, healthcare provider, library, TV station/channel, TV show, website, and store.

Embodiment 463. The method of embodiment 1, wherein the set of at least one designated source comprises at least one app.

Embodiment 464. The method of embodiment 1, wherein the set of at least one designated source comprises at least one dentist office or at least one dentist.

Embodiment 465. The method of embodiment 1, wherein the set of at least one designated source comprises at least one medical office.

Embodiment 466. The method of embodiment 1, wherein the set of at least one designated source comprises at least one medical facility and at least one medical professional.

Embodiment 467. The method of embodiment 1, wherein the set of at least one designated source comprises at least one medical facility or at least one healthcare professional.

Embodiment 468. The method of embodiment 1, wherein the set of at least one designated source comprises at least website.

Embodiment 469. The method of embodiment 1, wherein the set of at least one designated source comprises at least two different sources from a group consisting of: school, teacher, degree, class, department, school-within-school, healthcare provider, library, store, TV station/channel, TV show, and website.

Embodiment 470. The method of embodiment 291, wherein the content is educational content, or medical content, or library content, or TV content, or internet video/audio content, or commercial content.

Embodiment 471. The method of embodiment 1, wherein generating a search result of the plurality of content comprises a search result comprising descending ranked previews, and wherein the content is educational content, or medical content, or library content, or TV content, or internet video/audio content, or any combination thereof.

Embodiment 472. The method of embodiment 1, wherein generating a search result of the plurality of content comprises a search result comprising descending ranked previews, and wherein the content is educational content or medical content.

Embodiment 473. The method of embodiment 1, wherein generating a search result of the plurality of content comprises a search result comprising descending ranked previews, and wherein the set of at least one designated source comprises at least one school, teacher, healthcare provider, library, store, TV show episode, or website.

Embodiment 474. The method of embodiment 1, wherein the set of at least one designated source comprises at least one shop.

Embodiment 475. The method of embodiment 90, wherein the set of at least one designated source comprises at least one shop.

Embodiment 476. The method of embodiment 1, wherein generating a search result of the plurality of content comprises a search result comprising descending ranked previews, and wherein the content is educational content, or medical content, or commercial content, or library content, or TV content, or internet video/audio content, or any combination thereof.

Embodiment 477. The method of embodiment 1, wherein identifying the number of times each content of the plurality of content has been referenced comprises identifying the number of sources that have referenced each content of the plurality of content, and identifying the number of times each content of the plurality of content has been referenced.

Embodiment 478. The method of embodiment 477, wherein generating a search result of the plurality of content comprises generating at least two search results side-by-side one another, wherein at least one search result is ordered based on the number of times each content has been referenced, and at least one search result is ordered based on the number of sources that have referenced each content.

Embodiment 479. The method of embodiment 477, wherein the number of sources that have referenced each content and the number of times each content of the plurality of content has been referenced are added together to create a single rank point amount for each content.

Embodiment 480. The method of embodiment 477, wherein the content is educational content, or medical content, or library content, or commercial content, or any combination thereof.

Embodiment 481. The method of embodiment 477, wherein the content is educational content, or medical content, or library content, or TV content, or internet video/audio content, or part content, or commercial content, or any combination thereof.

Embodiment 482. The method of embodiment 1, wherein identifying the number of times each content of the plurality of content has been referenced comprises identifying the number of sources that have referenced each content of the plurality of content, or identifying the number of times each content of the plurality of content has been referenced.

Embodiment 483. The method of embodiment 482, wherein the content is educational content, or medical content, or library content, or internet search engine content, or TV content, or internet video/audio content, or part content, or commercial content, or any combination thereof.

Embodiment 484. The method of embodiment 266, wherein generating the search result of the plurality of content comprises: ordering the search result by a number of references of each content of the plurality of content, and breaking ties by at least one tie-breaker from the group consisting of:
the medical content type;
characteristics from a genetic profile of the user; and
characteristics of an insurance coverage of the user.

Embodiment 485. The method of embodiment 1, wherein a single source can only contribute a max of one rank point and a max of one source indicator, for a single content, even if a single source has multiple references for the single ranked content in a time filtered for.

Embodiment 486. The method of embodiment 1, wherein a single source can only contribute a max of one rank point or a max of one source indicator, for a single content, even if a single source has multiple references for the single ranked content in a time filtered for.

Embodiment 487. The method of embodiment 1, wherein a single source can only contribute a max of one rank point for a single content, even if a single source has multiple references for the single ranked content in a time filtered for.

Embodiment 488. The method of embodiment 1, wherein a single source can only contribute a max of one source indicator for a single content, even if a single source has multiple references for the single ranked content in a time filtered for.

Embodiment 489. The method of embodiment 1, wherein a single source can only contribute a max of one rank point and a max of one source indicator, to a single content.

Embodiment 490. The method of embodiment 1, wherein a single source can only contribute a max of one rank point or a max of one source indicator, to a single content.

Embodiment 491. The method of embodiment 1, wherein a single source can only contribute a max of one rank point to a single content.

Embodiment 492. The method of embodiment 1, wherein a single source can only contribute a max of one source indicator to a single content.

Embodiment 493. The method of embodiment 90, wherein a single source can only contribute a max of one rank point and a max of one source indicator, for a single commercial content, even if a single source has multiple references for the single ranked commercial content in a time filtered for.

Embodiment 494. The method of embodiment 90, wherein a single source can only contribute a max of one rank point or a max of one source indicator, for a single commercial content, even if a single source has multiple references for the single ranked commercial content in a time filtered for.

Embodiment 495. The method of embodiment 90, wherein a single source can only contribute a max of one rank point for a single commercial content, even if a single source has multiple references for the single ranked commercial content in a time filtered for.

Embodiment 496. The method of embodiment 90, wherein a single source can only contribute a max of one source indicator for a single commercial content, even if a single source has multiple references for the single ranked commercial content in a time filtered for.

Embodiment 497. The method of embodiment 266, wherein a single source can only contribute a max of one rank point and a max of one source indicator, for a single medical content, even if a single source has multiple references for the single ranked medical content in a time filtered for.

Embodiment 498. The method of embodiment 266, wherein a single source can only contribute a max of one rank point or a max of one source indicator, for a single medical content, even if a single source has multiple references for the single ranked medical content in a time filtered for.

Embodiment 499. The method of embodiment 266, wherein a single source can only contribute a max of one rank point for a single medical content, even if a single source has multiple references for the single ranked medical content in a time filtered for.

Embodiment 500. The method of embodiment 266, wherein a single source can only contribute a max of one source indicator for a single medical content, even if a single source has multiple references for the single ranked medical content in a time filtered for.

Embodiment 501. The method of embodiment 355, wherein a single source can only contribute a max of one rank point and a max of one source indicator, for a single internet search engine content, even if a single source has multiple references for the single ranked internet search engine content in a time filtered for.

Embodiment 502. The method of embodiment 355, wherein a single source can only contribute a max of one rank point or a max of one source indicator, for a single internet search engine content, even if a single source has multiple references for the single ranked internet search engine content in a time filtered for.

Embodiment 503. The method of embodiment 355, wherein a single source can only contribute a max of one rank point for a single internet search engine content, even if a single source has multiple references for the single ranked internet search engine content in a time filtered for.

Embodiment 504. The method of embodiment 355, wherein a single source can only contribute a max of one source indicator for a single internet search engine content, even if a single source has multiple references for the single ranked internet search engine content in a time filtered for.

Embodiment 505. The method of embodiment 274, wherein a single source can only contribute a max of one rank point and a max of one source indicator, for a single educational content, even if a single source has multiple references for the single ranked educational content in a time filtered for.

Embodiment 506. The method of embodiment 274, wherein a single source can only contribute a max of one rank point or a max of one source indicator, for a single educational content, even if a single source has multiple references for the single ranked educational content in a time filtered for.

Embodiment 507. The method of embodiment 274, wherein a single source can only contribute a max of one rank point for a single educational content, even if a single source has multiple references for the single ranked educational content in a time filtered for Embodiment 508. The method of embodiment 274, wherein a single source can only contribute a max of one source indicator for a single educational content, even if a single source has multiple references for the single ranked educational content in a time filtered for.

Embodiment 509. The method of embodiment 1, wherein generating a search result of the plurality of content comprises every content having all respective source indicators going horizontally away from the respective content and wherein a single source can have at most one respective source indicator for a respective content, and wherein at least one source indicator comprises at least one video, or at least one audio, or at least one image.

Embodiment 510. The method of embodiment 266, wherein generating a search result of the plurality of medical content comprises every medical content having all respective source indicators going horizontally away from the respective medical content and wherein a single source can have at most one respective source indicator for a respective medical content, and wherein at least one source indicator comprises at least one video, or at least one audio, or at least one image, of the respective medical content from the respective source.

Embodiment 511. The method of embodiment 266, wherein generating a search result of the plurality of medical content comprises every medical content having all respective source indicators going horizontally away from the respective medical content and wherein a single source can have at most one respective source indicator for a respective medical content, and wherein at least one source indicator comprises at least one video, or at least one audio, or at least one image.

Embodiment 512. The method of embodiment 90, wherein generating a search result of the plurality of commercial content comprises every commercial content having all respective source indicators going horizontally away from the respective commercial content and wherein a single source can have at most one respective source indicator for a respective commercial content, and wherein at least one source indicator comprises at least one video, or at least one audio, or at least one image.

Embodiment 513. The method of embodiment 90, wherein generating a search result of the plurality of commercial content comprises every commercial content having all respective source indicators going horizontally away from the respective commercial content and wherein a single source can have at most one respective source indicator for a respective commercial content, and wherein at least one source indicator comprises at least one video, or at least one audio, or at least one image, of the respective commercial content from the respective source.

Embodiment 514. The method of embodiment 275, wherein a single source can only contribute a max of one rank point and a max of one source indicator, for a single TV content, even if a single source has multiple references for the single ranked TV content in a time filtered for.

Embodiment 515. The method of embodiment 275, wherein a single source can only contribute a max of one rank point or a max of one source indicator, for a single TV content, even if a single source has multiple references for the single ranked TV content in a time filtered for.

Embodiment 516. The method of embodiment 275, wherein a single source can only contribute a max of one rank point for a single TV content, even if a single source has multiple references for the single ranked TV content in a time filtered for.

Embodiment 517. The method of embodiment 275, wherein a single source can only contribute a max of one source indicator for a single TV content, even if a single source has multiple references for the single ranked TV content in a time filtered for.

Embodiment 518. The method of embodiment 276, wherein a single source can only contribute a max of one rank point and a max of one source indicator, for a single library content, even if a single source has multiple references for the single ranked library content in a time filtered for.

Embodiment 519. The method of embodiment 276, wherein a single source can only contribute a max of one rank point or a max of one source indicator, for a single library content, even if a single source has multiple references for the single ranked library content in a time filtered for.

Embodiment 520. The method of embodiment 276, wherein a single source can only contribute a max of one rank point for a single library content, even if a single source has multiple references for the single ranked library content in a time filtered for.

Embodiment 521. The method of embodiment 276, wherein a single source can only contribute a max of one source indicator for a single library content, even if a single source has multiple references for the single ranked library content in a time filtered for.

Embodiment 522. The method of embodiment 277, wherein a single source can only contribute a max of one rank point and a max of one source indicator, for a single internet video/audio content, even if a single source has multiple references for the single ranked internet video/audio content in a time filtered for.

Embodiment 523. The method of embodiment 277, wherein a single source can only contribute a max of one rank point or a max of one source indicator, for a single internet video/audio content, even if a single source has multiple references for the single ranked internet video/audio content in a time filtered for.

Embodiment 524. The method of embodiment 277, wherein a single source can only contribute a max of one rank point for a single internet video/audio content, even if a single source has multiple references for the single ranked internet video/audio content in a time filtered for.

Embodiment 525. The method of embodiment 277, wherein a single source can only contribute a max of one source indicator for a single internet video/audio content, even if a single source has multiple references for the single ranked internet video/audio content in a time filtered for.

Embodiment 526. The method of embodiment 336, wherein a single source can only contribute a max of one rank point and a max of one source indicator, for a single part content, even if a single source has multiple references for the single ranked part content in a time filtered for.

Embodiment 527. The method of embodiment 336, wherein a single source can only contribute a max of one rank point or a max of one source indicator, for a single part content, even if a single source has multiple references for the single ranked part content in a time filtered for.

Embodiment 528. The method of embodiment 336, wherein a single source can only contribute a max of one rank point for a single part content, even if a single source has multiple references for the single ranked part content in a time filtered for.

Embodiment 529. The method of embodiment 336, wherein a single source can only contribute a max of one source indicator for a single part content, even if a single source has multiple references for the single ranked part content in a time filtered for.

Embodiment 530. The method of embodiment 266, wherein generating the search result of the plurality of content comprises: ordering the search result by a number of references of each content of the plurality of content, and breaking ties by at least one tie-breaker from the group consisting of:
the medical content type;
characteristic from a genetic profile of the user; and
characteristic of an insurance coverage of the user.

What is claimed is:

1. A content search and ranking system, the system comprising: one or more non-transitory computer readable storage media; a content database or table stored on the one or more non-transitory computer readable storage media; and a content search and ranking engine that, when executed by one or more processors, directs the one or more processors to: identify a plurality of content from the content database in response to receiving a search query; identify a number of times each content of the plurality of content has been referenced by sources of a set of at least one designated source; generate a search result of the plurality of content that is in a ranked order based on the number of times each content has been referenced; and display the search result of the plurality of content; wherein the display of the search result of the plurality of content comprises each respective content of the plurality of content having horizontal to it at least one respective source indicator for each respective source that referenced the respective content; wherein each source only has a maximum of one source indicator for each content, even if a source has multiple references for a content; wherein the set of at least one designated source comprises at least one school, teacher, college, university, professor, healthcare provider, medical facility, healthcare professional, hospital, doctor, dentist, animal hospital, veterinarian, library, App, home, structure, vehicle, product, object, building, automobile dealership, dispensary, pharmacy, restaurant, business, individual, seller, vendor, store, brick-and-mortar source, website, builder, electrician, roofer, worker, plumber, mechanic, shop, grower, farmer, professional, service, greenhouse, engineer, botanist, contractor, repairperson, handyperson, facility, professional, service, or business entity, or any combination thereof; wherein at least one source indicator comprises a name of the respective source; wherein a plurality of source indicators is horizontal to a highest ranked content, and a plurality of source indicators is horizontal to a second highest ranked content; wherein at least one content of the search result of the plurality of content comprises at least one product, service, good, item, book, video, commercial content, part content, library content, medical content, or educational content; and wherein the search result of the plurality of content comprises at least one content wherein at least one first-type source indicator is a part source indicator, library source indicator, medical source indicator, or educational source indicator, and is to the right or left of the respective content, and wherein at least one second-type source indicator is a commercial source indicator and is to the left or right of the same respective content, and is on the opposite side of the respective content from the at least one first-type source indicator; wherein at least one first-type source indicator is to the right of each respective content, and wherein at least one commercial source indicator is to the left of each respective content; wherein the respective source for the at least one first-type source indicator to the right of each content comprises a healthcare provider, school, college, university, teacher, professor, library, vehicle, structure, building, or product; wherein the respective source for the at least one commercial source indicator to the left of each respective content comprises a store, shop, individual, seller, vendor, professional, website, App, or other commercial source; wherein there are multiple first-type source indicators to the right of at least one respective content of the plurality of content, and at least three commercial source indicators to the left of the same respective content, wherein the at least three commercial source indicators to the left of said same respective content are horizontal to said same respective content, and are in an order that is based on price from each respective source for the respective content, or based on a distance to each source from a location; and wherein at least one source indicator popup is configured to display.

2. The system of claim 1, wherein at least one user interface element allows the user to filter by one or more content types or content characteristics.

3. The system of claim 1, wherein at least one user interface element allows the user to filter by one or more sources or source characteristics.

4. The system of claim 1, wherein at least one user interface element allows the user to filter by one or more reference types or reference characteristics.

5. The system of claim 1, wherein at least one user interface element allows the user to filter by one or more sources or source characteristics; wherein at least one user interface element allows the user to filter by one or more content types or content characteristics; and wherein at least one user interface element allows the user to filter by one or more reference types or reference characteristics.

6. The system of claim 1, wherein at least one user interface element allows the user to filter by one or more sources or source characteristics; and wherein at least one user interface element allows the user to filter by one or more content types or content characteristics, or by one or more reference types or reference characteristics.

7. The system of claim 1, wherein at least one within content preview is configured to display.

8. The system of claim 1, wherein multiple within content previews are configured to display.

9. The system of claim 1, wherein a map is configured to display.

10. The system of claim 1, wherein a video conference is configured to display.

11. The system of claim 1, wherein a Google, Bing, Baidu, Yandex, YouTube, Twitter, or other search engine result is also displayed.

12. The system of claim 1, wherein a service is configured to display.

13. The system of claim 1, wherein multiple references are for or in regard to human patients or subjects; wherein the set of at least one designated source comprises multiple healthcare providers; wherein the plurality of content is a plurality of medical content; and wherein the set of at least one designated source comprises at least one healthcare provider that referenced at least one content by prescribing, using, purchasing, or recommending the content.

14. The system of claim 1, wherein multiple references are for or in regard to non organism patients or subjects.

15. The system of claim 1, wherein multiple references are for or in regard to non human organism patients or subjects.

16. The system of claim 1, wherein a patient characteristic, content characteristic, source characteristic, reference characteristic, or characteristic of the user, is used for breaking a tie between tied in rank contents.

17. The system of claim 1, wherein a patient characteristic, content characteristic, source characteristic, reference characteristic, or characteristic of the user, is used for weighting one or more references.

18. The system of claim 1, wherein at least one user interface element allows the user to filter by when contents were referenced.

19. The system of claim 1, wherein at least one user interface element allows the user to filter by how content is referenced.

20. The system of claim 19, wherein the at least one user interface element allows the user to filter by one or more reference types.

21. The system of claim 1, wherein how one or more contents are referenced is used for weighting one or more references.

22. The system of claim 1, wherein how one or more contents are referenced is used for breaking a tie between tied in rank contents.

23. The system of claim 1, wherein at least one content has more than one type of source indicator to the right of the respective content, and wherein the source indicators to the right of the respective content are grouped by type.

24. A commercial content search and ranking system, the system comprising: one or more non-transitory computer readable storage media; a commercial content database stored on the one or more non-transitory computer readable storage media; and a commercial content search and ranking engine that, when executed by one or more processors, directs the one or more processors to: identify a plurality of commercial content from the commercial content database in response to receiving a search query; identify a number of times each commercial content of the plurality of commercial content has been referenced by sources of a set of at least one designated source; generate a search result of the plurality of commercial content that is in a ranked order based on the number of times each commercial content has been referenced; and display the search result of the plurality of commercial content, wherein the display of the search result of the plurality of commercial content comprises each respective commercial content of the plurality of commercial content having horizontal to it at least one respective source indicator for each respective source that referenced the respective commercial content; wherein each source only has a maximum of one source indicator for each commercial content, even if a source has multiple references for a commercial content; wherein each source only contributes a maximum of one rank point for each commercial content, even if a source has multiple references for a commercial content, or wherein at least one source contributes more than one rank point for a commercial content; wherein the set of at least one designated source comprises at least one store, seller, website, App, brick-and-mortar source, dispensary, pharmacy, shop, restaurant, automobile dealership, individual, professional, vendor, business, or any combination thereof; wherein identifying the number of times each commercial content of the plurality of commercial content has been referenced comprises identifying the number of sources that are currently referencing the commercial content, or identifying the number of sources that have referenced the commercial content, or identifying the number of times each commercial content of the plurality of commercial content has been referenced, or any combination thereof; wherein a plurality of source indicators is horizontal to a highest ranked commercial content, and a plurality of source indicators is horizontal to a second highest ranked commercial content; wherein at least one commercial content of the plurality of commercial content was referenced by at least one source of the set of at least one designated source by the respective source having sold, leased, rented, licensed, or assigned, the commercial content, or by the respective source currently selling, leasing, renting, licensing, or assigning, the commercial content; and wherein at least one source indicator popup is configured to display.

25. The system of claim 24, wherein identifying the number of times each commercial content of the plurality of commercial content has been referenced comprises identifying the number of sources that currently have the commercial content available for purchase.

26. The system of claim 25, wherein identifying the number of sources that currently have the commercial content available for purchase comprises counting commercial content as available for purchase from a respective source if the commercial content is on at least one menu of the respective source.

27. The system of claim 26, wherein at least one source is a restaurant; wherein at least one commercial content is a menu item content; and wherein at least one source indicator comprises at least one image of the respective commercial content.

28. The system of claim 24, wherein a video conference is configured to display.

29. The system of claim 24, wherein at least one user interface element allows the user to filter by one or more sources or source characteristics; and wherein at least one user interface element allows the user to filter by one or more commercial content types or characteristics, or by one or more reference types or characteristics, or by a characteristic of the user.

30. The system of claim 24, wherein at least one user interface element allows the user to filter by one or more sources or source characteristics, or by one or more commercial content types or characteristics, or by one or more reference types or characteristics, or by a characteristic of the user.

31. The system of claim 27, wherein a map is configured to display.

32. The system of claim 24, wherein another service is configured to display.

33. The system of claim 24, wherein a Google, Bing, Baidu, Yandex, YouTube, Twitter, or other search engine result is also displayed.

34. The system of claim 27, wherein at least one user interface element allows the user to filter by one or more sources or source characteristics, or by one or more commercial content characteristics, or by one or more reference characteristics.

35. The system of claim 24, wherein more than one type of source indicators are displayed, and wherein the source indicators are grouped by type.

36. The system of claim 24, wherein at least one commercial content is a vehicle; wherein the set of at least one designated source comprises at least one automobile dealership; and wherein at least one source indicator comprises an image of the respective commercial content.

37. The system of claim 24, wherein at least one commercial content is a menu item content; wherein the set of at least one designated source comprises at least one restaurant; and wherein at least one source indicator comprises an image of the respective commercial content.

38. The system of claim 36, wherein the plurality of commercial content is a plurality of vehicles; wherein at least one user interface element allows the user to filter by one or more sources or source characteristics, or by one or more commercial content characteristics, or by one or more reference types or characteristics; wherein multiple commercial content source indicators horizontal to at least one commercial content are in an order that is based on price from each respective source for the respective content, or based on a distance to each source from a location, or based on average user ratings of sources, or based on ratings of sources; and wherein multiple source indicators comprise an image of a respective commercial content.

39. The system of claim 37, wherein the plurality of commercial content is a plurality of menu item contents; wherein at least one user interface element allows the user to filter by one or more sources or source characteristics, or by one or more commercial content characteristics, or by one or more reference types or characteristics; wherein multiple commercial content source indicators horizontal to at least one commercial content are in an order that is based on price from each respective source for the respective content, or based on a distance to each source from a location, or based on average user ratings of sources, or based on ratings of sources; and wherein multiple source indicators comprise an image of a respective commercial content.

40. The system of claim 36, wherein the plurality of commercial content is a plurality of vehicles; wherein at least one user interface element allows the user to filter by one or more sources or source characteristics; wherein at least one user interface element allows the user to filter by one or more commercial content characteristics, or by one or more reference types or characteristics; wherein multiple commercial content source indicators horizontal to at least one commercial content are in an order that is based on price from each respective source for the respective content, or based on a distance to each source from a location; and wherein multiple source indicators comprise an image of a respective commercial content.

* * * * *